US00RE47352E

(19) United States
(12) Reissued Patent
Sugiyama et al.

(10) Patent Number: US RE47,352 E
(45) Date of Reissued Patent: Apr. 16, 2019

(54) ADAPTER, CAMERA SYSTEM, AND ADAPTER CONTROL PROGRAM

(71) Applicant: NIKON CORPORATION, Tokyo (JP)

(72) Inventors: Hideaki Sugiyama, Yokohama (JP); Fumiya Taguchi, Tokyo (JP); Masanori Hasuda, Fujisawa (JP); Masafumi Oikawa, Tokyo (JP); Noriaki Nakajima, Yokohama (JP); Shunji Nagaya, Kamakura (JP)

(73) Assignee: NIKON CORPORATION, Tokyo (JP)

(21) Appl. No.: 15/184,453

(22) Filed: Jun. 16, 2016

Related U.S. Patent Documents

Reissue of:
(64) Patent No.: 8,755,684
Issued: Jun. 17, 2014
Appl. No.: 13/553,292
Filed: Jul. 19, 2012

U.S. Applications:
(60) Provisional application No. 61/589,613, filed on Jan. 23, 2012, provisional application No. 61/588,970, filed on Jan. 20, 2012.

(30) Foreign Application Priority Data

Jul. 22, 2011 (JP) ..... 2011-160840
Jul. 22, 2011 (JP) ..... 2011-160842

(51) Int. Cl.
*G03B 7/26* (2006.01)
*G03B 17/14* (2006.01)
(Continued)

(52) U.S. Cl.
CPC ..... *G03B 17/56* (2013.01); *G03B 17/14* (2013.01); *G03B 17/565* (2013.01); *H04N 5/23241* (2013.01); *G03B 2217/007* (2013.01)

(58) Field of Classification Search
CPC ..... G03B 17/56; G03B 17/14; G03B 17/565; H04N 5/23241
(Continued)

(56) References Cited

U.S. PATENT DOCUMENTS 4,758,854 A * 7/1988 Saegusa ..... G03B 17/14 396/529
4,935,760 A * 6/1990 Kojima ..... G03B 17/14 396/341
(Continued)

FOREIGN PATENT DOCUMENTS

CN 102111548 A 6/2011
EP 1 672 420 A1 6/2006
(Continued)

OTHER PUBLICATIONS

May 21, 2013 Office Action issued in Japanese Patent Application No. 2011-160840.
(Continued)

*Primary Examiner* — Kenneth Whittington
(74) *Attorney, Agent, or Firm* — Oliff PLC

(57) ABSTRACT

An adapter includes: a first mount section that is detachably attached to a camera body; a second mount section that is provided separately from the first mount section and is detachably attached to an interchangeable lens; and a power supply section that generates supply voltages of a third power supply system and a fourth power supply system, which are to be fed to the interchangeable lens mounted on the second mount section, from a second power supply system between a first power supply system of the camera body, which is mounted on the first mount section, and the second power supply system which is different from the first power supply system.

52 Claims, 16 Drawing Sheets

(51) Int. Cl.
*G03B 17/56* (2006.01)
*H04N 5/232* (2006.01)

(58) Field of Classification Search
USPC ..... 396/71, 529, 530, 531, 532, 541; 348/372, 373, 374, 375
See application file for complete search history.

(56) References Cited

U.S. PATENT DOCUMENTS

| | | | | |
|---|---|---|---|---|
| 5,257,058 | A * | 10/1993 | Mabuchi | G03B 17/14 348/240.3 |
| 5,382,994 | A * | 1/1995 | Naito et al. | G03B 7/20 396/530 |
| 5,731,920 | A * | 3/1998 | Katsuragawa | G03B 17/14 348/383 |
| 6,041,189 | A | 3/2000 | Izukawa | |
| 7,522,828 | B2 * | 4/2009 | Doi et al. | 396/71 |
| 8,545,117 | B2 | 10/2013 | Urakami et al. | |
| 8,718,463 | B2 | 5/2014 | Kamiya et al. | |
| 2002/0118963 | A1 | 8/2002 | Uenaka et al. | |
| 2006/0098114 | A1 | 5/2006 | Horii | |
| 2006/0165401 | A1 | 7/2006 | Doi et al. | |
| 2008/0267601 | A1 | 10/2008 | Kobayashi | |
| 2009/0269049 | A1 * | 10/2009 | Ueda | G03B 17/14 396/529 |
| 2010/0046085 | A1 | 2/2010 | Yumiki et al. | |
| 2010/0091175 | A1 | 4/2010 | Shintani et al. | |
| 2011/0052185 | A1 | 3/2011 | Urakami et al. | |
| 2011/0158629 | A1 | 6/2011 | Kamiya et al. | |
| 2013/0077952 | A1 * | 3/2013 | Sugiyama et al. | 396/530 |

FOREIGN PATENT DOCUMENTS

| | | | |
|---|---|---|---|
| GB | 2469332 | A | 10/2010 |
| JP | A-62-187830 | | 8/1987 |
| JP | S62-187830 | A | 8/1987 |
| JP | A-63-191136 | | 8/1988 |
| JP | S63-191136 | A | 8/1988 |
| JP | H01-093722 | A | 4/1989 |
| JP | A-05-066337 | | 3/1993 |
| JP | H05-66337 | A | 3/1993 |
| JP | A-07-234432 | | 9/1995 |
| JP | H07-234432 | | 9/1995 |
| JP | A-07-333674 | | 12/1995 |
| JP | H07-333674 | A | 12/1995 |
| JP | A-09-080524 | | 3/1997 |
| JP | H09-80524 | A | 3/1997 |
| JP | A-09-230417 | | 9/1997 |
| JP | H09-230417 | A | 9/1997 |
| JP | A-11-064957 | | 3/1999 |
| JP | H11-64957 | A | 3/1999 |
| JP | A-11-346435 | | 12/1999 |
| JP | H11-346435 | A | 12/1999 |
| JP | 2002-258380 | A | 9/2002 |
| JP | A-2002-258380 | | 9/2002 |
| JP | 2003-195381 | A | 7/2003 |
| JP | A-2003-195381 | | 7/2003 |
| JP | 2004-117380 | A | 4/2004 |
| JP | A-2004-117380 | | 4/2004 |
| JP | 2005-031438 | A | 2/2005 |
| JP | A-2005-031438 | | 2/2005 |
| JP | 2005-115170 | A | 4/2005 |
| JP | A-2005-115170 | | 4/2005 |
| JP | 2006-135588 | A | 5/2006 |
| JP | A-2006-135588 | | 5/2006 |
| JP | 2006-215310 | A | 8/2006 |
| JP | 2006-319631 | A | 11/2006 |
| JP | A-2006-319631 | | 11/2006 |
| JP | 2008-092440 | A | 4/2008 |
| JP | A-2008-092440 | | 4/2008 |
| JP | 2008-216439 | A | 9/2008 |
| JP | A-2008-216439 | | 9/2008 |
| JP | 2008-233235 | A | 10/2008 |
| JP | 2008-275890 | A | 11/2008 |
| JP | A-2008-275890 | | 11/2008 |
| JP | 2008-294546 | A | 12/2008 |
| JP | A-2008-294546 | | 12/2008 |
| JP | 2009-093122 | A | 4/2009 |
| JP | A-2009-093122 | | 4/2009 |
| JP | 2009-186545 | A | 8/2009 |
| JP | A-2009-186545 | | 8/2009 |
| JP | 2010-050925 | A | 3/2010 |
| JP | A-2010-050925 | | 3/2010 |
| JP | 2010-226666 | A | 10/2010 |
| JP | A-2010-226666 | | 10/2010 |
| JP | 2011-053437 | A | 3/2011 |
| JP | 2011-107520 | A | 6/2011 |
| JP | 2011-112701 | A | 6/2011 |
| JP | A-2011-107520 | | 6/2011 |
| JP | A-2011-112701 | | 6/2011 |
| WO | 2008/099605 | A1 | 8/2008 |

OTHER PUBLICATIONS

May 21, 2013 Office Action issued in Japanese Patent Application No. 2011-160842.
Oct. 22, 2013 Decision of Rejection issued in Japanese Patent Application No. 2011-160840.
Oct. 22, 2013 Decision of Rejection issued in Japanese Patent Application No. 2011-160842.
Jul. 29, 2013 Office Action issued in U.S. Appl. No. 13/553,292.
Feb. 6, 2014 Notice of Allowance issued in U.S. Appl. No. 13/553,292.
Jun. 14, 2018 Office Action issued in Indian Application No. 2277/DEL/2012.

* cited by examiner

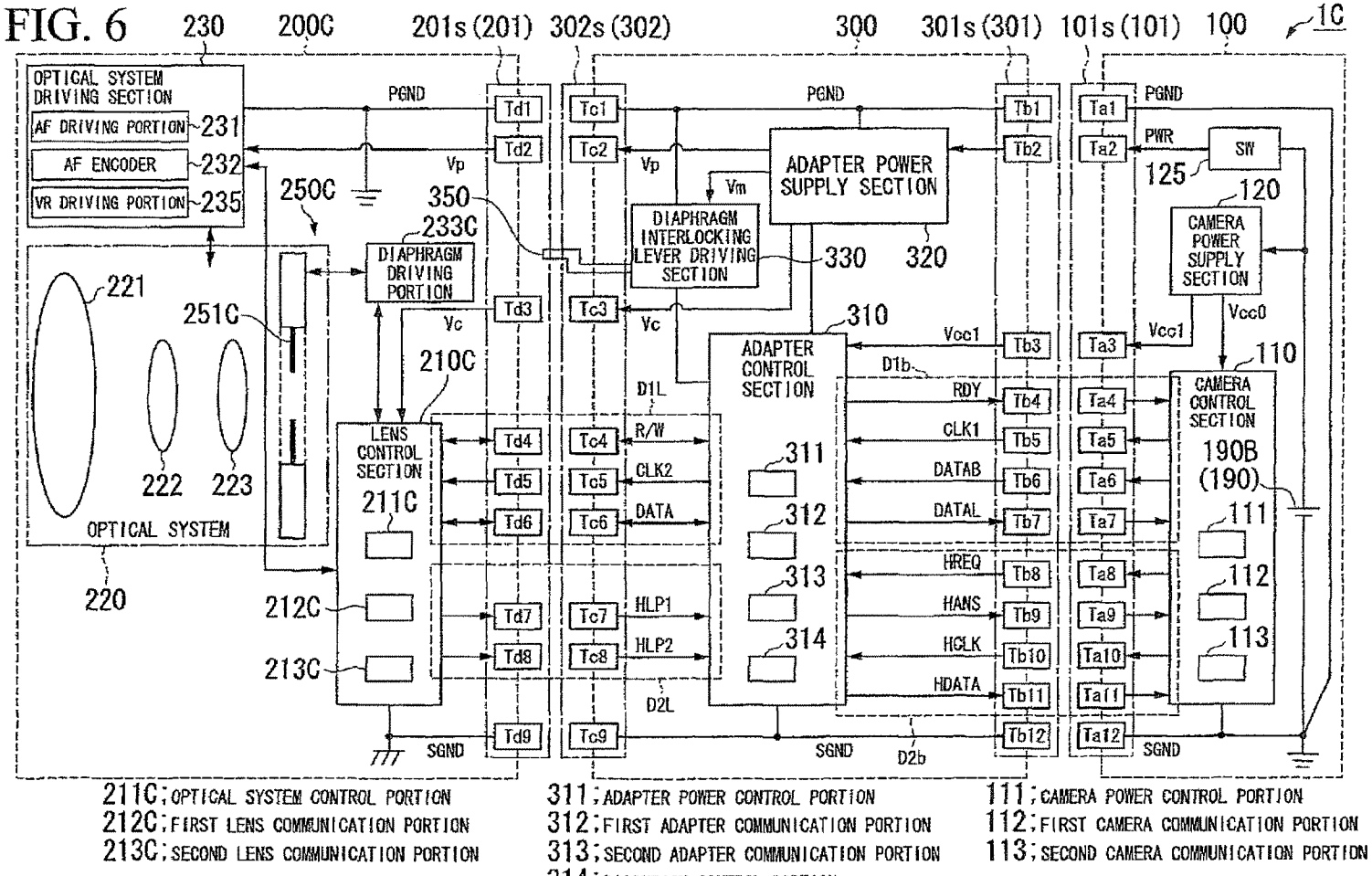
FIG. 6
1C
100
101s (101)
301s (301)
300
302s (302)
201s (201)
200C
230
OPTICAL SYSTEM DRIVING SECTION
AF DRIVING PORTION
AF ENCODER
VR DRIVING PORTION
231
232
235
OPTICAL SYSTEM
220
221
222
223
251C
250C
PGND
PWR
SW
125
120
CAMERA POWER SUPPLY SECTION
Vcc0
Vcc1
110
CAMERA CONTROL SECTION
190B (190)
111
112
113
SGND
ADAPTER POWER SUPPLY SECTION
320
330
310
ADAPTER CONTROL SECTION
311
312
313
314
Vm
DIAPHRAGM INTERLOCKING LEVER DRIVING SECTION
Vp
Vc
D1b
RDY
CLK1
DATAB
DATAL
HREQ
HANS
HCLK
HDATA
D2b
D1L
R/W
CLK2
DATA
HLP1
HLP2
D2L
350
233C
DIAPHRAGM DRIVING PORTION
210C
LENS CONTROL SECTION
211C
212C
213C
Ta1
Ta2
Ta3
Ta4
Ta5
Ta6
Ta7
Ta8
Ta9
Ta10
Ta11
Ta12
Tb1
Tb2
Tb3
Tb4
Tb5
Tb6
Tb7
Tb8
Tb9
Tb10
Tb11
Tb12
Tc1
Tc2
Tc3
Tc4
Tc5
Tc6
Tc7
Tc8
Tc9
Td1
Td2
Td3
Td4
Td5
Td6
Td7
Td8
Td9
111; CAMERA POWER CONTROL PORTION
112; FIRST CAMERA COMMUNICATION PORTION
113; SECOND CAMERA COMMUNICATION PORTION
311; ADAPTER POWER CONTROL PORTION
312; FIRST ADAPTER COMMUNICATION PORTION
313; SECOND ADAPTER COMMUNICATION PORTION
314; DIAPHRAGM CONTROL PORTION
211C; OPTICAL SYSTEM CONTROL PORTION
212C; FIRST LENS COMMUNICATION PORTION
213C; SECOND LENS COMMUNICATION PORTION

ADAPTER, CAMERA SYSTEM, AND ADAPTER CONTROL PROGRAM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application [is a non-provisional application claiming] *is a Reissue of U.S. Pat. No. 8,755,684, issued Jun. 17, 2014, which issued from U.S. application Ser. No. 13/553,292, filed Jul. 19, 2012, which claims* priority to the benefit of U.S. provisional application No. 61/588,970, filed on Jan. 20, 2012 and U.S. provisional application No. 61/589,613, filed on Jan. 23, 2012. [This application] *U.S. Pat. No. 8,755,684* also claims priority to Japanese Patent Application No. 2011-160840, filed on Jul. 22, 2011 and Japanese Patent Application No. 2011-160842, filed on Jul. 22, 2011. The entire contents of each of the applications identified above are incorporated herein by reference.

BACKGROUND

1. Field of the Invention

The present invention relates to an adapter, a camera system, and an adapter control program.

2. Description of Related Art

An interchangeable-lens camera system having a camera body and an interchangeable lens which is detachably attached to the camera body is known (for example, refer to Japanese Unexamined Patent Application Publication No. 2008-275890).

The interchangeable-lens camera system is able to capture an image through various types of optical systems by changing the interchangeable lens mounted on the camera body.

SUMMARY

Recently, in digital camera systems, new interchangeable-lens camera systems, of which the camera body has a smaller size than that of the related art, have been developed.

However, in some cases, interchangeable lenses of existing camera systems may not be mounted on and function in camera bodies of the new interchangeable-lens camera systems.

However, generally the existing interchangeable lenses have come into widespread use. Hence, in the new interchangeable-lens camera systems, in order to be able to capture images through various types of optical systems, it is preferable that the existing interchangeable lens be mounted on and function in these systems.

An object of aspects according to the present invention is to provide an adapter, a camera system, and an adapter control program that enable various types of optical systems to appropriately function in the interchangeable-lens camera system.

According to an aspect of the present invention, an adapter is provided including: a first mount section that is detachably attached to a camera body; a second mount section that is provided separately from the first mount section and is detachably attached to an interchangeable lens; and a power supply section that generates supply voltages of a third power supply system and a fourth power supply system, which are to be fed to the interchangeable lens mounted on the second mount section, from a second power supply system between a first power supply system of the camera body, which is mounted on the first mount section, and the second power supply system which is different from the first power supply system.

Further, according to an aspect of the present invention, a camera system is provided including: the adapter mentioned above; the camera body mounted on the first mount section; and the interchangeable lens mounted on the second mount section.

Further, according to an aspect of the present invention, an adapter control program is provided for controlling operations of an adapter control section in an adapter including a first mount section on which a camera body can be mounted and a second mount section which is provided separately from the first mount section and on which an interchangeable lens can be mounted, the adapter control program comprising steps of: generating a voltage of a lens system power supply system, which is to be fed to the interchangeable lens, from a second power supply system between a first power supply system of the camera body and the second power supply system which is different from the first power supply system; operating by feeding electric power of the first power supply system; and transmitting the second power supply system request signal, which is for requesting start of the power feeding from the second power supply system, to the camera body after the power feeding from the first power supply system is performed.

According to the aspects of the present invention, it is possible to cause various types of optical systems to appropriately function in the interchangeable-lens camera system.

BRIEF DESCRIPTION OF THE DRAWINGS

FIG. 6 is a schematic block diagram illustrating a third example of the configuration of the camera system according to the present embodiment.

DESCRIPTION OF EMBODIMENTS

Hereinafter, embodiments according to the present invention will be described with reference to the accompanying drawings.

Figure 1:
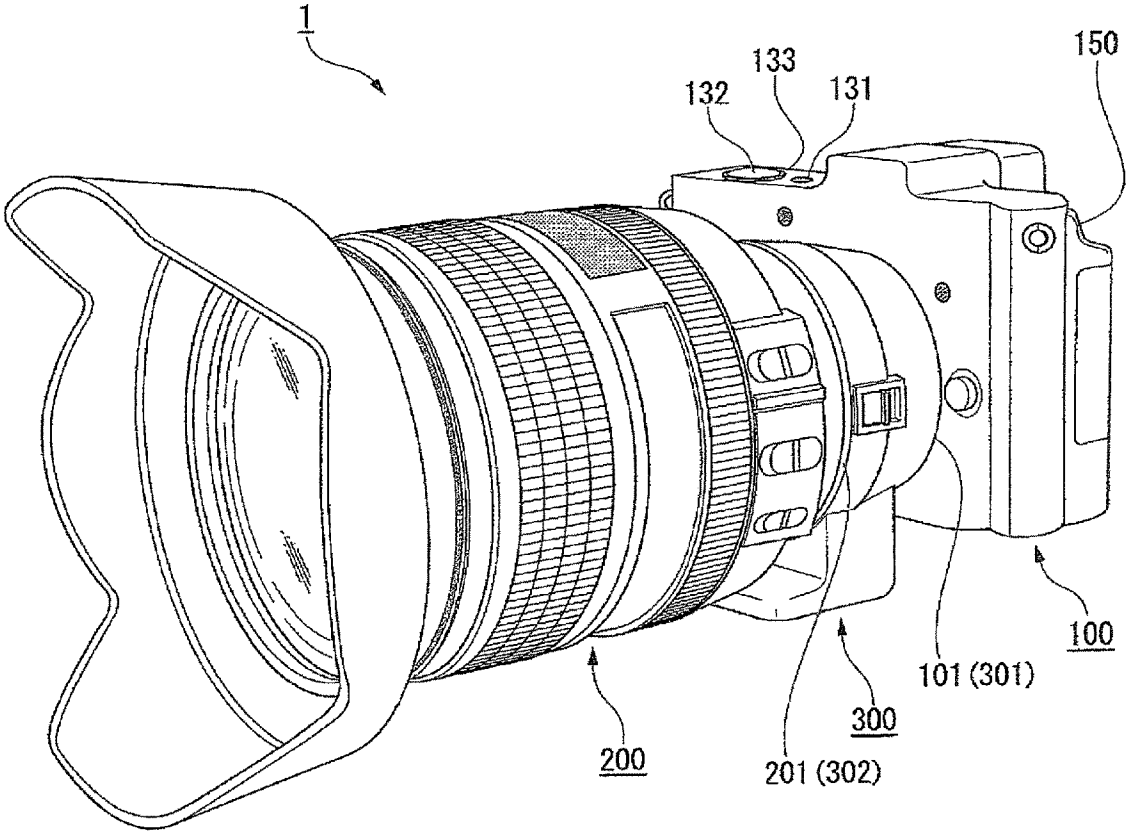
FIG. 1 is a perspective view illustrating a configuration of a camera system according to an embodiment of the present invention.

FIG. 1 is a perspective view illustrating a configuration of a camera system 1 according to an embodiment of the present invention.

The camera system 1 shown in FIG. 1 is an interchangeable-lens camera system, and includes a camera body 100, an interchangeable lens 200, an adapter 300 which is provided between the camera body 100 and the interchangeable lens 200 and is detachably attached to the camera body 100 and the interchangeable lens 200.

In this drawing, the adapter 300 is mounted on the camera body 100. Further, the interchangeable lens 200 is mounted on the camera body 100 with the adapter 300 interposed therebetween.

In the camera system 1, the specification of a camera body-side mount 101, which is a lens mount provided in the camera body 100, is different from the specification of a lens-side mount 201 which is a lens mount provided in the interchangeable lens 200. For example, mount shapes and connection terminals for electrical connection of the specification of the camera body-side mount 101 and the specification of the lens-side mount 201 are different from each other. Further, communication standards of communication through the corresponding connection terminal and communication data types thereof are different from each other. Hence, it is difficult to directly mount the interchangeable lens 200 on the camera body 100.

Therefore, the adapter 300 is formed as a mount adapter that enables the interchangeable lens 200 to be indirectly mounted on the camera body 100. Furthermore, the adapter 300 is formed between the camera body 100 and the interchangeable lens 200 having communication standards and communication data types different from each other so as to enable them to communicate with each other without changing their communication standards and the like.

Further, the camera body 100 includes a power button 131, a release button 132, a rear-side operation section 133, and a display section 150.

The power button 131 is an operation member used to switch on and off a main power supply in the camera body 100.

The release button 132 is an operation member used to accept instructions to start a photography process. For example, the release button 132 accepts two kinds of instructions to start the photography process based on a state where the button is pressed halfway (a half-pressed state, for example, a state for receiving focus adjustment, exposure adjustment, and the like) and a state where the button is pressed fully (a full-pressed state, for example, a state for receiving the instruction to start exposure).

The rear-side operation section 133 is provided on the rear side opposite to the side, on which the camera body-side mount 101 is provided, among the sides of the casing of the camera body 100. The rear-side operation section 133 is configured to include an operation member such as a selection button of operation modes (for example, a mode dial) or a selection button of various setting conditions (for example, a menu button or an up-down-right-left selection button).

The display section 150 is provided on the rear side similarly to the rear-side operation section 133, and thus displays photographed images or a menu screen for selecting various setting conditions. The display section 150 is configured to include, for example, a liquid crystal display, an organic EL (Electra-Luminescence) display, or the like.

Figure 2:
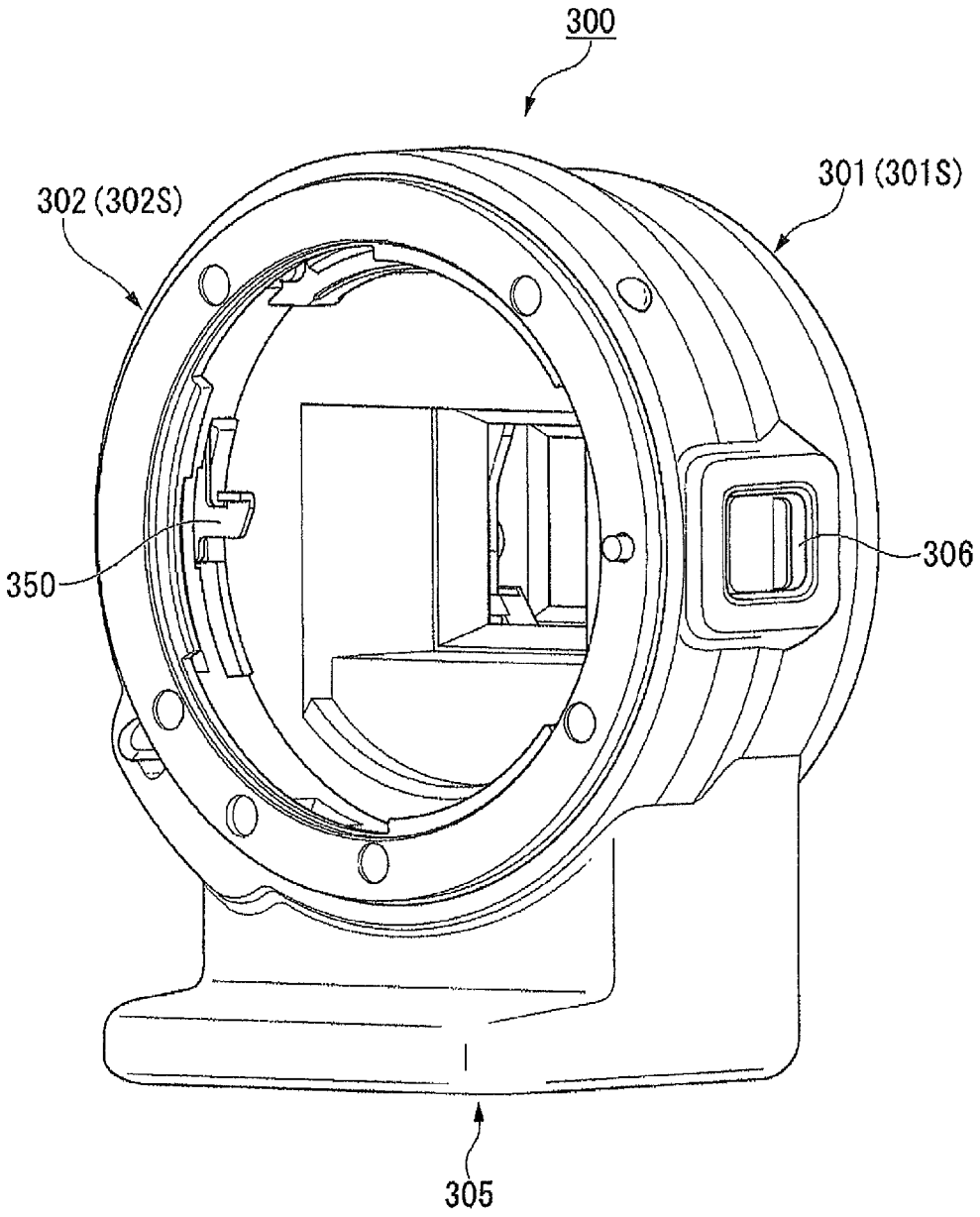
FIG. 2 is a perspective view illustrating an example of a configuration of an adapter according to the present embodiment.

FIG. 2 is a perspective view illustrating an example of a configuration of the adapter 300 according to the present embodiment.

The adapter 300 includes: a first mount section that is detachably attached to the camera body 100; and a second mount section that is provided separately from the first mount section and is detachably attached to the interchangeable lens 200.

For example, as shown in FIG. 2, the adapter 300 includes: a first mount 301 (the first mount section) that is detachably attached to the camera body-side mount 101 provided in the camera body 100; and a second mount 302 (the second mount section) that is detachably attached to the lens-side mount 201 provided in the interchangeable lens 200.

In addition, in the vicinity of the first mount 301, a plurality of electric connection terminals (mount contact points), which respectively correspond to a plurality of electric connection terminals provided in the vicinity of the camera body-side mount 101, is provided. Thereby, when mounted on the camera body 100, the adapter 300 is electrically connected to the camera body 100 through the plurality of connection terminals.

Further, in the vicinity of the second mount 302, a plurality of electric connection terminals, which respectively correspond to a plurality of electric connection terminals provided in the vicinity of the lens-side mount 201, is provided.

Thereby, when mounted on the interchangeable lens 200, the adapter 300 is electrically connected to the interchangeable lens 200 through the plurality of connection terminals.

Further, the adapter 300 includes: a tripod mount 305 to mount the adapter 300 on a tripod; a lens attachment/detachment button 306; and a diaphragm interlocking lever 350.

The lens attachment/detachment button 306 is a button to release the lock of the locking mechanism which mechanically locks the adapter 300 into the interchangeable lens 200 when the lens is mounted. That is, the lens attachment/detachment button 306 is an operation member that is operated by a user when the interchangeable lens 200 mounted on the adapter 300 is detached.

A diaphragm interlocking lever 350 (the diaphragm interlocking mechanism portion) is a lever that displaces a diaphragm mechanism 251 (refer to FIG. 3) including a plurality of diaphragm blades which change the diaphragm aperture diameter (the stopping amount of the diaphragm, the aperture size, the aperture ratio, the aperture value) by using the diaphragm of the interchangeable lens 200, and the lever is provided in the adapter 300. By moving the position of the diaphragm interlocking lever 350 in a direction along the inner circumference of the adapter 300, the aperture diameter of the diaphragm of the interchangeable lens 200 is changed.

For example, the interchangeable lens 200 includes a diaphragm lever 252 (refer to FIG. 3) that displaces the diaphragm mechanism 251. Accordingly, the diaphragm aperture diameter of the interchangeable lens 200 is displaced by moving the position of the diaphragm lever 252. Then, the diaphragm lever 252 is fitted to the diaphragm interlocking lever 350, and is configured to move in conjunction with the diaphragm interlocking lever 350. Hence, the diaphragm aperture diameter of the interchangeable lens 200 is changed by moving the position of the diaphragm interlocking lever 350.

That is, the diaphragm interlocking lever 350 is moved to a position according to the aperture value of the diaphragm mechanism 251 (diaphragm) provided in the interchangeable lens 200.

Description of Block Configuration of Camera System

Next, referring to FIG. 3, the block configuration of the camera system 1 will be described.

Figure 3:
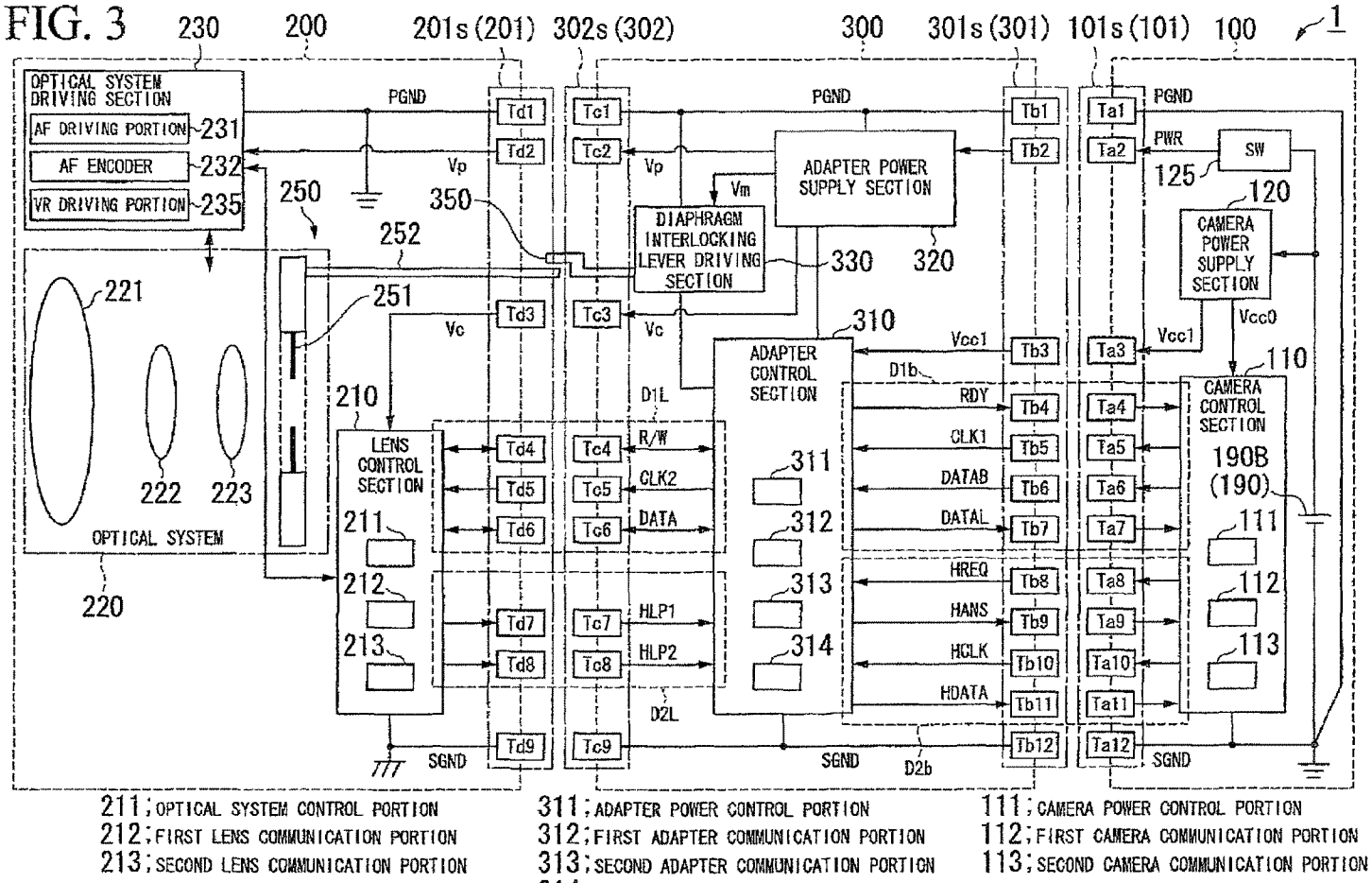
FIG. 3 is a schematic block diagram illustrating a first example of a configuration of the camera system according to the present embodiment.

FIG. 3 is a schematic block diagram illustrating an example of the configuration of the camera system 1 according to the present embodiment. In the drawing, the interchangeable lens 200 is mounted on the camera body 100 with the adapter 300 interposed therebetween. Further, the camera body 100, the interchangeable lens 200, and the adapter 300 are electrically connected to each other through the connection terminals which are respectively provided therein.

First, a brief overview of the configuration of the camera system 1 will be described.

The camera body 100 has the camera body-side mount 101 including a connection section 101s. The adapter 300 has the first mount 301 including a connection section 301s and the second mount 302 including a connection section 302s. The interchangeable lens 200 has the lens-side mount 201 including a connection section 201s.

The adapter 300 is mounted on (physically connected to) the camera body 100 through the camera body-side mount 101 and the first mount 301, and both are electrically connected to each other through the connection section 101s and the connection section 301s. The connection section 101s and the connection section 301s are respectively provided with twelve connection terminals (terminals Ta1 to Ta12 and terminals Tb1 to Tb12) which are electrically connected to each other, thereby feeding a voltage (supplying a voltage) and exchanging (communicating) signals between the camera body 100 and the adapter 300 through the connection terminals.

In addition, the exchange (communication) of signals is performed between a camera control section 110, which is provided in the camera body 100, and an adapter control section 310 which is provided in the adapter 300.

The adapter 300 is mounted on (physically connected to) the interchangeable lens 200 through the lens-side mount 201 and the second mount 302, and both are electrically connected to each other through the connection section 201s and the connection section 302s. The connection section 201s and the connection section 302s are respectively provided with nine connection terminals (terminals Tc1 to Tc9 and terminals Td1 to Td9) which are electrically connected to each other, thereby feeding a voltage (supplying a voltage) and exchanging (communicating) signals between the interchangeable lens 200 and the adapter 300 through the connection terminals.

In addition, the exchange (communication) of signals is performed between a lens control section 210, which is provided in the interchangeable lens 200, and the adapter control section 310 which is provided in the adapter 300.

Configuration of Camera Body

Next, a configuration of the camera body 100 will be described.

The camera body 100 includes the camera control section 110, a camera power supply section 120, a switch 125, a battery section 190B, and the connection section 101s (terminals Ta1 to Ta12).

The connection section 101s has twelve connection terminals of the terminals Ta1 to Ta12 as connection terminals which are connected to the twelve connection terminals (terminals Tb1 to Tb12) of the connection section 301s provided in the adapter 300.

In addition, a configuration of the adapter 300 will be described in detail later.

A battery section 190B houses a battery 190.

The battery 190 supplies a voltage to the camera body 100, the interchangeable lens 200, and the adapter 300. For example, the battery 190 is a lithium-ion secondary battery, a nickel hydride secondary battery, or the like. The battery 190 may be a primary battery such as an alkaline battery. Further, the camera body 100 is not limited to the configuration in which a voltage is supplied from the battery 190, and the voltage may be supplied from an external direct-current power supply (such as an AC adapter that supplies a voltage by transforming an alternating-current power supply into a direct-current power supply).

The camera power supply section 120 converts the voltage, which is supplied from the battery 190, so as to be able to supply the battery voltage to the camera body 100 or the camera accessory which is connected to the camera body 100. For example, by converting the battery voltage, the camera power supply section 120 is divided into: a power supply Vcc0 that supplies a voltage to control system circuits (mainly the camera control section 110) provided in the camera body 100; and a power supply Vcc1 that is a first power supply system which supplies a voltage to the adapter 300 connected to the connection section 101s. The voltage of the power supply Vcc1 is supplied to the control system circuits (mainly adapter control section 310) provided in the adapter 300. Hereinafter, the power supply Vcc1 is referred to as a control system power supply Vcc1.

Further, the camera power supply section 120 switches a supply state and a supply stop state of the voltage supplied by the control system power supply Vcc1 through the control of the camera control section 110. Furthermore, the camera power supply section 120 controls the supply of electric power (an amount of electricity, an amount of power feeding) through the control of the camera control section 110. For example, the camera power supply section 120 switches a state (normal power feeding state), in which the electric power (the amount of electricity, the amount of power feeding) which can be supplied is large to the extent that it is possible to execute the photography process in the camera system 1, and a state (state for feeding a small voltage) in which the electric power (the amount of electricity, the amount of power feeding) which can be supplied is small to the extent that it is difficult to execute the photography process in the camera system 1.

In addition, the voltage of the control system power supply Vcc1 is supplied to the adapter control section 310 through the terminal Ta3 and the terminal Tb3.

Further, the terminal Ta2 and the positive terminal of the battery 190 are connected to the battery section 190B through the switch 125. Thereby, separately from the power supply Vcc1 as the above-mentioned first power supply system, a power supply PWR as a second power supply system is generated from the battery 190, and the voltage is supplied from the power supply PWR to the adapter power supply section 320. The voltage of the power supply PWR is supplied to the adapter power supply section 320 through the terminal Ta2 and the terminal Tb2. Instead of the battery 190, the external direct-current power supply may supply the voltage of the power supply PWR. Further, the power supply PWR is a power supply system which is able to supply a larger electric power than the control system power supply Vcc1. Hereinafter, the power supply PWR is referred to as a power-system power supply PWR.

Further, a power system ground POND, which is a ground (GND) corresponding to the power-system power supply PWR, is connected to the terminal Ta1 and the respective sections to which the voltage of the power-system power supply PWR is supplied. On the other hand, a control system ground SGND, which is a ground corresponding to the control system power supply Vcc1, is connected to the terminal Ta12. Further, the power system ground PGND and the control system ground SGND are respectively grounded at an electric potential equal to the negative terminal of the battery 190 through the battery section 190B.

In addition, the control system ground SGND is also a ground corresponding to the power supply Vcc0, and the control system ground SGND is connected to the ground terminal of the camera control section 110.

The switch 125 switches the conducting state and the cut-off state (non-conducting state) through the control of the camera control section 110. That is, the switch 125 switches whether or not to supply the voltage of the power-system power supply PWR to the terminal Ta2 through the control of the camera control section 110.

The camera control section 110 includes a camera power control portion 111, a first camera communication portion 112, and a second camera communication portion 113. The camera control section 110 controls the respective sections which are provided in the camera body 100, and performs two communication systems, namely, a first data communication system D1b and a second data communication system D2b, with the adapter control section 310 of the adapter 300 connected through the connection section 101s.

The camera power control portion 111 controls the camera power supply section 120 and the switch 125, on the basis of the state of the camera body 100 or the communication state of the first camera communication portion 112 or the second camera communication portion 113.

In addition, the first camera communication portion 112 and the second camera communication portion 113 independently perform two communication systems, namely, the first data communication system D1b and the second data communication system D2b, respectively.

The first data communication system D1b is a communication system using full-duplex communication of the serial interface system. The first camera communication portion 112 exchanges (communicates) four types of signals, namely, RDY, CLK1, DATAB, and DATAL through the first data communication system D1b.

The signal RDY is a signal for notifying whether or not to perform communication to the first camera communication portion 112. The signal RDY is transmitted (output) from a first adapter communication portion 312 to be described later to the first camera communication portion 112 through the terminal Ta4. The signal CLK1 is a clock signal for serial communication. The clock signal CLK1 is transmitted (output) from the first camera communication portion 112 to the first adapter communication portion 312 through the terminal Ta5. The signal DATAB is output from the first camera communication portion 112 to the first adapter communication portion 312 through the terminal Ta6, and is a signal of data on the camera body 100. The signal DATAL is output from the first adapter communication portion 312 to the first camera communication portion 112, and is a signal of data on the interchangeable lens 200. The first camera communication portion 112 receives the signal DATAL through the terminal Ta1.

The second data communication system D2b is a serial interface system, and is a communication system using simplex communication by which the data is transmitted to the camera body 100. The second camera communication portion 113 exchanges (communicates) four types of signals, namely, HREQ, HANS, HCLK, and HDATA.

The signal HREQ is a signal indicating a communication request from the second camera communication portion 113, and the second camera communication portion 113 transmits (outputs) the signal to the second adapter communication portion 313 to be described later through the terminal Tb8. The signal HANS is a signal indicating a communication response to the second camera communication portion 113, and is transmitted from the second adapter communication portion 313 to the second camera communication portion 113 through the terminal Tb9. The signal HCLK is a clock signal for serial communication. The clock signal HCLK is transmitted (output) from the second camera communication portion 113 to the second adapter communication portion 313 through the terminal Tb10. The signal HDATA is a lens data signal which is transmitted from the second adapter communication portion 313 to the second camera communication portion 113 through the terminal Tb11.

In addition, communication contents of the first data communication system D1b and the second data communication system D2b will be described in detail later.

Configuration of Interchangeable Lens

Next, a configuration of the interchangeable lens 200 will be described.

The interchangeable lens 200 includes the connection section 201s (terminals Td1 to Td9), the lens control section 210, an optical system 220, and an optical system driving section 230.

The subject light (optical image), which is incident through the optical system 220, is guided onto a light receiving surface of a well-known photography element (not shown in the drawing), which is provided in the camera body 100, through the adapter 300.

The optical system 220 includes a lens 221, a lens for focus adjustment (hereinafter referred to as a focus lens) 222, a lens for image blur correction of optical images (for vibration-proof) (hereinafter referred to as a VR (Vibration Reduction) lens) 223, and a diaphragm section 250.

The diaphragm section 250 includes the diaphragm mechanism 251 that includes the plurality of diaphragm blades, and the diaphragm lever 252 that mechanically operates the diaphragm mechanism 251. Accordingly, the diaphragm aperture diameter of the interchangeable lens 200 is changed in a way that the diaphragm lever 252 mechanically operates the diaphragm mechanism 251. Further, the interchangeable lens 200 in the camera system 1 shown in FIG. 3 is a lens in which a power supply such as an actuator which drives the diaphragm mechanism 251 is not built in, and is also a lens in which the diaphragm mechanism 251 is driven through the diaphragm lever 252 by the diaphragm interlocking lever 350 of the adapter 300.

The optical system driving section 230 include an AF (Auto Focus) driving portion 231, an AF encoder 232, and a VR driving portion 235.

The AF driving portion 231 drives the focus lens 222 through the control of the lens control section 210. Further, the AF encoder 232 detects the position of the focus lens 222, and supplies the detection result to the lens control section 210.

The VR driving portion 235 drives the VR lens 223 through the control of the lens control section 210.

The interchangeable lens 200 may include a focus ring that is manually operated by a user so as to thereby move the position of the focus lens 222.

The connection section 201s includes nine connection terminals Td1 to Td9 which are connected to nine connection terminals (terminals Tc1 to Tc9) of the connection section 302s provided in the adapter 300.

The power supply Vp, which supplies the voltage of the optical system driving section 230, is supplied through the terminal Td2.

Hereinafter, the power supply Vp is referred to as a lens driving system power supply Vp. The lens driving system power supply Vp is supplied from the power-system power supply PWR through the adapter 300.

For example, the voltage of the lens driving system power supply Vp is supplied from the terminal Td2 to the optical system driving section 230, of which power consumption is large, like an actuator driving the focus lens 222 provided in the AF driving portion 231, an actuator driving the VR lens 223, or the like. Further, the power system ground PGND which is a ground corresponding to the lens driving system power supply Vp is connected to the terminal Td1 and the ground terminal of the optical system driving section 230.

The power supply Vc, which supplies the voltage of the lens control section 210, is connected to the terminal Td3. Hereinafter, the power supply Vc is referred to as a lens control system power supply Vc. The lens control system power supply Vc is supplied from the power-system power supply PWR through the adapter 300.

The voltage of the lens control system power supply Vc is supplied through the terminal Td3 to the control system circuits and the like including the lens control section 210 of which the power consumption is smaller than that of the optical system driving section 230. Further, the control system ground SGND, which is a ground corresponding to the lens control system power supply Vc, is connected to the terminal Td9 and the ground terminal of the lens control section 210.

That is, the power system ground PGND and the control system ground SGND are not connected to each other in the interchangeable lens 200, and are divided into grounds of two systems.

The lens control section 210 includes an optical system control portion 211, a first lens communication portion 212, and a second lens communication portion 213. The lens control section 210 controls the optical system driving section 230, and controls two communication systems, namely, the first data communication system D1L and the second data communication system D2L, with the adapter control section 310 of the adapter 300 connected through the connection section 201s.

The optical system control portion 211 controls the optical system driving section 230. For example, the optical system control portion 211 initializes the optical system driving section 230 in accordance with the state of communication with the adapter 300. Further, the optical system control portion 211 controls the optical system driving section 230 so as to drive a driving element such as the focus lens 222 or the VR lens 223 in accordance with the control of the camera control section 110 which is performed through the adapter 300. Further, the optical system control portion 211 acquires information (for example, information on the position of the focus lens 222 detected by the AF encoder 232 and the like) on the optical system (driving element) 220 supplied from the optical system driving section 230.

The first lens communication portion 212 and the second lens communication portion 213 respectively perform two communication systems, namely, the first data communication system D1L and the second data communication system D2L at independent timings.

The first data communication system D1L is a communication system using half-duplex communication of the serial interface system. The first lens communication portion 212 communicates three types of signals, namely, R/W, CLK2, and DATA through the first data communication system D1L.

The signal R/W is a read/write signal indicating the communication direction of the data signal to be described later, is also a signal used for performing a handshake between a lens-side and an adapter, and is transmitted and received between the first lens communication portion 212 and the first adapter communication portion 312 to be described later through the terminal Td4. The signal CLK2 is a clock signal for serial communication, and is transmitted (output) from the first adapter communication portion 312 to the first lens communication portion 212 through the terminal Td5. The signal DATA is a data signal which is transmitted and received between the first adapter communication portion 312 and the first lens communication portion 212 through the terminal Td6.

The second data communication system D2L is a pulse communication system, and a communication system using simplex communication by which the pulse signal is output from the interchangeable lens 200. The second lens communication portion 213 transmits two types of pulse signals, namely, HLP1, HLP2 through the second data communication system D2L.

The signal HLP1 is a pulse signal which is transmitted to the second adapter communication portion 313 to be described later through the terminal Td7. The signal HLP2 is a pulse signal which is output from the second lens communication portion 213 to the second adapter communication portion 313 through the terminal Td8. Such pulse signals HLP1 and HLP2 are pulse signals responsive to the signal output from the AF encoder 232.

The communication contents communicated in the first data communication system D1L and the second data communication system D2L will be described later.

Configuration of Adapter

Next, a configuration of the adapter 300 will be described.

The adapter 300 includes the adapter control section 310, the adapter power supply section 320, the diaphragm interlocking lever driving section 330 (diaphragm interlocking mechanism driving portion), the connection section 301s (terminals Tb1 to Tb12), the connection section 302s (terminals Tc1 to Tc9), and the diaphragm interlocking lever 350.

The connection section 301s includes twelve connection terminals TM to Tb12 connected to the above-described twelve connection terminals Ta1 to Ta12 on the camera body 100 side. The adapter 300 and the camera body 100 are connected through the connection section 301s and connection section 101s, Thereby, the respective terminals of the terminals Tb1 to Tb12 of the connection section 301s are electrically connected to the connection terminals respectively corresponding to the terminals Ta1 to Ta12 of the connection section 101s.

Further, the connection section 302s includes nine connection terminals Tc1 to Tc9 connected to the above-described nine connection terminals (terminals Td1 to Td9) on the interchangeable lens 200 side. The adapter 300 and the interchangeable lens 200 are connected through the connection section 302s and the connection section 201s. The respective terminals of the terminals Tc1 to Tc9 of the connection section 302s are connected to the connection terminals respectively corresponding to the terminals Td1 to Td9 of the connection section 201s.

The terminal Tb2 is connected to the terminal Ta2, and the terminal Tb3 is connected to the terminal Ta3. Thereby, the voltage of the power-system power supply PWR is supplied from the camera body 100 to the terminal Tb2 through the terminal Ta2, and the voltage of the control system power supply Vcc1 is supplied to the terminal Tb3 through the terminal Ta3. Thereby, the adapter power supply section 320 is supplied with the voltage of the power-system power supply PWR from the camera body 100 through the terminal Ta2 and the terminal Tb2.

On the other hand, the adapter control section 310 is supplied with the voltage of the control system power supply Vcc1 from the camera body 100 through the terminal Ta3 and the terminal Tb3.

As described above, the adapter 300 is supplied with both of the voltage of the control system power supply Vcc1 (the voltage of the first power supply system) from the camera body 100 and the voltage of the power-system power supply PWR (the voltage of the second power supply system) which is able to supply a larger electric power than the control system power supply Vcc1. The voltage of the power-system power supply PWR, which is supplied to the adapter power supply section 320, can be divided (converted) into the lens driving system power supply Vp (third power supply system) and the lens control system power supply Vc (fourth power supply system) as the lens system power supply systems which supply the voltage to the interchangeable lens 200. For example, the adapter power supply section 320 generates the supply voltages of the lens driving system power supply Vp and the lens control system power supply Vc, which feed voltages to the interchangeable lens 200, from the power-system power supply PWR which is supplied from the camera body 100.

The voltage, which is supplied from the lens driving system power supply Vp, is larger than the voltage which is supplied from the lens control system power supply Vc. Further, the power consumption in the load supplied from the lens driving system power supply Vp may be larger than the power consumption in the load supplied from the lens control system power supply Vc.

Furthermore, from the power-system power supply PWR supplied to the adapter power supply section 320, separately from the above-mentioned lens driving system power supply Vp and the lens control system power supply Vc, the power supply Vm (fifth power supply system), which supplies a voltage to the diaphragm interlocking lever driving section 330, is also generated (can be divided). Hereinafter, the power supply Vm is referred to as a diaphragm driving power supply Vm.

For example, the adapter power supply section 320 includes a voltage conversion section that converts the voltage of the power-system power supply PWR into a predetermined voltage of the diaphragm driving power supply Vm. The voltage conversion section includes, for example, a DC-DC converter. Further, the voltage conversion section converts the voltage into a voltage which is stepped up to, for example, a predetermined voltage (the predetermined voltage of the diaphragm driving power supply Vm). Then, the adapter power supply section 320 supplies the generated voltage of the diaphragm driving power supply Vm to the diaphragm interlocking lever driving section 330.

The adapter power supply section 320 may include a first regulator portion that converts (generates) the voltage of the lens control system power supply Vc on the basis of the voltage of the diaphragm driving power supply Vm.

For example, the first regulator portion converts the voltage of the diaphragm driving power supply Vm into a voltage which is stepped down to a predetermined voltage (a predetermined voltage of the lens control system power supply Vc). Further, for example, the first regulator portion may include a first linear regulator. The voltage of the diaphragm driving power supply Vm is set to be higher than the voltage of the lens control system power supply Vc.

Further, the adapter power supply section 320 may include a second regulator portion that converts (generates) the voltage of the lens driving system power supply Vp on the basis of the voltage of the power-system power supply PWR. For example, the second regulator portion converts the voltage of the power-system power supply PWR into a voltage which is stepped down to a predetermined voltage (a predetermined voltage of the lens driving system power supply Vp). Further, for example, the second regulator portion may include a second linear regulator. In this case, the second regulator portion is configured to supply a larger electric power (the amount of power feeding is larger) than that of the first regulator portion. Further, the adapter power supply section 320 has a voltage detection portion that detects the power supply voltage, and supplies the detection result to the adapter control section 310.

An internal configuration of the adapter power supply section 320 will be described later with reference to FIG. 4.

The respective connections of the power supply systems converted by the adapter power supply section 320 are as follows.

The terminal Tc2 is connected to the output terminal of the lens driving system power supply Vp (the terminal that outputs the voltage of the lens driving system power supply Vp) of the adapter power supply section 320. Further, the terminal Tc3 is connected to the output terminal of the lens control system power supply Vc (the terminal that outputs the voltage of the lens control system power supply Vc) of the adapter power supply section 320. Thereby, the adapter power supply section 320 supplies the voltage of the lens driving system power supply Vp to the terminal Tc2, and supplies the voltage of the lens control system power supply Vc to the terminal Tc3.

Further, the adapter power supply section 320 supplies the voltage of the lens driving system power supply Vp to the optical system driving section 230 of the interchangeable lens 200 through the terminal Tc2 and the terminal Td2.

Further, the adapter power supply section 320 supplies the voltage of the lens control system power supply Vc to the lens control section 210 of the interchangeable lens 200 through the terminal Tc3 and the terminal Td3.

As described above, the adapter power supply section 320 is able to generate a voltage, which is supplied to the lens control section 210 and the optical system driving section 230 of the interchangeable lens 200, from the voltage of the power-system power supply PWR.

Thereby, the adapter 300 does not set the voltage of the control system power supply Vcc1, which is supplied from the camera body 100, as the voltage, which is supplied to the interchangeable lens 200, but is able to set it as the voltage which is supplied to the adapter control section 310. The camera power supply section 120 in the camera body 100 is configured to constantly supply the control system power supply Vcc1 to the connection point at which connection is made through the terminal Ta3 (as long as there is a "supply request" from the connection point). Hence, the adapter control section 310, which is connected to the terminal Ta3 through the terminal Tb3, can be constantly activated for example even if the power supply switch on the camera body 100 side is turned off. By constantly activating the adapter control section 310, it is possible to store the setting state (for example, whether or not the initialization process of the diaphragm interlocking lever 350 is complete) on the adapter 300 side. Therefore, there is an advantage in that, when the power supply switch on the camera body 100 side is turned on, the unnecessary initialization process is not performed and is terminated in the adapter 300. Further, although not described in the present embodiment, when the camera body activation switch (a switch which switches ON/OFF of the power supply on the adapter 300 side) which can be operated by a user is provided on the adapter 300 side, it is possible to constantly monitor the ON operation of the activation switch. Therefore, it is possible to configure a system which activates the camera body 100 through the operation on the adapter 300 side. (It may also be possible to adopt a system configuration which transfers the control system power supply Vcc1 to the lens control section 210 so as to constantly activate the lens control section 210. In this case, even when the operation switch to activate the camera body 100 is provided on the interchangeable lens 200 side, the adapter 300, which is not in the activation state (since the power is not supplied thereto), is interposed between both of the interchangeable lens 200 and the camera body 100, and thus it is difficult to transfer the operation of the operation switch on the interchangeable lens 200 side to the camera body 100 side. As a result, it is difficult to activate the camera body 100.)

Furthermore, the adapter power supply section 320 supplies the voltage of the diaphragm driving power supply Vm in the adapter 300 to the diaphragm interlocking lever driving section 330. In other words, the adapter 300 generates a voltage, which is supplied to the diaphragm interlocking lever driving section 330, from the voltage of the power-system power supply PWR which is supplied from the camera body 100. Since the power-system power supply PWR has a sufficiently large power feeding ability as compared with the control system power supply Vcc1, the power-system power supply PWR can be used in power feeding to various circuits. In addition, similarly to the present embodiment, even when a voltage for power feeding to the diaphragm interlocking lever driving section 330 is generated from the power-system power supply PWR (even when the power-system power supply PWR is used in combination), there is no adverse effect on operations of other circuits of the sections used in combination (for example, the operation of the above-mentioned lens control section 210).

Further, the terminal Tb1 is connected to the terminal Ta1 of the camera body 100. Thereby, the power system ground PGND is connected to the terminal Tb1 through the terminal Ta1. Further, the terminal Tb1 and the terminal Tc1 are connected through the power system ground PGND in the adapter 300. Furthermore, the terminal Tc1 is connected to the terminal Td1 of the interchangeable lens 200. Thereby, the power system ground PGND is a ground corresponding to the lens driving system power supply Vp, and is connected to the terminal Td1 through the terminal Tc1. In addition, the power system ground PGND is a ground corresponding to the ground of the adapter power supply section 320, the diaphragm interlocking lever driving section 330, and the like.

Further, the terminal Tb12 is connected to the terminal Ta12 of the camera body 100. Thereby, the control system ground SGND is connected to the terminal Tb12 through the terminal Ta12. Further, the terminal Tb12 and the terminal Tc9 are connected through the control system ground SGND in the adapter 300. Furthermore, the terminal Tc9 is connected to the terminal Td9 of the interchangeable lens 200. Thereby, the control system ground SGND is a ground corresponding to the lens control system power supply Vc, and is connected to the terminal Td9 through the terminal Tc9. In addition, the control system ground SGND is a ground corresponding to the ground of the adapter control section 310.

As described above, the power system ground POND and the control system ground SGND are not connected to each other in the adapter 300, but are divided into the grounds of two systems.

That is, in the interchangeable lens 200 and adapter 300, the power system ground PGND and the control system ground SGND are not connected to each other, but are divided into the grounds of two systems. However, the power system ground PGND and the control system ground SGND, which are divided into two systems, are connected in the camera body 100, and are thus set to a ground at the same electric potential as that of the negative terminal of the battery 190. Accordingly, the ground of the camera control section 110, the lens control section 210, and the adapter control section 310 is connected to the control system ground SGND, and is set to an equivalent electric potential.

Accordingly, it is possible to reduce the effect of noise, which occurs in the power system ground POND, on the control system ground SGND.

In the interchangeable lens 200, the control system ground SGND may be connected to the conductive portion (interchangeable lens casing) of the lens-side mount 201. Further, the terminal Td9, which is connected to the control system ground SGND in the interchangeable lens 200, may be configured to be included in the conductive portion of the lens-side mount 201. Likewise, in the adapter 300, the control system ground SGND may be connected to the conductive portion of the second mount 302. Further, the terminal Tc9, which is connected to the control system ground SGND in the adapter 300, may be configured to be included in the conductive portion of the second mount 302.

Furthermore, likewise, the terminal Tb12 may be connected to the conductive portion of the first mount 301, and the terminal Tb12 may be configured to be included in the conductive portion of the first mount 301. Likewise, the terminal Tall may be connected to the conductive portion of the camera body-side mount 101, and the terminal Ta12 may be configured to be included in the conductive portion of the camera body-side mount 101.

The diaphragm interlocking lever driving section 330 moves the position of the diaphragm interlocking lever 350 through the control of the adapter control section 310. By moving the diaphragm interlocking lever 350, the diaphragm interlocking lever driving section 330 displaces the diaphragm mechanism 251 of the interchangeable lens 200 through the diaphragm lever 252. Further, the diaphragm interlocking lever driving section 330 detects the position of the diaphragm interlocking lever 350, and outputs the corresponding detection result to the adapter control section 310.

For example, the diaphragm interlocking lever driving section 330 includes: a diaphragm driving actuator (for example, a stepping motor) that drives the diaphragm interlocking lever 350; a motor driving portion that controls driving of the diaphragm driving actuator; a diaphragm interlocking lever position detection portion that detects the position of the diaphragm interlocking lever 350; and the like. Thereby, in the diaphragm interlocking lever driving section 330, the motor driving portion drives the diaphragm driving actuator, whereby the diaphragm driving actuator drives the diaphragm interlocking lever 350. Further, in the diaphragm interlocking lever driving section 330, the diaphragm interlocking lever position detection portion (for example, a photo-interrupter) detects the position of the diaphragm interlocking lever 350, and supplies the detection result to the adapter control section 310.

The adapter control section 310 includes an adapter power control portion 311, the first adapter communication portion 312, a second adapter communication portion 313, and a diaphragm control portion 314. Further, the adapter control section 310 is controlled by periodic communication with the camera control section 110, controls the processes performed in the respective sections provided in the adapter 300, and periodically communicates with the lens control section 210. For example, the adapter control section 310 performs periodic routine communication with the camera control section 110. Further, the adapter control section 310 also performs periodic routine communication with the lens control section 210.

Furthermore, the adapter control section 310 controls the diaphragm interlocking lever driving section 330 on the basis of the communication for controlling the photography process from the camera control section 110, and communicates with the lens control section 210 in order to control the optical system driving section 230 of the interchangeable lens 200.

The adapter power control portion 311 controls the adapter power supply section 320 in accordance with the result of the communication with the camera control section 110 or the lens control section 210 or the state of the adapter 300. For example, the adapter power control portion 311 controls the adapter power supply section 320 in accordance with the result of the communication of the camera control section 110 or the lens control section 210, and controls whether or not to supply the voltage of the lens control system power supply Vc, the lens driving system power supply Vp, or the diaphragm driving power supply Vm.

Further, the adapter power control portion 311 monitors: the voltage (in other words, a state of the voltage supplied from the camera body 100 side to the adapter 300) of the power supply system to which a voltage is supplied from the camera body 100; and the voltage (in other words, a state of the voltage supplied from the adapter 300 side to the interchangeable lens 200) of the power supply system to which a voltage is generated from the adapter 300 and supplied. The adapter power control portion 311 has a voltage detection portion that detects the voltages of the respective power supply systems, and thus monitors the voltages of the respective power supply system on the basis of the detection result obtained from the voltage detection portion, and notifies the corresponding monitoring result to the camera control section 110 as necessary. This operation will be described in detail in the "process at the time of temporary blackout of power supply" (FIG. 16) to be described later.

The diaphragm control portion 314 controls the diaphragm interlocking lever driving section 330 in accordance with the result of communication with the camera control section 110 or the lens control section 210.

For example, the diaphragm control portion 314 controls the diaphragm interlocking lever driving section 330, in accordance with the result of communication with the camera control section 110, so as to make the diaphragm aperture diameter of the diaphragm mechanism 251 equal to the diaphragm aperture diameter corresponding to the instruction of the control issued from the camera control section 110.

Further, the diaphragm control portion 314 performs control, which moves the position of the diaphragm interlocking lever 350 to the initial position in accordance with the process, on the diaphragm interlocking lever driving section 330. For example, the diaphragm control portion 314 controls the diaphragm interlocking lever driving section 330 so as to move the diaphragm interlocking lever 350 to the position, at which the diaphragm mechanism 251 is open, as the initial position, and the retractable position at which it does not interfere with the diaphragm lever 252 moved in accordance with the setting aperture value of the diaphragm mechanism 251.

Further, the diaphragm control portion 314 acquires the position of the diaphragm interlocking lever 350 detected in the diaphragm interlocking lever driving section 330.

The first adapter communication portion 312 performs communication of the first data communication system D1b with the first camera communication portion 112, and performs communication of the first data communication system D1L with the first lens communication portion 212.

Specifically, the first adapter communication portion 312 relays communication between the first data communication system Mb and the first data communication system D1L, which are communication standards different from each other. For example, the first adapter communication portion 312 converts data, which is received from the first camera communication portion 112 in conformity with the communication standard of the first data communication system D1b as the full-duplex communication of the serial interface system, into data of the communication standard of the first data communication system D1L as the half-duplex communication of the serial interface system, and transmits the data to the first lens communication portion 212. On the other hand, the first adapter communication portion 312 converts data, which is received from the first lens communication portion 212 on the basis of the communication standard of the first data communication system D1L as the half-duplex communication of the serial interface system, into data of the communication standard of the first data communication system D1b as the full-duplex communication of the serial interface system, and transmits the data to the first camera communication portion 112.

Further, the first adapter communication portion 312 relays communication between the first data communication system D1b and first data communication system D1L communicated with periods different from each other.

Furthermore, the first adapter communication portion 312 performs a conversion process to obtain consistency between the formats of the data exchanged between the first data communication system D1b and the first data communication system D1L.

In addition, the adapter control section 310 includes, for example, a storage portion (not shown in the drawing). The first adapter communication portion 312 temporarily stores the data, which is generated on the basis of the received data, the converted data, and the like, in the corresponding storage portion. In addition, the first adapter communication portion 312 reads out the generated data from the corresponding portion, and transmits the data.

The first adapter communication portion 312 and the first camera communication portion 112 perform communication of the first data communication system D1b through the signal lines for the four types of signals RDY, CLK1, DATAB, and DATAL. The terminal Tb4 is connected to the first adapter communication portion 312 through the signal line of the signal ROY. Further, the terminal Tb5 is connected to the first adapter communication portion 312 through the signal line of the signal CLK1, the terminal Tb6 is connected thereto through the signal line of the signal DATAB, and the terminal Tb7 is connected thereto through the signal line of the signal DATAL. In addition, the terminal Tb4 is connected to the terminal Ta4 of the camera body 100, the terminal Tb5 is connected to the terminal Ta5, the terminal Tb6 is connected to the terminal Tab, and the terminal Tb7 is connected to the terminal Ta7.

That is, the signal lines for the four types of the signals RDY, CLK1, DATAB, and DATAL for performing communication of the first data communication system D1b are connected between the first adapter communication portion 312 and the first camera communication portion 112 through the terminals Tb4 to Tb7 and the terminals Ta4 to Ta7.

On the other hand, the first adapter communication portion 312 and the first lens communication portion 212 perform communication of the first data communication system D1L through the signal lines for the three types of the signals R/W, CLK2, and DATA. The terminal Tc4 is connected to the first adapter communication portion 312 through the signal line of the signal R/W. Further, the terminal Tc5 is connected to the first adapter communication portion 312 through the signal line of the signal CLK2, and the terminal Tc6 is connected thereto through the signal line of the signal DATA. In addition, the terminal Tc4 is connected to the terminal Td4 of the interchangeable lens 200, the terminal Tc5 is connected to the terminal Td5, and the terminal Tc6 is connected to the terminal Td6.

That is, the signal lines for the three types of the signals R/W, CLK2, and DATA for performing communication of the first data communication system D1L are connected between the first adapter communication portion 312 and the first lens communication portion 212 through the terminals Tc4 to Tc6 and the terminals Td4 to Td6.

As described above, the communication of the first data communication system D1b and the communication of the first data communication system D1L are performed between the first camera communication portion 112 and the first lens communication portion 212 through the first adapter communication portion 312. In the communication of the first data communication system D1b and the communication of the first data communication system D1L, for example, information of the optical system 220, a request command such as a control instruction, and data of response to the request command are communicated between the first camera communication portion 112 and the first lens communication portion 212 through the first adapter communication portion 312. Here, communication in the first data communication system D1b and the first data communication system D1L is referred to as "command data communication".

In addition, the information of the optical system 220 is information indicating the type of the optical system 220 (information indicating a specification, a function, an optical characteristic of the optical system 220, and the like), information indicating the driving status of the optical system 220, or the like.

As described above, the first adapter communication portion 312 in the adapter control section 310 has: a function of receiving a camera control command, which is output from the first camera communication portion 112 of the camera control section 110 (in other words, the first reception section); a function of transmitting a lens control command, which is for controlling driving of the driving elements of the interchangeable lens 200, to the first lens communication portion 212 of the interchangeable lens 200 in accordance with contents received by the first reception section (in other words, the first transmission section); a function of receiving status information, which indicates the driving statuses of the driving elements, from the first lens communication portion 212 of the interchangeable lens 200 (in other words, the second reception section); and a function of transmitting the status information, which indicates the driving statuses of the driving elements, to the first camera communication portion 112 of the camera body 100 on the basis of contents received by the second reception section (in other words, the second transmission section).

The second adapter communication portion 313 receives a pulse signal of the second data communication system D2L from the second lens communication portion 213, and performs communication of the second data communication system D2b with the second camera communication portion 113.

Specifically, the second adapter communication portion 313 detects information which is included in the pulse signal of the second data communication system D2L, and converts the detected information in conformity with the communication standard of the second data communication system D2b. For example, the second adapter communication portion 313 converts data, which is received from the second lens communication portion 213 on the basis of the communication standard of the second data communication system D2L as the simplex communication of the pulse communication system, into data of the communication standard of the second data communication system D2b as the simplex communication of the serial interface system, and transmits the data to the second camera communication portion 113. Further, the second adapter communication portion 313 converts, through the control of the first adapter communication portion 312, information which is included in the pulse signal received by communication of the second data communication system D2L, on the basis of the communication standard of the second data communication system D2b, and transmits the information to the second camera communication portion 113.

The second adapter communication portion 313 and the second camera communication portion 113 performs communication of the second data communication system D2b through signal lines for four types of signals HREQ, HANS, HCLK, and HDATA. The terminal Tb8 is connected to the second adapter communication portion 313 through the signal line of the signal HREQ. Further, the terminal Tb9 is connected to the second adapter communication portion 313 through the signal line of the signal HANS, the terminal Tb10 is connected thereto through the signal line of the signal HCLK, and the terminal Tb11 is connected thereto through the signal line of the signal HDATA. In addition, the terminal Tb8 is connected to the terminal Ta8 of the camera body 100, the terminal Tb9 is connected to the terminal Tag, the terminal Tb10 is connected to the terminal Ta10, and the terminal Tb11 is connected to the terminal Ta11.

That is, the signal lines for the four types of the signals HREQ, HANS, HCLK, and HDATA for performing communication of the second data communication system D2b are connected between the second adapter communication portion 313 and the second camera communication portion 113 through the terminals Tb8 to Tb11 and the terminals Ta8 to Tall.

On the other hand, the second adapter communication portion 313 and the second lens communication portion 213 perform communication of the second data communication system D2L through the signal lines for the two types of the signals HLP1 and HLP2. The terminal Tc7 is connected to the second adapter communication portion 313 through the signal line of the signal HLP1. Further, the terminal Tc8 is connected to the second adapter communication portion 313 through the signal line of the signal HLP2. In addition, the terminal Tc7 is connected to the terminal Td7 of the interchangeable lens 200, and the terminal Tc8 is connected to the terminal Td8.

That is, the signal lines for the two types of the signals HLP1 and HLP2 for performing communication of the second data communication system D2L are connected between the second adapter communication portion 313 and the second lens communication portion 213 through the terminals Tc7 and Tc8 and the terminals Td7 and Td8.

As described above, the communication of the second data communication system D2b and the communication of the second data communication system D2L are performed between the second camera communication portion 113 and the second lens communication portion 213 through the second adapter communication portion 313. In the communication of the second data communication system D2b and the communication of the second data communication system D2L, on the basis of the communication request signal of the second camera communication portion 113, for example, data indicating the position of the focus lens 222 and the like are communicated from the second lens communication portion 213 through the second adapter communication portion 313. Here, communication in the second data communication system D2b and the second data communication system D2L is referred to as "hotline communication".

Details of Configuration of Power Supply Section and Power Supply System of Adapter Next, referring to FIG. 4, details of the configuration of the adapter power supply section 320 and the power supply system in the adapter 300 will be described.

Figure 4:
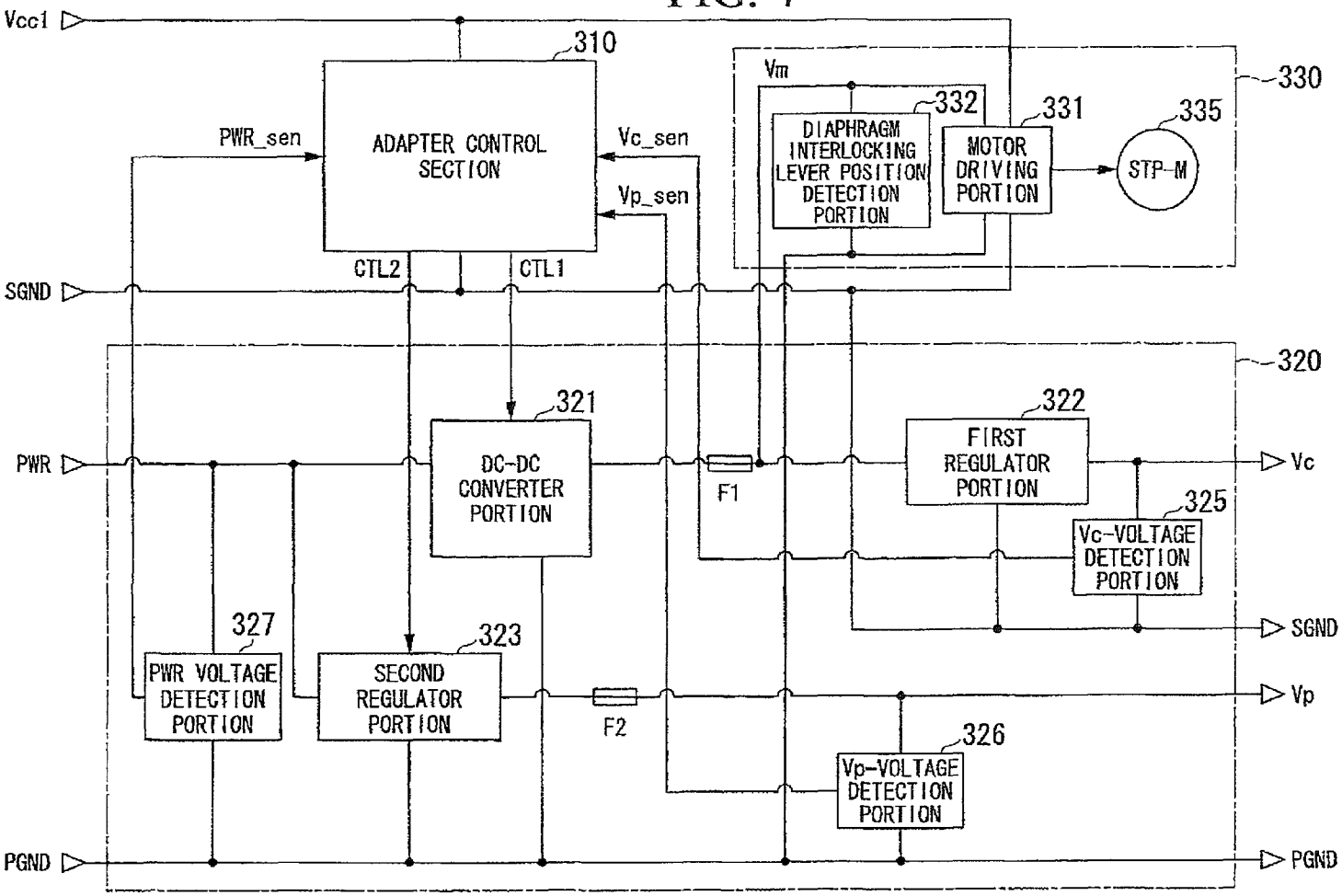
FIG. 4 is a schematic block diagram illustrating an example of a configuration of an adapter power supply section and a power supply system.

FIG. 4 is a schematic block diagram illustrating an example of the configuration of the adapter power supply section 320 and the power supply system. In the drawing, the elements corresponding to the respective sections of FIG. 3 are represented by the same reference numerals and signs, and description thereof will be omitted. Further, the adapter control section 310 shown in the drawing represents a configuration relating to the adapter power control portion 311.

The adapter power supply section 320 includes a DC-DC converter portion 321 (voltage conversion section), a first regulator portion 322, a second regulator portion 323, a Vc-voltage detection portion 325 (the voltage detection portion of the fourth power supply system), a Vp-voltage detection portion 326 (the voltage detection portion of the third power supply system), a PWR voltage detection portion 327 (the voltage detection portion of the second power supply system), a fuse F1, and a fuse F2.

The DC-DC converter portion 321 is connected to the power supply line of the power-system power supply PWR, and is thus supplied with the voltage of the power-system power supply PWR. The DC-DC converter portion 321 generates the diaphragm driving power supply Von which is converted into the voltage stepped up to a predetermined voltage from the voltage of the power-system power supply PWR. The power supply line of the diaphragm driving power supply Vm, which is generated by the DC-DC converter portion 321, is connected to the input terminal of the first regulator portion 322 and the diaphragm interlocking lever driving section 330 through the fuse F1, thereby supplying the voltage of the diaphragm driving power supply Yin.

The first regulator portion 322 has, for example, the first linear regulator, and thus generates the lens control system power supply Vc of which the voltage is stabilized by stepping down the voltage of the diaphragm driving power supply Vm. In addition, the power supply line of the lens control system power supply Vc is connected to the terminal Tc3 described in FIG. 3.

Further, the input terminal of the second regulator portion 323 is connected to the power supply line of the power-system power supply PWR, and is thus supplied with the voltage of the power-system power supply PWR. The second regulator portion 323 has, for example, the second linear regulator, and thus generates the lens driving system power supply Vp of which the voltage is stabilized by stepping down the voltage of the power-system power supply PWR. The second regulator portion 323 is a regulator which is able to supply a larger amount of power feeding than the first regulator portion 322. In addition, the power supply line of the lens driving system power supply Vp is connected to the terminal Tc2 described in FIG. 3 through the fuse F2.

The connection positions of the fuses are not limited to the connection positions of the fuse F1 and the fuse F2 shown in the drawing. For example, a fuse, which is connected in series to the power supply line of the diaphragm driving power supply Vm, may be configured to be connected in series to each of the power supply lines divided into the power supply line, which is connected to the diaphragm interlocking lever driving section 330, and the power supply line, which is connected to the first regulator portion 322. Further, a fuse may be configured to be connected in series to the power supply line of the lens control system power supply Vc. Furthermore, the fuse F2, which is connected in series to the power supply line of the lens driving system power supply Vp is connected in series to the second regulator portion 323 side relative to the connection point between the power supply line of the lens driving system power supply Vp and the Vp-voltage detection portion 326. However, the fuse F2 may be configured to be connected in series to the side of the terminal Tc2 relative to the corresponding connection point. Further, likewise, when a fuse is connected in series to the power supply line of the lens control system power supply Vc, the fuse may also be configured to be connected in series to either one of the first regulator portion 322 side and the terminal Tc3 side relative to the connection point between the power supply line of the lens control system power supply Vc and the Vc-voltage detection portion 325.

The fuses protect electric circuits by cutting off current when an undesirable large current greater than or equal to the rated current flows into each power supply line.

Further, the signal line of the control signal CTL1 is connected to the control signal output terminal of the adapter control section 310 and the DC-DC converter portion 321 (for example, the control terminal for output control provided in the DC-DC converter portion 321). The DC-DC converter portion 321 controls the supply state of the voltage of the diaphragm driving power supply Vm on the basis of the control signal CTL1, which is supplied from the adapter control section 310, so as to change the state into a power feeding state (a state in which the voltage is supplied) or a cut-off state (a state in which the voltage supply is stopped). For example, when the control signal CTL1 is in an H (high) state, the DC-DC converter portion 321 controls the voltage of the diaphragm driving power supply Vm such that it attains the power feeding state. Further, when the control signal CTL1 is in an L (low) state, the DC-DC converter portion 321 controls the voltage of the diaphragm driving power supply Vm such that it attains the cut-off state.

In addition, in the first regulator portion 322, in response to the supply of the voltage of the diaphragm driving power supply Vm, the voltage of the lens control system power supply Vc is fed, and in response to the supply stop of the voltage of the diaphragm driving power supply Vm, the voltage of the lens control system power supply Vc is cut off. That is, the supply state of the voltage of the lens control system power supply Vc generated in the first regulator portion 322 is controlled on the basis of the control signal CTL1 similarly to the supply state of the voltage of the diaphragm driving power supply Vm.

Further, the signal line of the control signal CTL2 is connected to the control signal output terminal of the adapter control section 310, and the second regulator portion 323 (for example, the control terminal for output control provided in the second regulator portion 323). The second regulator portion 323 controls the supply state of the voltage of the lens driving system power supply Vp on the basis of the control signal CTL2, which is supplied from the adapter control section 310, so as to change the state into a power feeding state (a state in which the voltage is supplied) or a cut-off state (a state in which the voltage supply is stopped). For example, when the control signal CTL2 is in an H (high) state, the second regulator portion 323 controls the voltage of the lens driving system power supply Vp such that it attains the power feeding state. Further, when the control signal CTL2 is in an L (low) state, the second regulator portion 323 controls the voltage of the lens driving system power supply Vp such that it attains the cut-off state.

The voltage detection terminal of the Vc-voltage detection portion 325 is connected to the power supply line of the lens control system power supply Vc. Thereby, the Vc-voltage detection portion 325 detects the voltage of the lens control system power supply Vc, and supplies the detection signal Vc_sen to the adapter control section 310. For example, the signal line of the detection signal Vc_sen, which is supplied from the Vc-voltage detection portion 325 to the adapter control section 310, is connected to the A/D conversion (analog/digital conversion) input terminal of the adapter control section 310.

Further, the voltage detection terminal of the Vp-voltage detection portion 326 is connected to the power supply line of the lens driving system power supply Vp. Thereby, the Vp-voltage detection portion 326 detects the voltage of the lens driving system power supply Vp, and supplies the detection signal Vp_sen to the adapter control section 310. For example, the signal line of the detection signal Vp_sen, which is supplied from the Vp-voltage detection portion 326 to the adapter control section 310, is connected to the A/D conversion input terminal of the adapter control section 310.

Further, the voltage detection terminal of the PWR voltage detection portion 327 is connected to the power supply line of the power-system power supply PWR. Thereby, the PWR voltage detection portion 327 detects the voltage of the power-system power supply PWR, and supplies the detection signal PWR sen to the adapter control section 310. For example, the signal line of the detection signal PWR sen, which is supplied from the PWR voltage detection portion 327 to the adapter control section 310, is connected to the A/D conversion input terminal of the adapter control section 310.

The diaphragm interlocking lever driving section 330 includes a stepping motor 335 as the diaphragm driving actuator, a motor driving portion 331, and a diaphragm interlocking lever position detection portion 332.

The stepping motor 335 is a power source that drives the diaphragm interlocking lever 350, and is driven by the motor driving portion 331.

The motor driving portion 331 generates the pulse voltage and drives the stepping motor 335, through the control of the adapter control section 310. Further, the diaphragm interlocking lever position detection portion 332 includes, for example, a photo-interrupter, and detects the position of the diaphragm interlocking lever 350.

The power supply line of the diaphragm driving power supply Vm, which is generated by the DC-DC converter portion 321, is connected to the motor driving portion 331 and the diaphragm interlocking lever position detection portion 332, and thus supplies the voltage of the diaphragm driving power supply Vm to them.

Further, the power supply line of the control system power supply Vcc1 is connected to the adapter control section 310 and the motor driving portion 331, and thus supplies the voltage of the control system power supply Vcc1 to them.

The control system ground SGND is connected as a ground, which corresponds to the control system power supply Vcc1, to the adapter control section 310, the motor driving portion 331, the first regulator portion 322, and the Vc-voltage detection portion 325.

Further, the power system ground PGND is connected as a ground, which corresponds to the power-system power supply PWR, to the DC-DC converter portion 321, the second regulator portion 323, the Vp-voltage detection portion 326, the PWR voltage detection portion 327, the motor driving portion 331, and the diaphragm interlocking lever position detection portion 332.

As described above, the adapter 300 generates the voltage of the lens driving system power supply Vp and the voltage of the lens control system power supply Vc, which are supplied to the interchangeable lens 200, from the voltage of the power-system power supply PWR, between the voltage of the control system power supply Vcc1 and the voltage of the power-system power supply PWR which are supplied from the camera body 100. That is, the adapter control section 310 is supplied with the voltage of the control system power supply Vcc1 from the camera body 100, and the lens control section 210 of the interchangeable lens 200 is supplied with the voltage of the lens control system power supply Vc which is generated from the power-system power supply PWR in the adapter 300. Further, the optical system driving section 230 of the interchangeable lens 200 is supplied with the voltage of the lens driving system power supply Vp which is generated from the power-system power supply PWR in the adapter 300.

Thereby, the adapter 300 is able to generate and supply a voltage for driving the interchangeable lens 200 from the power-system power supply PWR supplied from the camera body 100. For example, in contrast with the amount of power feeding supplied to both the adapter control section 310 and the lens control section 210, the amount of power feeding of the control system power supply Vcc1 supplied from the camera body 100 may be insufficient. Even in this case, the adapter 300 is able to feed a voltage to both the adapter control section 310 and the lens control section 210 without a shortage of an amount of power feeding, and is able to feed a voltage to the optical system driving section 230. Accordingly, by connecting the camera body 100 and the interchangeable lens 200 through the adapter 300, the interchangeable lens 200 can be caused to function by driving it through the camera body 100.

Further, the adapter 300 supplies the voltage of the lens driving system power supply Vp to the load with large power consumption in contrast with the power consumption of the load to which the voltage of the lens control system power supply Vc is supplied. That is, the adapter 300 generates the lens control system power supply Vc as a power supply system that supplies a voltage to the lens control section 210, and generates the lens driving system power supply Vp, which is able to supply a larger amount of power feeding than the lens control system power supply Vc, as a power supply system that supplies a voltage to the optical system driving section 230. Thereby, the adapter 300 is able to appropriately supply a voltage to the lens control section 210 and the optical system driving section 230. Accordingly, the adapter 300 is able to appropriately supply a voltage for driving the interchangeable lens 200.

Further, the adapter 300 generates the voltage of the diaphragm driving power supply Vm by converting the voltage of the power-system power supply PWR into a voltage which is stepped up to a predetermined voltage through the DC-DC converter portion 321, and is thus able to supply a stabilized voltage to the diaphragm interlocking lever driving section 330. Furthermore, the adapter 300 generates the lens control system power supply Vc of which voltage is stabilized by stepping down the voltage of the diaphragm driving power supply Vm to a predetermined voltage through the first regulator portion 322, and is thus able to supply a voltage, which is less affected by voltage noise of the driving system, to the lens control section 210. Further, the adapter 300 generates the voltage of the lens driving system power supply Vp by converting the voltage of the power-system power supply PWR into a voltage which is stepped down to a predetermined voltage through the second regulator portion 323, and is thus able to supply a stabilized voltage to the optical system driving section 230.

Other Forms of Interchangeable Lens

Next, other forms of the interchangeable lens will be described.

The lens, which can be caused to function by connecting it to the camera body 100 through the adapter 300, is not limited to the interchangeable lens 200 described with reference to FIG. 3. Not only the interchangeable lens 200 but also various interchangeable lenses can be caused to function by connecting them to the camera body 100 through the adapter 300.

In addition, the interchangeable lens 200 described with reference to FIG. 3 has a lens control section 210 capable of communication. Thus, in the interchangeable lens, on the basis of the communication result, the lens control section 210 controls the optical system driving section 230. The interchangeable lens 200 is also referred to as a CPU (Central Processing Unit) lens in the following technique.

Non-CPU Lens

Figure 5:
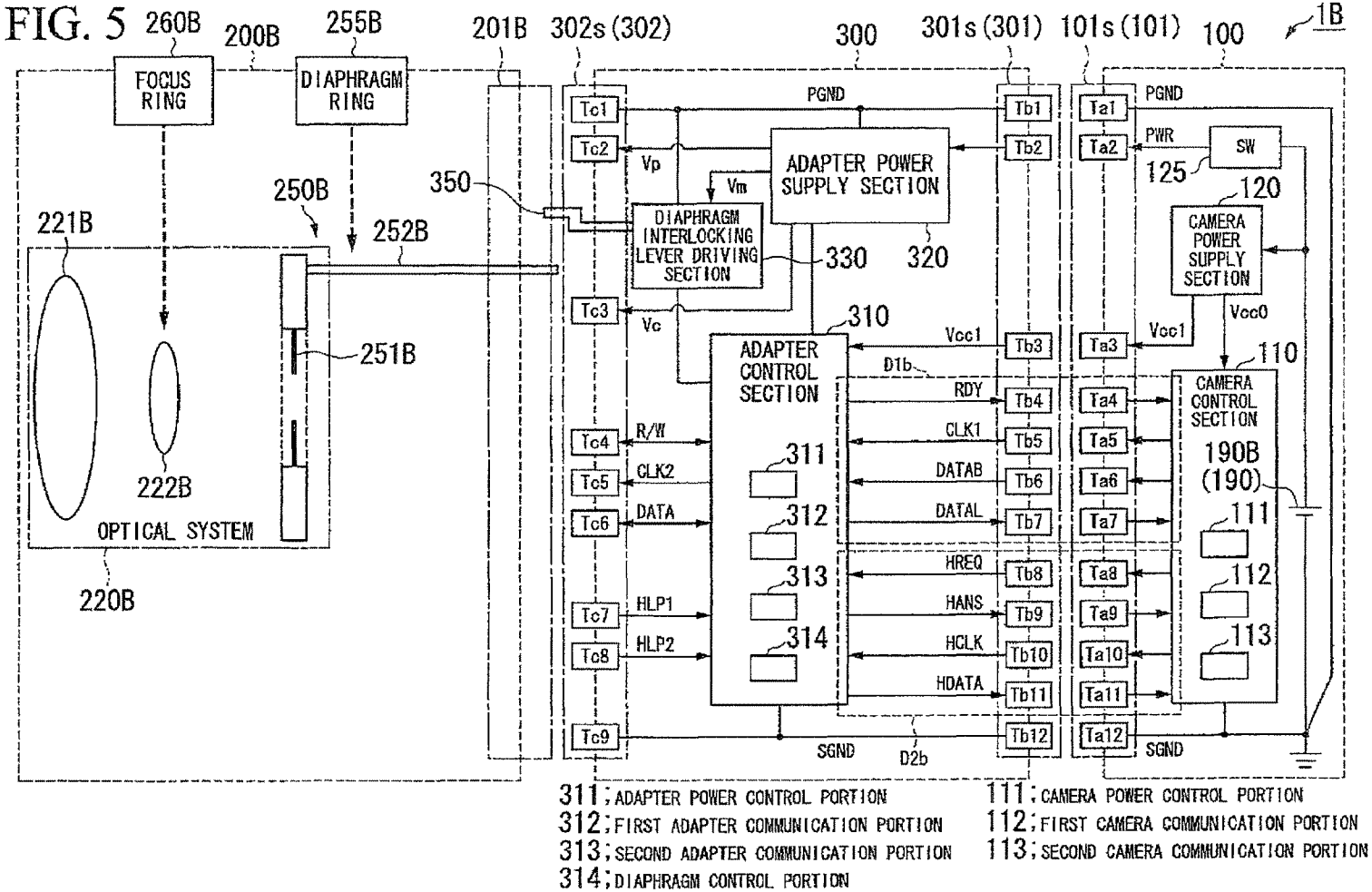
FIG. 5 is a schematic block diagram illustrating a second example of the configuration of the camera system according to the present embodiment.

On the other hand, as shown in FIG. 5, an interchangeable lens 200B, which does not have a lens control section capable of communication, may be caused to function by connecting it to the camera body 100 through the adapter 300.

FIG. 5 is a schematic block diagram illustrating an example of a configuration of a camera system 1B including the interchangeable lens 200B which does not have the lens control section capable of communication. In the drawing, the elements corresponding to the respective sections of FIG. 3 are represented by the same reference numerals and signs, and description thereof will be omitted.

In the drawing, the interchangeable lens 200B is mounted on the camera body 100 with the adapter 300 interposed therebetween.

For example, the interchangeable lens 200B is a lens with specification in which the optical system is not electrically driven, and the lens includes a focus ring 260B by which the position of the focus lens 222B can be adjusted through user's operation, and a diaphragm ring 255B by which the aperture degree of the diaphragm mechanism 251B can be changed through user's operation. Further, the interchangeable lens 200B shown in FIG. 5 is different from the interchangeable lens 200 shown in FIG. 3 in that the interchangeable lens 200B does not include the lens control section, the optical system driving section, and the electric connection terminal.

In addition, in the interchangeable lens 200B, a user operates the diaphragm ring 255B, thereby changing the diaphragm aperture diameter (aperture degree, aperture value) of the diaphragm mechanism 251B. Hence, the adapter control section 310 controls the diaphragm interlocking lever 350 so as to move it to the retractable position (a position at which the lever does not interfere with movement) as a position which does not interfere with the position of the diaphragm lever 25213 of which the position is moved by changing the diaphragm aperture diameter (aperture degree, aperture value) of the diaphragm mechanism 251B.

Thereby, the interchangeable lens 200B can be connected to the camera body 100 through the adapter 300, and can be caused to function by a manual operation in accordance with the specification of the interchangeable lens 200B.

The interchangeable lens 200B is referred to as a Non-CPU lens in the following description.

Electromagnetic-Diaphragm-Type CPU Lens

Further, as shown in FIG. 6, an electromagnetic-diaphragm-type interchangeable lens 200C, which electrically drives a diaphragm mechanism 251C, can be connected to the camera body 100 through the adapter 300.

FIG. 6 is a schematic block diagram illustrating an example of a configuration of a camera system 1C including the electromagnetic-diaphragm-type interchangeable lens 200C. In the drawing, the elements corresponding to the respective sections of FIG. 3 are represented by the same reference numerals and signs, and description thereof will be omitted.

In the drawing, the interchangeable lens 200C is mounted on the camera body 100 with the adapter 300 interposed therebetween.

The interchangeable lens 200C shown in FIG. 6 is different from the interchangeable lens 200 shown in FIG. 3 in that the interchangeable lens 200 includes the diaphragm section 250 having the diaphragm lever 252 but the interchangeable lens 200C includes an electromagnetic diaphragm section 250C having a diaphragm driving portion 233C.

For example, the interchangeable lens 200C is a lens that includes the electromagnetic diaphragm section 250C (EMD (Electro-magnetic Diaphragm). The electromagnetic diaphragm section 250C has the diaphragm mechanism 251C and the diaphragm driving portion 233C.

The diaphragm driving portion 233C performs electrical driving to change the aperture diameter (aperture size, size, aperture degree, aperture value) of the diaphragm of the diaphragm mechanism 251C through the control of the optical system control portion 211C provided in the lens control section 210C. Further, the diaphragm driving portion 233C is configured to include, for example, a diaphragm driving actuator.

In addition, in the configuration shown in the drawing, when the adapter 300 controls the diaphragm mechanism 251C, the adapter control section 310 communicates with the lens control section 210C instead of controlling the diaphragm interlocking lever driving section 330, thereby controlling the diaphragm mechanism 251C through the diaphragm driving portion 233C.

Thereby, the interchangeable lens 200C can be connected to the camera body 100 through the adapter 300, and the camera control section 110 communicates with the lens control section 210C through the adapter control section 310, whereby it is possible to cause the interchangeable lens 200C to function.

The interchangeable lens 200C is referred to as an electromagnetic-diaphragm-type CPU lens in the following description.

Standard Compatible Lens

Figure 7:
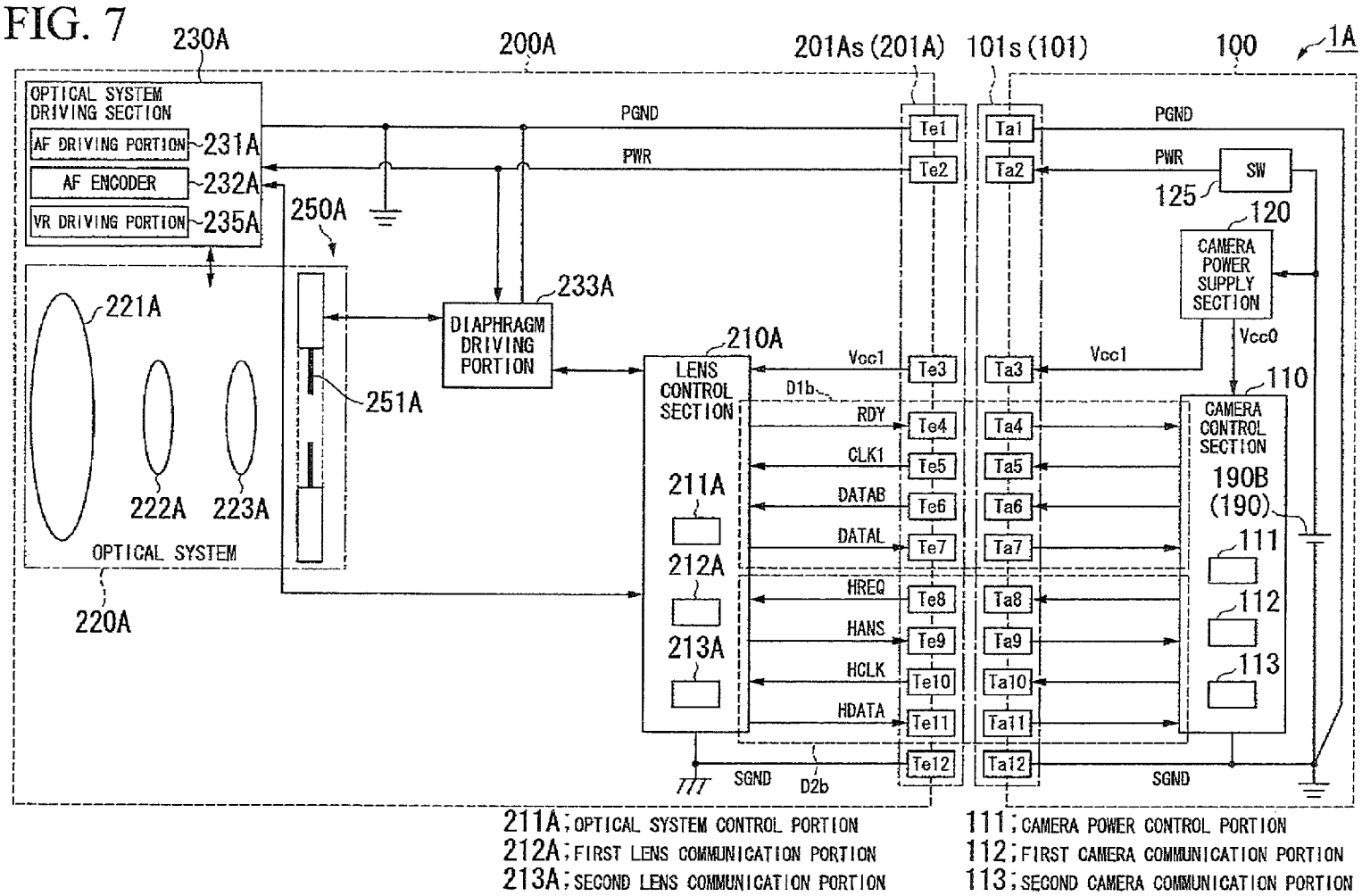
FIG. 7 is a schematic block diagram illustrating a fourth example of the configuration of the camera system according to the present embodiment.

In addition, FIG. 7 is a schematic block diagram illustrating an example of a configuration of a camera system 1A in the ease where a lens-side mount 201A of an interchangeable lens 200A and the camera body-side mount 101 of the camera body 100 are lens mounts having the same specification.

That is, the interchangeable lens 200A is a lens appropriate for the lens mount specification and the communication standard of the camera body 100, and is a lens which can be caused to function by directly connecting it to the camera body 100 without the adapter 300.

In the drawing, the elements corresponding to the respective sections of FIG. 3 or 6 are represented by the same reference numerals and signs, and description thereof will be omitted.

The respective sections of an optical system 220A and an optical system driving section 230A of FIG. 7 have the same configuration as the respective sections of the optical system 220 and the optical system driving section 230 of FIG. 3 or 6. Further, the respective sections of a diaphragm section 250A have the same configuration as the respective sections of the electromagnetic diaphragm section 250C of FIG. 6.

The specification of the lens-side mount 201A of the interchangeable lens 200A is a specification which is compatible with the camera body-side mount 101 of the camera body 100 and in which the lens can be mounted on the camera body.

A connection section 201As of the lens-side mount 201A is connection terminals which are connected to the connection terminals of the connection section 101s provided in the camera body 100, and has twelve connection terminals of terminals Te1 to Te12. The interchangeable lens 200A and the camera body 100 are connected through the connection section 201As and the connection section 101s. Thereby, the respective terminals of the terminal Te1 to Te12 of the connection section 201As are connected to the corresponding connection terminals among the respective connection terminals of the terminals Ta1 to Ta12 of the connection section 101s. In addition, the connection section 201As and the connection section 101s are electrically connected.

The terminal Te2 is connected to the terminal Ta2 of the camera body 100, and is supplied with the voltage of the power-system power supply PWR from the camera body 100. The voltage of the power-system power supply PWR supplied to the terminal Te2 is a voltage (a voltage corresponding to the voltage of the lens driving system power supply Vp supplied to the interchangeable lens 200) of the lens driving system power supply supplied to the optical system driving section 230A of the interchangeable lens 200A.

Further, the terminal Te3 is connected to the terminal Ta3 of the camera body 100, and is supplied with the voltage of the control system power supply Vcc from the camera body 100. The voltage of the control system power supply Vcc supplied to the terminal Te3 is a voltage (a voltage corresponding to the voltage of the lens control system power supply Vc supplied to the interchangeable lens 200) of the lens control system power supply supplied to the lens control section 210A of the interchangeable lens 200A.

The lens control section 210A includes an optical system control portion 211A, a first lens communication portion 212A, and a second lens communication portion 213A. The optical system control portion 211A controls the optical system driving section 230A and a diaphragm driving portion 233A of the diaphragm section 250A.

The first lens communication portion 212A and the first camera communication portion 112 performs communication of the first data communication system D1b through the signal lines for the four types of signals RDY, CLK1, DATAB, and DATAL. Further, the second lens communication portion 213A and the second camera communication portion 113 performs communication of the second data communication system D2b through signal lines for four types of signals HREQ, HANS, HCLK, and HDATA.

As described above, the interchangeable lens 200A is supplied with the voltage of the power-system power supply PWR as a voltage of the lens driving system power supply from the camera body 100, and is supplied with the voltage of the control system power supply Vcc as a voltage of the lens control system power supply. Further, the first lens communication portion 212A and the first camera communication portion 112 are based on the same communication standard, and perform command data communication. Further, the second lens communication portion 213A and the second camera communication portion 113 are based on the same communication standard, and perform hotline communication.

Thereby, the interchangeable lens 200A can be directly connected to the camera body 100 through the adapter 300, and the camera control section 110 is able to cause the interchangeable lens 200A to function by communicating with the lens control section 210A.

The interchangeable lens 200A is referred to as a standard compatible lens in the following description.

Description of State Shift

Next, processes of the present embodiment will be described.

First, referring to FIG. 8, a brief overview of the state shift according to the present embodiment will be described.

Figure 8:
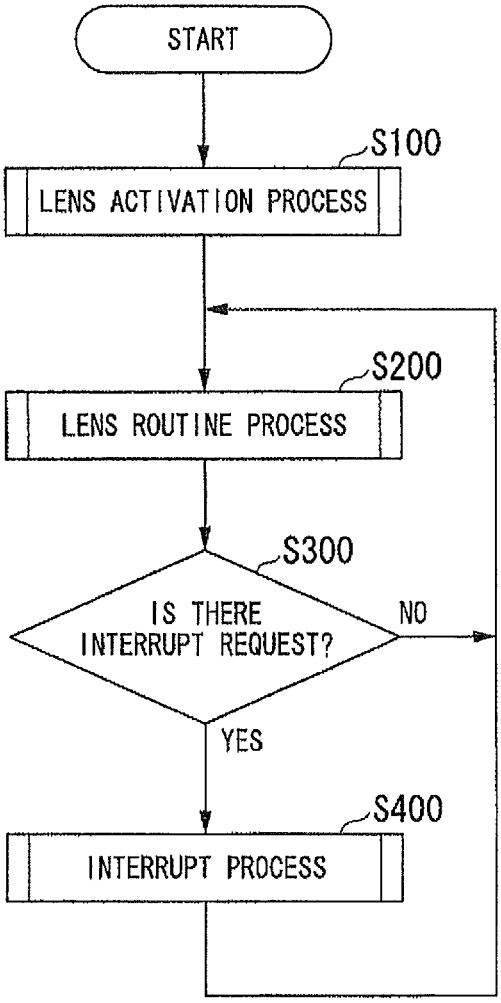
FIG. 8 is a flowchart illustrating a brief overview of a state shift between processes relating to an interchangeable lens according to the present embodiment.

FIG. 8 is a flowchart illustrating a brief overview of the state shift between the processes relating to the interchangeable lens according to the present embodiment.

First, in the camera body 100, when the main power supply of the camera body 100 is turned on, or when the adapter 300 is mounted in a state where the main power supply of the camera body 100 is turned on, the adapter 300 executes a "lens activation process" through the control of the camera body 100 (step S100).

Here, the "lens activation process" includes, for example, a process of determining detachment of the camera body-side mount 101 of the camera body 100, a process of initializing the adapter 300 and the interchangeable lens 200 mounted on the adapter 300, a process of controlling feeding a voltage to each power supply system, and the like. Further, for example, in the lens activation process, the camera body 100 acquires information on the specification (function) and the type of the interchangeable lens 200 which is mounted on the camera body 100 with the adapter 300 interposed therebetween. The lens activation process will be described in detail in the section of the "lens activation process" (FIG. 12) to be described later.

In step S100, if the lens activation process is complete, the adapter 300 shifts the process to a "lens routine process" through the control of the camera body 100 (step S200).

The "lens routine process" is, for example, a state where the photography process is possible after the lens activation process is complete. In the lens routine process, the camera body 100 performs, for example, "routine communication" by which detection of the mount state of the interchangeable lens 200 mounted thereon with the adapter 300 interposed therebetween and acquisition of the information of the optical system are performed with a predetermined period. The lens routine process will be described later with reference to FIGS. 9 and 10.

Next, the camera body 100 or the adapter 300 determines whether or not an interrupt request is issued in the lens routine process (step S300). In step S300, if it is determined that the interrupt request is absent, the adapter 300 continues the lens routine process through the control of the camera body 100. In contrast, in step S300, if it is determined that the interrupt request is present, the camera body 100 or the adapter 300 shifts the process to a requested interrupt process (step S400). Here, the interrupt process includes, for example, a process of starting photography through a release operation, a process at the time of temporary blackout of power supply, a process of advancing to a lower power consumption mode or cutting off a power supply by turning off the power supply, and the like. The processes will be described later.

In addition, in a case of directly mounting the standard compatible lens (for example, the interchangeable lens 200A) on the camera body 100 instead of mounting the adapter 300 thereon, the process state shift is as shown in FIG. 8.

Description of Command Data Communication in Lens Routine Process

Next, command data communication performed in the lens routine process (step S200 of FIG. 8) will be described.

Figure 9:
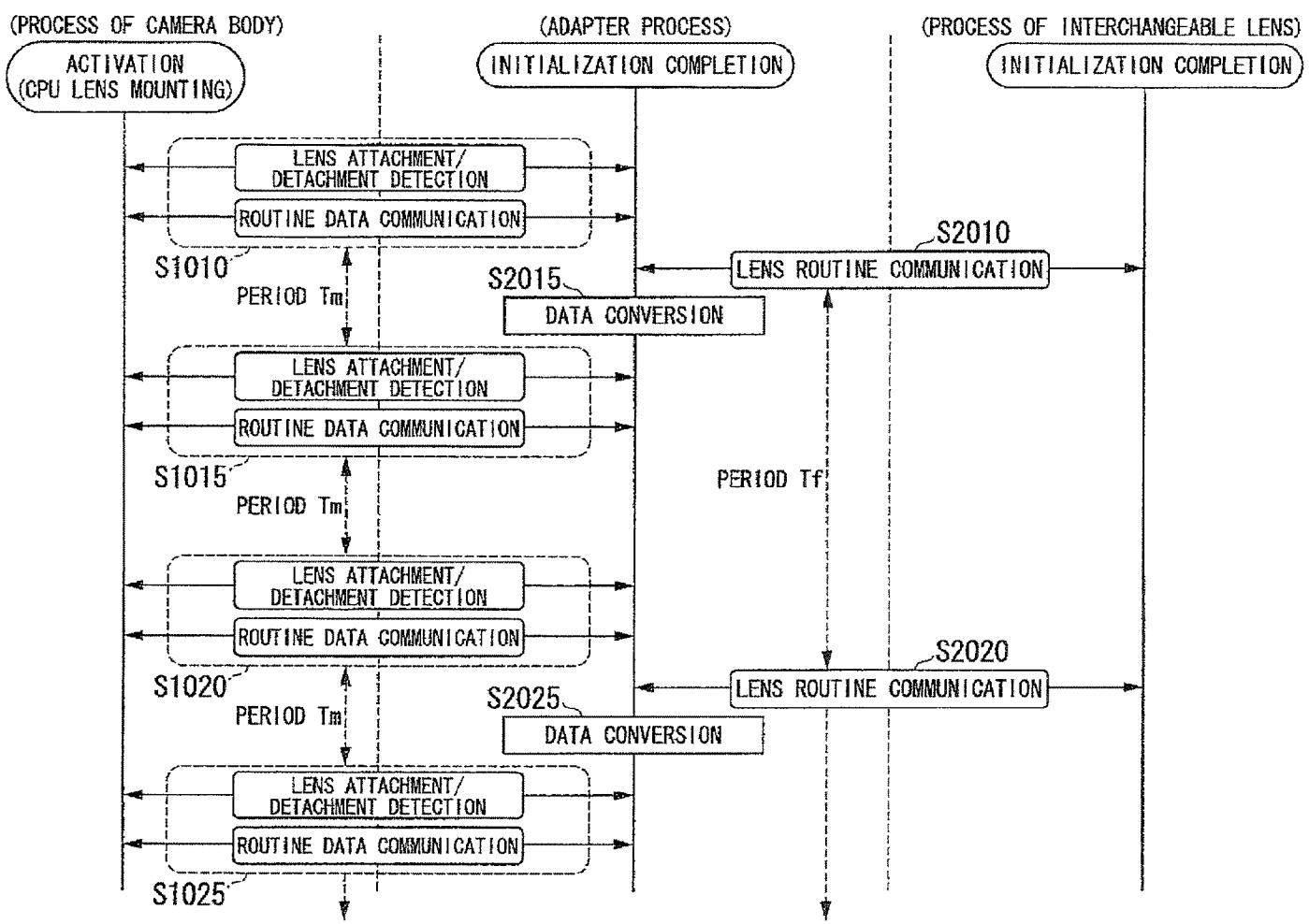
FIG. 9 is a diagram illustrating an example of a communication sequence of command data communication in a lens routine process.

FIG. 9 is a diagram illustrating an example of a communication sequence of the command data communication in the lens routine process.

The drawing shows an example of the command data communication using the exemplary camera system 1 in which the interchangeable lens 200 (CPU lens) and the camera body 100 are connected through the adapter 300. The adapter control section 310 is able to routinely perform periodic communication with the camera control section 110. By performing the periodic communication, in response to the request from the camera control section 110, the adapter control section transmits the lens information (the information of the optical system 220 and the like), which is acquired from the lens control section 210, to the camera control section 110.

For example, in the "lens routine process" shown in FIG. 9, the first adapter communication portion 312 asynchronously performs first regular communication to communicate with the lens control section 210 provided in the interchangeable lens 200 in a period Tf (first communication period), and second regular communication to communicate with the camera control section 110 provided in the camera body 100 in a period Tm (second communication period).

The first adapter communication portion 312 performs the communication of the first data communication system D1L (first regular communication) to communicate with the first lens communication portion 212 in the period Tf (for example, a period for each 64 msec) (steps S2010 and S2020).

Here, the communication of the first data communication system D1L (first regular communication) in the lens routine process is referred to as "lens routine communication". Through the lens routine communication, the first adapter communication portion 312 acquires lens information (information of the optical system 220 and the like (first information)) from the first lens communication portion 212.

Further, the first adapter communication portion 312 generates, lens information (information of the optical system 220 and the like (second information)) to be transmitted to the first camera communication portion 112 on the basis of the lens information acquired in step S2010 (step S2015). For example, the first adapter communication portion 312 performs data conversion on data of the lens information (information of the optical system 220 and the like) acquired in step S2010 so as to make it appropriate for the communication standard of the first data communication system D1b, and generates information to be transmitted to the first camera communication portion 112.

Likewise, the first adapter communication portion 312 generates information to be transmitted to the first camera communication portion 112 through data conversion on the basis of the lens information (information of the optical system 220 and the like) acquired in step S2020 (step S2025).

That is, the first adapter communication portion 312 generates the lens information (information of the optical system 220 and the like) to be transmitted to the first camera communication portion 112 in accordance with communication timing (communication timing of the period Tf) of the lens routine communication.

Regarding the above-mentioned communication of the first data communication system D1L, the first adapter communication portion 312 performs the communication of the first data communication system D1b (second regular communication) with the first camera communication portion 112 in the period Tm (for example, a period for each 16 msec) which is asynchronous to the communication (first regular communication) period Tf with the interchangeable lens 200 in the first data communication system D1L (steps S1010, S1015, S1020, and S1025). The communication period Tm is a communication period with a speed higher than that of the communication period Tf.

Here, the communication of the first data communication system D1b (second regular communication) in the lens routine process is referred to as "routine communication". The routine communication includes a lens attachment/detachment detection process (lens attachment/detachment detection) and a routine data communication process (hereinafter referred to as "routine data communication").

The lens attachment/detachment detection process of each step is a process in which the first adapter communication portion 312 responds with the detection result to the lens attachment/detachment detection instruction command issued from the first camera communication portion 112. The first adapter communication portion 312 detects the detachment of the interchangeable lens 200 on the basis of whether or not the response of the lens routine communication from the first lens communication portion 212 is present, and transmits the detection result to the first camera communication portion 112.

The routine data communication of each step is a communication process in which the first camera communication portion 112 acquires the lens information (information of the optical system 220 and the like) generated by the first adapter communication portion 312. That is, in the routine data communication, the first camera communication portion 112 transmits a request command for requesting transmission of the lens information (information of the optical system 220 and the like) to the first adapter communication portion 312, and executes a process of receiving (acquiring) the lens information (information of the optical system 220 and the like) from the interchangeable lens 200 through the adapter 300, in accordance with the response (the transmission from the adapter to the camera side) from the first adapter communication portion 312 which receives the command. Since the request command is periodically transmitted in the routine data communication, the first camera communication portion 112 repeatedly performs the acquisition (reception) operation of the lens information whenever the routine data communication is performed. For example, the first camera communication portion 112 acquires, through the routine data communication of step S1010, the lens information (second information) which is generated on the basis of the lens information (information of the optical system 220 and the like; first information) acquired by the first adapter communication portion 312 before the lens routine communication of step S2010. Further, the first camera communication portion 112 acquires, through the routine data communication of steps S1015 and S1020, the lens information (second information) which is generated on the basis of the lens information (information of the optical system 220 and the like; first information) acquired by the first adapter communication portion 312 in the lens routine communication of step S2010. Further, the first camera communication portion 112 acquires, through the routine data communication of step S1025, the lens information (second information) which is generated on the basis of the lens information (information of the optical system 220 and the like) acquired by the first adapter communication portion 312 in the lens routine communication of step S2020.

That is, the first adapter communication portion 312 transmits (responds with) the lens information which is generated as described above, to the first camera communication portion 112 in the period Tm of the routine data communication.

As described above, in the command data communication, the adapter control section 310 generates the lens information (second information) to be transmitted to the camera control section 110, on the basis of the lens information (information of the optical system 220 and the like; first information) acquired from the interchangeable lens 200 by the lens routine communication of the period Tf. Further, the adapter control section 310 transmits the generated lens information (second information) to the camera control section 110 through the routine data communication of the period Tm.

Thereby, the adapter control section 310 is able to smoothly and reliably transmit, without delay, the lens information which is acquired and generated through the lens routine communication of the period Tf, to the camera control section 110 through the routine data communication of the period Tm which is asynchronous to the period Tf.

Accordingly, by communicating with the camera control section 110, the adapter control section 310 is able to transmit the lens information which is acquired from the lens control section 210, to the camera control section 110 without delay, in response to the request from the camera control section 110.

In addition, referring to FIG. 9, the description was given of the process in which the first adapter communication portion 312 generates the lens information (information of the optical system 220 and the like) to be transmitted to the first camera communication portion 112 in accordance with the communication timing (communication timing of the period Tf) of the lens routine communication, but the present invention is not limited to this. For example, the first adapter communication portion 312 may generate the lens information (information of the optical system 220 and the like) to be transmitted to the first camera communication portion 112, in accordance with the communication timing (communication timing of the period Tm) of the routine data communication.

Thereby, the adapter control section 310 generates the lens information to be transmitted to the camera control section 110 in accordance with the timing of the period Tm, which is asynchronous to the period Tf, from the lens information (information of the optical system 220 and the like) acquired through the lens routine communication of the period Tf, and is able to transmit the generated lens information to the camera control section 110 through the routine data communication.

Further, referring to FIG. 9, the description was given of the process in which the period Tf of the communication between the first adapter communication portion 312 and the lens control section 210 is asynchronous to the period Tm of the communication between the first adapter communication portion 312 and the camera control section 110, but in the process, the period Tf and the period Tm may be synchronous to each other.

Description of Lens Routine Communication

Specifically, in the "lens routine communication" which is communication with the period Tf, the communication is divided into a plurality of communications (for example, eight communications; the time necessary for a single communication is about 8 ms), and the communications are performed in a single period (for example, a period of 64 ms). The plurality of communications includes: a communication which is performed in order for the first adapter communication portion 312 to acquire information from the lens control section 210; and a communication through which information (setting instruction) is output from the first adapter communication portion 312 to the lens control section 210.

The first adapter communication portion 312 communicates with the first lens communication portion 212 a plurality of times in the lens routine communication, thereby acquiring the (information of the optical system 220, information of the diaphragm section 250, and the like; first information) from the first lens communication portion 212 for each time. Further, the first adapter communication portion 312 generates lens information to be transmitted to the first camera communication portion 112 through the routine data communication, on the basis of a plurality of lens informations, which are acquired through communications different from one another, among the lens informations which are acquired through the plurality of communications. Then, the first adapter communication portion 312 transmits the generated lens information (second information) to the first camera communication portion 112, in response to the request from the first camera communication portion 112.

Figure 10:
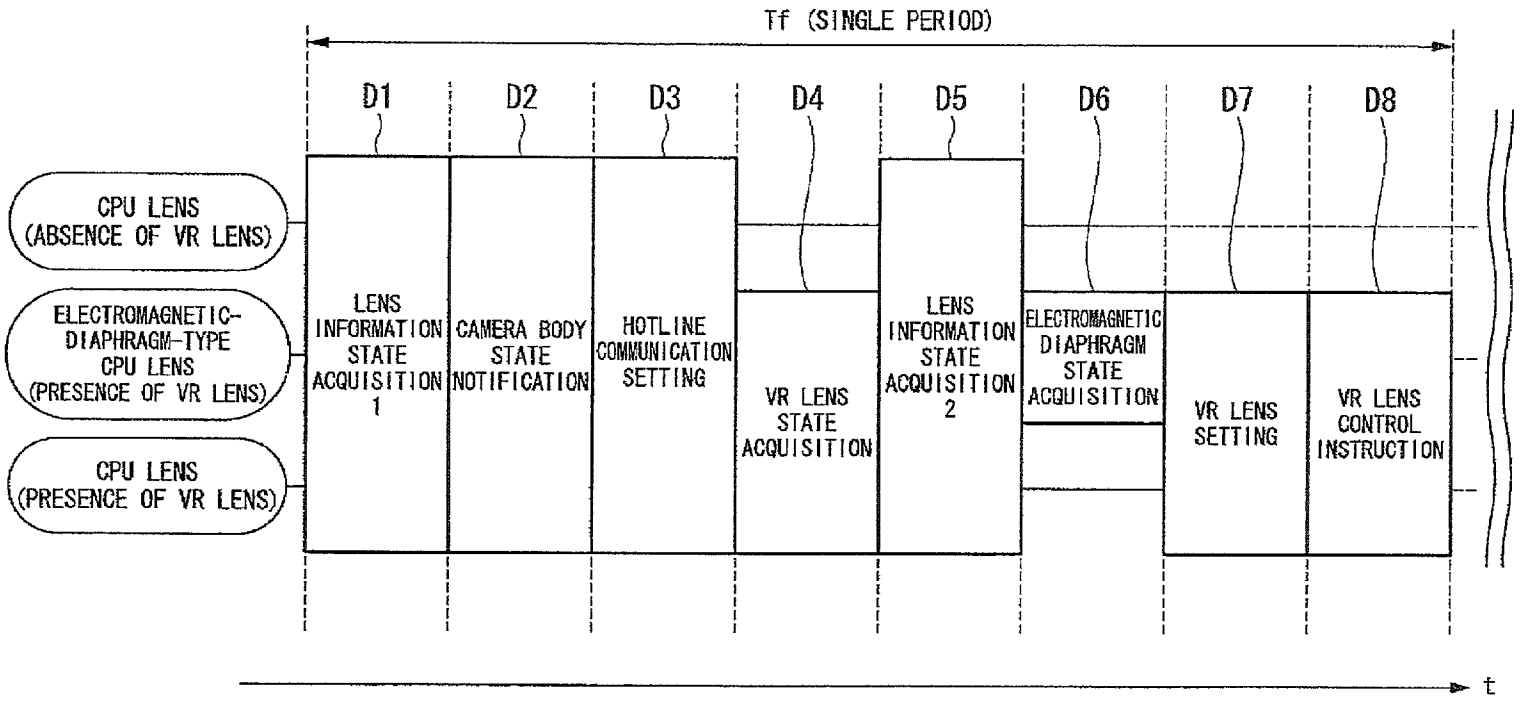
FIG. 10 is a diagram illustrating an example of communication commands which are divisionally communicated through a plurality of communications in a single period of lens routine communication.

FIG. 10 is a diagram illustrating an example of communication commands which are divisionally communicated through the plurality of communications in a single period of the lens routine communication.

As shown in the drawing, in the lens routine communication, for example, communication commands D1 to D8 to transmit and receive the communication data are provided, and are sequentially communicated during a time period of the single period of the lens routine communication. In the example shown in the drawing, during the time period of the single period, by sequentially communicating the communication commands D1 to D8 of the lens routine communication, the eight communications are performed.

In addition, in the communication commands D1 to D8 to transmit or receive the communication data in the lens routine communication, the following commands are present: a command to cause the adapter 300 side to acquire the lens information on the interchangeable lens 200 from the interchangeable lens 200 side; and a command to send information or instruction (setting instruction) from the adapter 300 side to the interchangeable lens 200 side. As the command to acquire the information on the interchangeable lens 200, for example, there are provided: the communication commands D1, D4, and D5 to communicate the information of the optical system 220 and the information indicating the driving status; and the communication command D6 to acquire the information on the electromagnetic diaphragm.

Further, as the command to send information or instruction (setting instruction) from the adapter 300 side to the interchangeable lens 200 side, there are provided: the communication command D2 to communicate the information (for example, information indicating whether or not the release button is pressed halfway) which indicates the operation state of the camera body 100; the communication command D3 to communicate the setting information (setting instruction) of the hotline communication; and the communication commands D7 and D8 to communicate the instructions (setting instruction) for vibration-proof control (control of the VR lens 223). In addition, the respective functions of the interchangeable lenses are different in accordance with respective specifications of the interchangeable lenses (the interchangeable lens 200 or other interchangeable lenses). Hence, the communication command, which is selected among the communication commands D1 to D8 in accordance with the specification (function) of the interchangeable lens (in accordance with the class or the type of the interchangeable lens), is communicated.

For example, by checking the specification (function) of the interchangeable lens such as presence or absence of the VR lens 223 (presence or absence of the vibration-proof function) or presence or absence of the electromagnetic diaphragm function, an unnecessary communication command is not communicated.

That is, the first adapter communication portion 312 acquires the information of the optical system 220 by dividing the information into a plurality of informations through the plurality of communications, and generates the information of the optical system 220 as unified information corresponding to the plurality of informations divisionally acquired.

The information which corresponds to the plurality of informations is information into which the plurality of informations is data-converted in accordance with the communication standard and the like.

The first adapter communication portion 312 sequentially communicates the eight types of the communication commands D1 to D8 in the single period of the lens routine communication (as described above, among them, the four types of communication commands D2, D3, D7, and D8 are commands to communicate information and instructions to the interchangeable lens 200 side, and the remaining four types of the communication commands D1, D4, D5, and D6 are commands to acquire the information from the interchangeable lens 200). Thereby, the communication portion acquires (receives) the information on the optical system 220, the information on the diaphragm section 250, and the various kinds of the other lens information by dividing them into the four types of informations (by divisionally communicating them in four times), and divisionally transmits four types of information instructions to the interchangeable lens 200.

Further, the first adapter communication portion 312 generates the information of the optical system 220 to be transmitted to the first camera communication portion 112, on the basis of the information which is divisionally acquired for each of the four communications in the single period. Here, regarding the information of the lens (for example, the optical system 220) generated by the first adapter communication portion 312 in the single period (in other words, the information to be transmitted to the first camera communication portion 112), each information divisionally acquired is not generated for each reception of the communications and transmitted to the camera body 100. Instead, on the basis of all the informations divisionally received in the single period (in the present embodiment, all the lens informations divisionally received in four times), the lens information to be transmitted is generated, and the generated lens information is transmitted to the camera body 100. That is, the lens information to be transmitted to the camera body 100 is not only the respective informations, which are divisionally acquired, but also the information in which all the four types of the informations received (four times) are collected (unified in order to be transmitted to the camera body 100) (in other words, the adapter 300 does not divisionally transmit the respective lens informations, which are divisionally received four times in the interchangeable lens 200, to the camera body 100 through the respective four communications, but transmits them to the camera body 100 once). With such a configuration, it is possible to suppress the frequency of communications between the adapter 300 and the camera body 100. Thus, it is possible to reduce the processing load to both control sections (the adapter control section 310 and the camera control section 110).

In addition, the first adapter communication portion 312 generates, in a prescribed format, the lens information (information of the optical system 220), which is to be transmitted to the first camera communication portion 112 through the "routine data communication" (refer to FIG. 9), on the basis of the lens information (for example, the information of the optical system 220) which is acquired through the "lens routine communication" (refer to FIG. 9).

Here, the prescribed format is a format which is prescribed by the communication standard of the command data communication of the first data communication system D1b between the first adapter communication portion 312 and the first camera communication portion 112, and is also a format in which the data configuration to transmit the information of the optical system 220 and the like are prescribed. For example, the data configuration of information indicating the type of the optical system 220, information indicating the driving status of the focus lens 222, information indicating the driving status of the VR lens 223, and the like, as the information of the optical system 220, is prescribed.

As described above, the first adapter communication portion 312 converts the lens information (information of the optical system 220), which is acquired as the plurality of informations divided through the plurality of communications in the "lens routine communication", into the (singly unified) information in which they are unified in the prescribed format, and transmits the information through the single communication in the "routine data communication". That is, the first adapter communication portion 312 converts communication data, which is transmitted and received in the communication format of the "lens routine communication", into communication data which is transmitted and received in the communication format of the "routine data communication".

Accordingly, the adapter 300 is provided between the camera body 100 and the interchangeable lens 200 having mutually different communication standard, and is thereby able to acquire the information of the optical system 220 of the interchangeable lens 200 and transmit the information to the camera body 100.

The embodiment described an example in which all the lens informations, which are divisionally acquired a plurality of times, are unified, and the unified information is transmitted to the camera body 100, but not all of them may be used.

For example, by selecting some (for example, two or three) of the informations which are received a plurality of times (in the above description, four times), the selected informations may be unified and transmitted.

Further, the adapter 300 is configured to transmit the lens information which is acquired from the lens 200, in combination with the contents to be transmitted (so as to be appropriate for the request from the camera body 100) not only in accordance with the communication format of the "routine data communication" but also in response to the request command from the camera body 100 (on the basis of the analysis of the request command). Therefore, the adapter is compatible with various request commands from the camera body 100.

Communication Process of Detecting Driving Status of Driving Element (or Optical System Driving Section) of Interchangeable Lens Next, the communication process of the driving status of the driving element (the optical system 220 or the diaphragm section 250) or the optical system driving section 230 of the interchangeable lens 200 will be described.

The adapter control section 310 receives the control command output from the camera control section 110 (for example, the first reception section of the first adapter communication portion 312 performs the reception), and transmits a lens control command, depending on the contents (the contents received by the first reception section) of the received control command, for controlling the driving of the optical system driving section 230 (in other words, the driving element such as the optical system 220 or the diaphragm section 250 in the interchangeable lens 200), to the lens control section 210 (for example, the first transmission section of the first adapter communication portion 312 performs the transmission). Further, after transmitting the corresponding lens control command, the adapter control section 310 receives status information which indicates the driving status of the optical system driving section 230, from the lens control section 210 (for example, the second reception section of the first adapter communication portion 312 performs the reception), and on the basis of the received contents (the contents received by the second reception section), transmits the status information which indicates the driving status of the driving element, to the camera control section 110 (for example, the second transmission section of the first adapter communication portion 312 performs the transmission).

That is, after transmitting the lens control command for the optical system driving section 230 to the lens control section 210, the adapter control section 310 receives the status information which indicates the driving status of the optical system driving section 230, from the lens control section 210, and then transmits the status information to the camera control section 110.

However, when transmitting a lens control command (first lens control command) for an instruction to start driving the driving element to the lens control section 210 (for example, when performing the transmission from the first transmission section), the adapter control section 310 transmits, regardless of the reception of the second reception section, the status information which indicates that the driving of the driving element is in progress, to the camera control section 110 (performs the transmission from the second transmission section).

For example, when receiving the lens control command to start the driving from the adapter control section 310, the lens control section 210 drives the optical system driving section 230 in response to the instruction of the corresponding control command. Further, the lens control section 210 transmits, in response to the driving start of the optical system driving section 230, status information which indicates that "the driving of the driving element in the interchangeable lens 200 is in progress", to the adapter control section 310.

Here, the adapter control section 310 may be configured to wait for the reception of the status information from the lens through the lens routine communication, and then transmit the received status information to the camera control section 110 through the routine data communication. In such a configuration, regarding timing at which the driving of the optical system driving section 230 is started (that is, the driving is in progress), sometimes it may take time until the status information indicating that the driving is in progress is transmitted to the camera control section 110 (the timing of the reception by the camera control section 110 may be delayed).

The reason is that the lens routine communication and the routine data communication are asynchronous to each other and the communications are performed in mutually different periods. Further, another reason is that, in order for the adapter control section 310 to relay communication between the lens routine communication and the routine data communication as communication standards different from each other, a data conversion process is necessary.

As described above, in the adapter control section 310, there is a time lag between the timing of the driving start of the optical system driving section 230 and the timing of the reception of the status information which indicates that "the driving is in progress", by the camera control section 110. That is, in the camera control section 110, even though the driving of the optical system driving section 230 is already in progress, there is a time period in which it is difficult to receive the status information which indicates that "the driving is in progress".

In order to reduce the above-mentioned time lag, the adapter control section 310 transmits the lens control command (first lens control command) to start the driving of the optical system driving section 230 to the lens control section 210 (for example, performs the transmission from the first transmission section), and then (immediately thereafter) transmits the status information (the status information which indicates the "driving-in-progress" status), which indicates that the driving is already in progress, to the camera control section 110 without waiting for the response (the response of the status information which indicates the driving status of the driving element) from the lens control section 210 (for example, without waiting for the reception by the second reception section).

In addition, the adapter control section 310 according to the present embodiment is configured to transmit the lens control command, which indicates the above-mentioned driving start, to the lens control section 210, and then transmit the status information which indicates that "the driving is in progress", to the camera control section 110. Regarding this sequence, for example, the operation sequence of the adapter control section 310 may be improved such that the above-mentioned lens control command is transmitted to the lens control section 210 and the "driving-in-progress" status information is transmitted to the camera control section 110.

On the other hand, when the driving of the optical system driving section 230 is stopped, the adapter control section 310 acquires the response (status information), which indicates that the optical system driving section 230 is in a stopped state, from the lens control section 210, and then transmits the status information which indicates the "driving stop status", to the camera control section 110. That is, when stopping the driving of the optical system driving section 230, the adapter control section 310 checks the actual stopped state (receives the response, which indicates the intent thereof, from the lens control section 210), and then responds with the intent to the camera control section 110.

Figure 11:
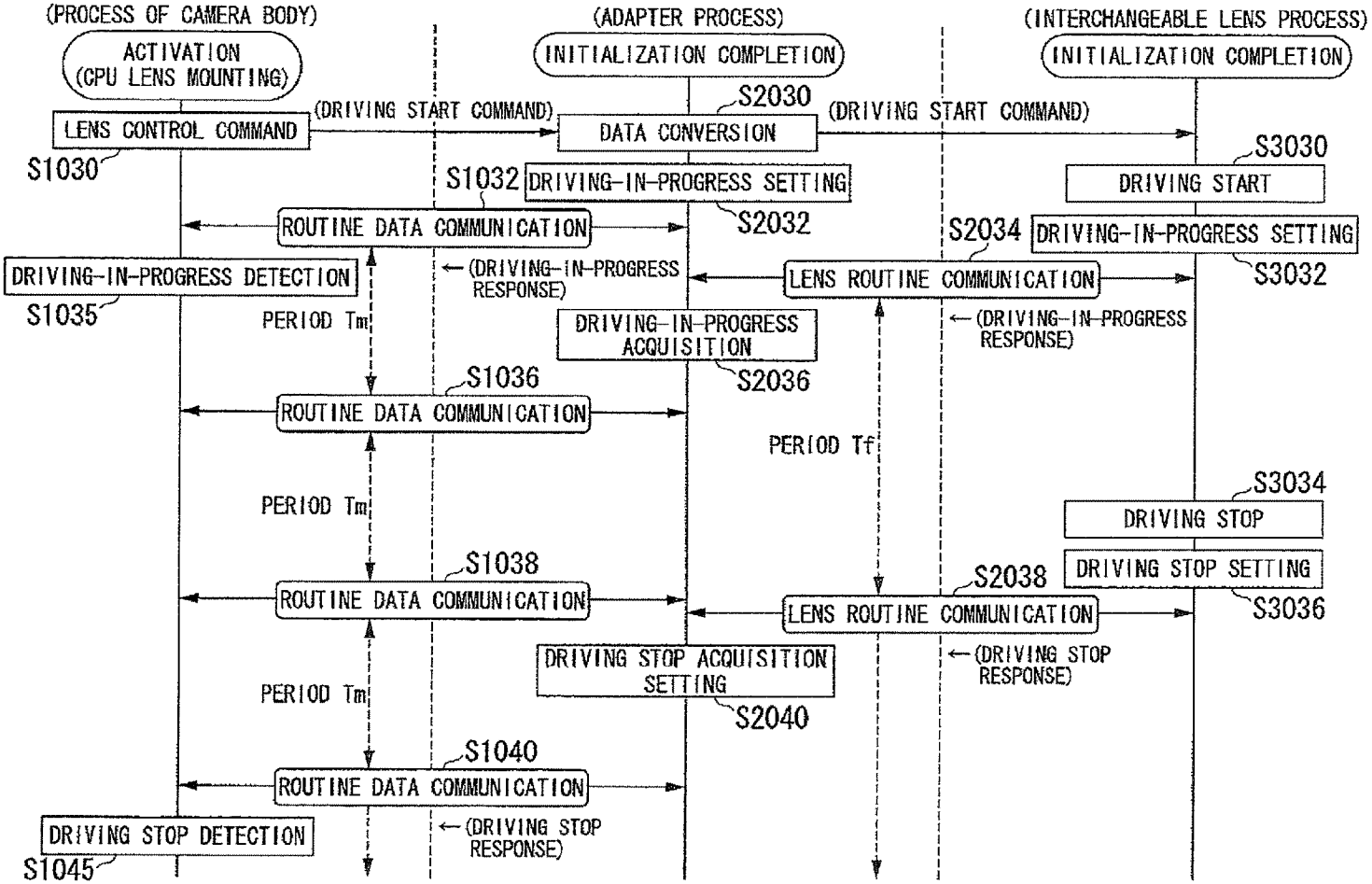
FIG. 11 is a diagram illustrating an example of a communication sequence for detecting a driving status of an optical system driving section.

FIG. 11 is a diagram illustrating an example of the communication sequence for detecting the driving status of the optical system driving section 230 (or the above-mentioned driving element).

Referring to the drawing, a description will be given of a process in which the adapter control section 310 communicates the driving status of the optical system driving section 230 (or the above-mentioned driving element).

In addition, the first camera communication portion 112 performs the routine data communication with the first adapter communication portion 312 in the period Tm (steps S1032, S1036, S1038, and S1040). Further, the first adapter communication portion 312 performs the lens routine communication with the first lens communication portion 212 in the period Tf (steps S2034 and S2038).

First, when the camera control section 110 controls the optical system driving section 230 provided in the interchangeable lens 200, the first camera communication portion 112 transmits a lens control command to control the optical system driving section 230 to the first adapter communication portion 312 (step S1030). For example, the first camera communication portion 112 transmits a lens control command (driving start command) to move the position of the focus lens 222 to a target position.

Next, the first adapter communication portion 312 converts the received lens control command (driving start command) into a lens control command (driving start command) to be transmitted to the first lens communication portion 212, and transmits the converted lens control command (driving start command) to the first lens communication portion 212 (step S2030). Further, after transmitting the lens control command to the first lens communication portion 212, the first adapter communication portion 312 sets the driving status to "driving in progress" without detecting the driving status of the optical system driving section 230 (step S2032). For example, in response to the lens control command to the position of the focus lens 222 to the target position, the first adapter communication portion 312 sets the status information which indicates the driving status of the focus lens 222, to "driving in progress".

The first adapter communication portion 312 responds with the status information which is set to "driving in progress", to the first camera communication portion 112 through the routine data communication (step S1032). The first camera communication portion 112 detects that the status information is "driving in progress" through the routine data communication of step S1032 (step S1035).

Further, the first lens communication portion 212 receives the lens control command which is transmitted from the first adapter communication portion 312 in step S2030. The optical system control portion 211 of the lens control section 210 controls the optical system driving section 230 such that it starts the driving thereof on the basis of the lens control command (driving start command) (step S3030). For example, in response to the lens control command to the position of the focus lens 222 to the target position, the optical system control portion 211 controls the optical system driving section 230 such that it starts driving the focus lens 222.

Furthermore, in response to the driving start of the focus lens 222 through the control of the optical system driving section 230, the optical system control portion 211 sets the status information provided in the interchangeable lens 200 to "driving in progress" which indicates that the driving status of the focus lens 222 is driving in progress (step S3032).

Next, the first lens communication portion 212 responds with the "driving-in-progress" status information which is set by the optical system control portion 211 in step S3032 through the lens routine communication (step S2034). Then, the first adapter communication portion 312 acquires the "driving-in-progress" status information which is the response transmitted through the lens routine communication (step S2036). In addition, in step S2036, the first adapter communication portion 312 acquires only the "driving-in-progress" status information, and does not perform transmission to the first camera communication portion 112.

Subsequently, when shift of the focus lens 222 to the target position is complete, the optical system control portion 211 controls the optical system driving section 230 such that it stops driving the focus lens 222 (step S3034). Further, in response to the stopping of the driving, the optical system control portion 211 sets the status information which is provided in the interchangeable lens 200, to "driving stop" which indicates that the driving status of the focus lens 222 is a driving stop status (step S3036).

Next, the first lens communication portion 212 responds with the "driving stop" status information which is set by the optical system control portion 211 in step S3036, through the lens routine communication (step S2038). Then, the first adapter communication portion 312 acquires the "driving stop" status information which is the response transmitted through the lens routine communication (step S2040).

The first adapter communication portion 312 responds with the status information which is set to "driving stop", to the first camera communication portion 112 through the routine data communication (step S1040). The first camera communication portion 112 detects that the status information is "driving stop" through the routine data communication of step S1040 (step S1045).

As described above, the first adapter communication portion 312 transmits a control command to start driving the optical system driving section 230 to the first lens communication portion 212, then does not wait for the response from the first lens communication portion 212, and transmits the status information (status information which indicates that the driving is in progress), which indicates the driving status, to the first camera communication portion 112.

Further, when the driving of the optical system driving section 230 is stopped, the first adapter communication portion 312 acquires the response, which indicates that the optical system driving section 230 is in the stopped state, from the first lens communication portion 212, and transmits the status information which indicates the driving status, to the first camera communication portion 112.

Thereby, the first adapter communication portion 312 is able to reduce the time lag between the timing of the driving start of the optical system driving section 230 and the timing of the reception of the status information which indicates that the driving is in progress, by the first camera communication portion 112.

Accordingly, in the first camera communication portion 112, even though the driving of the optical system driving section 230 is in progress, it is possible to eliminate the time period in which it is difficult to receive the status information indicating that the driving is in progress. Further, when the driving of the optical system driving section 230 is stopped, the first adapter communication portion 312 detects that the driving is in the stopped state, and is then able to transmit the status information to the first camera communication portion 112.

Lens Activation Process

Next, a lens activation process (the process of step S100 in FIG. 8) will be described.

First, a brief overview of the lens activation process will be given.

When the supply of the voltage of the control system power supply Vcc1 from the camera body 100 is started (after the power feeding from the control system power supply Vcc1 to the adapter control section 310 is started), the adapter control section 310 transmits a power-system power supply PWR request signal, which is for requesting the supply start of the voltage of the power-system power supply PWR, to the camera body 100. That is, the adapter control section 310 is supplied with the voltage of the control system power supply Vcc1 from the camera body 100, and then transmits the power-system power supply PWR request signal, which is for requesting start of the power feeding from the power-system power supply PWR, to the camera body 100.

Further, the adapter control section 310 causes the adapter power supply section 320 to generate the voltage of the lens control system power supply Vc and the voltage of the lens driving system power supply Vp for supplying a voltage to the interchangeable lens 200 from the voltage of the power-system power supply PWR which is supplied from the camera body 100 in response to the power-system power supply PWR request signal. In addition, after the power feeding from the power-system power supply PWR is started, the adapter control section 310 causes the adapter power supply section 320 to generate the voltage of the lens driving system power supply Vp and the voltage of the lens control system power supply Vc, and supplies them to the interchangeable lens 200.

For example, after the power feeding to the adapter power supply section 320 from the power-system power supply PWR is started, the adapter control section 310 supplies the voltage of the lens control system power supply Vc from the adapter power supply section 320 to the interchangeable lens 200 (starts the power feeding from the lens control system power supply Vc). Subsequently, after the voltage of the lens control system power supply Vc is supplied from the adapter power supply section 320 to the interchangeable lens 200, the adapter control section 310 supplies the voltage of the lens driving system power supply Vp to the interchangeable lens 200.

Specifically, in response to the supply of the voltage of the lens control system power supply Vc to the interchangeable lens 200, when receiving the lens driving system power supply Vp request signal which indicates the request to start the supply of the voltage of the lens driving system power supply Vp from the interchangeable lens 200, the adapter control section 310 supplies the voltage of the lens driving system power supply Vp from the adapter power supply section 320 to the interchangeable lens 200.

Further, after the supply of the voltage of the control system power supply Vcc1 from the camera body 100 is started, the adapter control section 310 executes an initialization process in response to the control instruction from the camera control section 110. For example, the adapter control section 310 executes the process of initializing the status of the interchangeable lens 200 as the initialization process (makes a request for the interchangeable lens 200). That is, after the power feeding to the interchangeable lens 200 is performed (the power of the lens system power supply system is supplied to the interchangeable lens 200), the adapter control section 310 executes the process of initializing the status of the interchangeable lens 200 (makes a request for the interchangeable lens 200).

Further, the process of initializing the status of the interchangeable lens 200 includes a lens control section initialization process of initializing the lens control section 210.

For example, by feeding a voltage to the interchangeable lens 200 through the initialization process, the adapter control section 310 detects whether or not the interchangeable lens 200 is mounted on the adapter 300. Then, after detecting whether or not the interchangeable lens 200 is mounted on the adapter 300, the adapter control section 310 executes the lens control section initialization process of initializing the lens control section 210.

Next, details of the lens activation process of the camera system 1 will be described.

Figure 12:
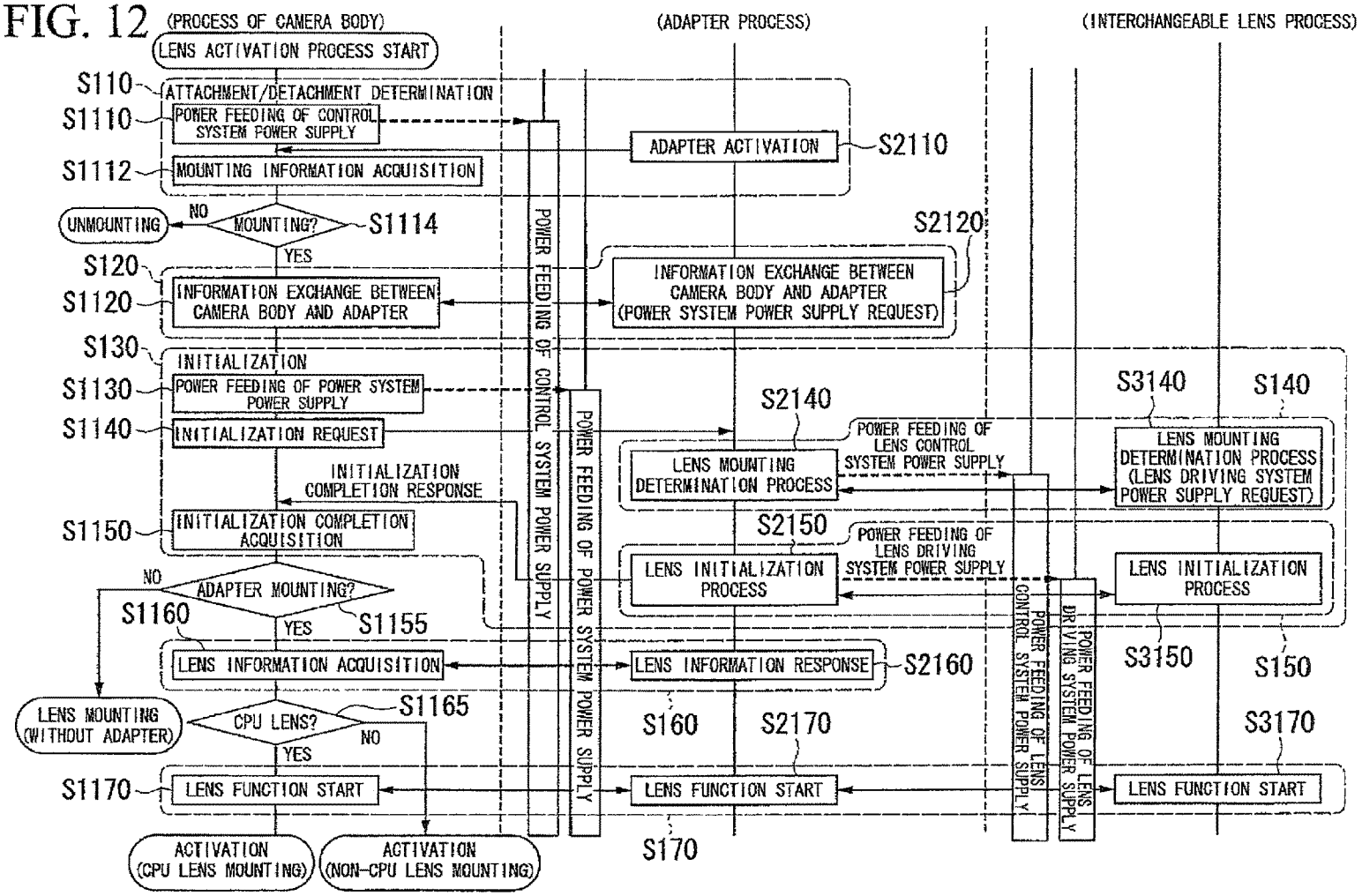
FIG. 12 is a diagram illustrating an example of a process sequence of a lens activation process.

FIG. 12 is a diagram illustrating an example of a process sequence of the lens activation process. The drawing shows an example of the lens activation process in a case where the main power supply of the camera body 100 is turned on.

The lens activation process is performed in the order of attachment/detachment determination (step S110), information exchange between the camera body 100 and the adapter 300 (step S120), initialization (step S130), lens information acquisition (step S160), and lens function start (step S170). Further, in the initialization (step S130), as processes which are performed on the interchangeable lens 200 by the adapter 300, a mounting determination process (step S140) and a lens initialization process (step S150) are sequentially executed.

In addition, in the activation process, communication, which is performed between the camera body 100 and the interchangeable lens 200 through the adapter 300, is the command data communication.

First, the attachment/detachment determination (step S110) is a process in which the camera body 100 starts feeding a voltage of the control system power supply Vcc1 to the adapter 300 and determines whether the adapter 300 (or the interchangeable lens 200A) is mounted.

When the main power supply of the camera body 100 is turned on, the camera control section 110 controls the camera power supply section 120 such that it supplies (feeds) the voltage of the control system power supply Vcc1 to the adapter 300 (step S1110). Thereby, the adapter control section 310 is supplied with the voltage of the control system power supply Vcc1. The adapter control section 310 performs the adapter activation process in response to the supply of the voltage of the control system power supply Vcc1, and notifies whether or not to perform communication to the first camera communication portion 112 from the first adapter communication portion 312 (step S2110). For example, in response to the supply of the voltage of the control system power supply Vcc1, the first adapter communication portion 312 controls the signal RDY such that it is set to the H (high) level, and controls the signal RDY such that it is set to the L (low) level through the adapter activation process. Then, the first camera communication portion 112 detects the falling edge of the signal level of the signal RDY, thereby acquiring mount information (step S1112).

Thereby, the camera control section 110 performs attachment/detachment determination as to whether or not the adapter 300 is mounted, on the basis of the mount information acquired by the first camera communication portion 112 (step S1114). For example, the camera control section 110 performs the attachment/detachment determination, on the basis of the mount information which indicates whether or not the falling edge of the signal level of the signal RDY is detected.

In step S1114, if it is determined that the adapter 300 is mounted on the camera body 100, the camera control section 110 advances the process to the information exchange (step S120) between the camera body 100 and the adapter 300.

In addition, if the standard compatible lens (for example, the interchangeable lens 200A) is directly mounted on the camera body 100 without the adapter 300, the camera control section 110 advances the process to step S120 similarly to the above. In this case, the process of step S120 is a process of exchanging information between the camera body 100 and the interchangeable lens 200A.

Further, if it is determined that the lens is not mounted in step S1114, the camera control section 110 determines that the current state is an unmounted state where either one of the adapter 300 or the interchangeable lens 200A is not mounted on the camera body 100.

In the information exchange between the camera body 100 and the adapter 300 in step S120, the following process is performed.

The first camera communication portion 112 establishes communication (command data communication) with the first adapter communication portion 312. Then, the first camera communication portion 112 and the first adapter communication portion 312 intercommunicate and acquire information such as identification IDs, names, and firmware versions of the camera body 100 and the adapter 300. Further, the first adapter communication portion 312 transmits the power-system power supply PWR request signal, which is for requesting the supply start of the voltage of the power-system power supply PWR, to the first camera communication portion 112 (steps S1120 and S2120).

Subsequently, the process of initialization (step S130) is performed. The process of initialization is a process of initializing the adapter 300 and the interchangeable lens 200 by supplying the voltage of the power-system power supply PWR from the camera body 100.

First, when the first camera communication portion 112 receives the power-system power supply PWR request signal, the camera control section 110 controls a switch 125 such that it is in a conducting state, thereby supplying (feeding) the voltage of the power-system power supply PWR from the battery 190 to the adapter 300 (step S1130).

Next, the first camera communication portion 112 transmits an initialization execution command as an initialization request to the first adapter communication portion 312 (step S1140).

When the first adapter communication portion 312 receives the initialization execution command, the adapter control section 310 executes the mounting determination process (step S140) and the lens initialization process (step S150).

The mounting determination process (step S140) is a process of determining whether the interchangeable lens is mounted on the adapter 300.

The adapter control section 310 causes the adapter power supply section 320 to generate the voltage of the lens control system power supply Vc and supply (feed) the voltage to the interchangeable lens 200. Next, the first adapter communication portion 312 executes the lens mounting determination process through the communication with the first lens communication portion 212, thereby determining whether or not the interchangeable lens is mounted. If the interchangeable lens 200 is mounted, the first lens communication portion 212 transmits the lens driving system power supply Vp request signal to the first adapter communication portion 312 (steps S2140 and S3140).

Then, the adapter control section 310 advances the process to the lens initialization process (step S150).

The lens initialization process (step S150) is a process of initializing the adapter 300 and the interchangeable lens 200.

When the first adapter communication portion 312 receives the lens driving system power supply Vp request signal, the adapter control section 310 causes the adapter power supply section 320 to generate the voltage of the lens driving system power supply Vp and supply (feed) the voltage to the interchangeable lens 200. Next, the first adapter communication portion 312 executes the lens initialization process through the communication with the first lens communication portion 212 (steps S2150 and S3150). Here, the reason why the lens driving system power supply Vp is not supplied from the adapter 300 side to the interchangeable lens 200 side is as follows. In some interchangeable lenses, it may not be necessary to supply power to the lenses (for example, manual focus lenses). When such an interchangeable lens is mounted, it is an unnecessary task for the adapter 300 to generate the lens driving system power supply Vp and perform the power supply operation. Therefore, in the present embodiment, in order for the adapter 300 not to perform the unnecessary task, the power feeding sequence of the power supply is determined.

Next, when the adapter 300 and the interchangeable lens 200 are completely initialized, as a result of the response to an initialization confirmation command, the first camera communication portion 112 receives "initialization completion" as information which indicates that the initialization is complete, from the first adapter communication portion 312. Thereby, the camera control section 110 acquires the initialization completion information (step S1150).

When the initialization is complete, the camera control section 110 determines whether or not the adapter 300 is mounted, on the basis of the information acquired through the information exchange between the camera body 100 and the adapter 300 of step S1120 (step S1155). In step S1155, if it is determined that the adapter 300 is not mounted, the camera control section 110 determines that the standard compatible lens (for example, the interchangeable lens 200A) is directly mounted on the camera body 100 without the adapter 300. In contrast, in step S1155, if it is determined that the adapter 300 is mounted, the camera control section 110 advances the process to the process of the lens information acquisition (step S160).

The process of the lens information acquisition (step S160) includes the process of determining whether the interchangeable lens is mounted on the adapter 300 and a process of acquiring information of the interchangeable lens 200 mounted on the adapter 300. The information of the interchangeable lens 200 includes, for example, the type of the lens, presence or absence of the hotline communication function, presence or absence of the vibration-proof function, presence or absence of the electromagnetic diaphragm, the full-aperture F value, focal length information, and the like.

The first camera communication portion 112 transmits a lens information acquisition command to the first adapter communication portion 312, and receives the response of the lens information from the first adapter communication portion 312, thereby acquiring the information of the interchangeable lens 200 (steps S1160 and S2160).

Next, the camera control section 110 determines the type (class) of the interchangeable lens 200 on the basis of the lens information which is acquired in the lens information acquisition (step S160) (step S1165). For example, the camera control section 110 determines whether or not a CPU lens is mounted on the adapter 300 on the basis of the determination result of the mounting determination process (step S140).

If it is determined that the CPU lens is not mounted in step S1165, it is determined that a non-CPU lens is mounted, activation is performed, and the process ends.

In contrast, if it is determined that the CPU lens is mounted in step S1165, the process advances to the lens function start (step S170).

Further, the camera control section 110 determines, on the basis of the acquired lens information, whether or not the lens is, for example, a lens having an AF control (processing) function, a lens having a function (vibration-proof control function) of control (processing) of the VR lens 223, or an electromagnetic-diaphragm-type lens.

The process of the lens function start (step S170) is a process of starting respective functions thereof in accordance with the type (function) of the interchangeable lens on the basis of the lens information which is acquired in the process of the lens information acquisition (step S160). The first camera communication portion 112 communicates with the first lens communication portion 212 through the first adapter communication portion 312, thereby performing, for example, processes of acquiring a table for lens control, setting permission of the hotline communication, setting the vibration-proof control start, and the like (steps S1170, S2170, and S3170).

Then, the camera control section 110 determines that the CPU lens is mounted, performs activation, and ends the process.

As described above, the adapter control section 310 performs activation in response to the supply of the voltage of the control system power supply Vcc1 from the camera body 100, and requests the camera body 100 to start supplying the voltage of the power-system power supply PWR. Further, the adapter control section 310 generates the voltage of the lens control system power supply Vc to be supplied to the interchangeable lens 200 from the power-system power supply PWR, in response to the supply of the voltage of the power-system power supply PWR from the camera body 100. Furthermore, the adapter control section 310 supplies the voltage of the lens control system power supply Vc to the interchangeable lens 200. Thereby, when the request to supply the voltage of the lens driving system power supply Vp is issued from the interchangeable lens 200, the adapter control section generates the voltage of the lens driving system power supply Vp from the power-system power supply PWR, and supplies it to the interchangeable lens 200.

Thereby, the adapter control section 310 is able to generate a voltage to be supplied to the interchangeable lens 200 on the basis of the voltage supplied from the camera body 100, and appropriately control the supply start timing of the voltage of each power supply system.

Further, the adapter control section 310 determines the specification of the interchangeable lens 200 in the lens activation process, and is thereby able to supply a voltage to the interchangeable lens 200 on the basis of the determined specification. Further, the adapter control section 310 is able to stop the supply of the voltage to the interchangeable lens in the case where it is not necessary to supply a voltage to the interchangeable lens, on the basis of the determined specification of the interchangeable lens.

Details of Initialization Process in Lens Activation Process

Next, the process of initialization (step S130) in the lens activation process described with reference to FIG. 12 will be described in detail with reference to FIG. 13.

Figure 13:
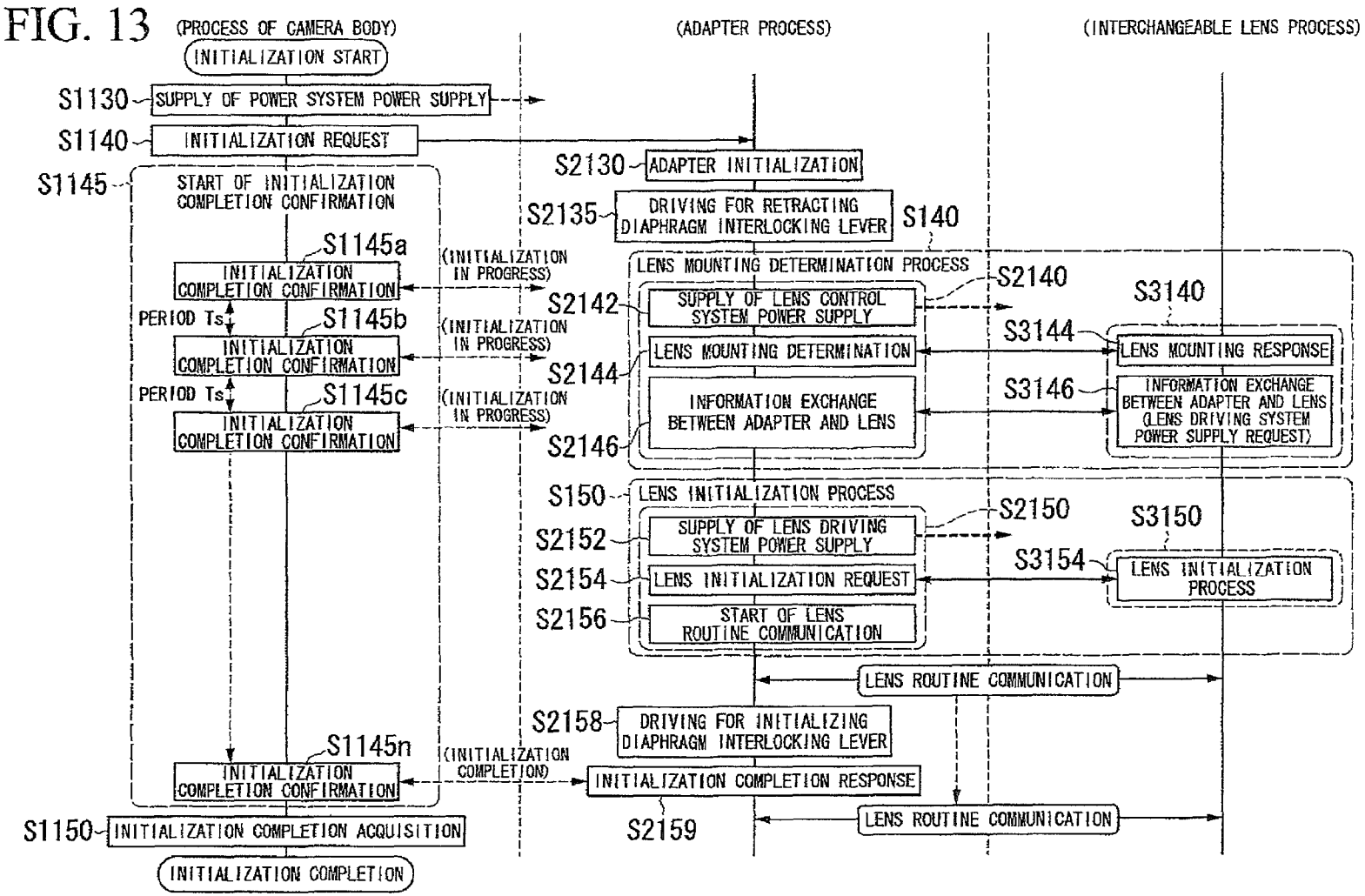
FIG. 13 is a diagram illustrating an example of a process sequence of an initialization process in the lens activation process.

FIG. 13 is a diagram illustrating an example of the process sequence of the initialization process in the lens activation process. In FIG. 13, the processes corresponding to the respective processes of FIG. 12 will be represented by the same reference numerals and signs, and description thereof will be omitted.

The first camera communication portion 112 supplies the voltage of the power-system power supply PWR (step S1130), and subsequently transmits an initialization execution command as an initialization request to the first adapter communication portion 312 (step S1140). Thereafter, the first camera communication portion 112 repeatedly transmits an initialization completion confirmation command (steps S1145a, S1145b, S1145c, . . . ), which is to detect completion of the process of initialization performed by the adapter 300, to the first adapter communication portion 312, and waits for the response of "initialization completion" from the first adapter communication portion 312 (step S1145).

For example, the first camera communication portion 112 repeatedly transmits the initialization completion confirmation command to the first adapter communication portion 312 in the period Ts during a period of time until the response of "initialization completion" is acquired (or a predetermined period of time to perform time-out process). The period Ts of the communication of the initialization completion confirmation command is a time interval which is shorter than that of the period Tm of the routine data communication described with reference to FIG. 9. That is, the first adapter communication portion 312 executes a process of transmitting information (a process of responding to the initialization completion confirmation command), which indicates whether or not the initialization process is complete, on the camera control section 110 with a time interval shorter than that of the period Tm of the routine data communication. That is, the detection as to whether or not the initialization process is complete is performed with the time interval, which is shorter than that of the period Tm of the routine data communication, by the camera control section 110. As described above, by shortening the interval (period) for detecting completion of the initialization, as a result, it is possible to start the process which is performed after completion of the initialization at an early stage. Thus, it is possible to shorten the time necessary for the rising edge of the apparatus and system.

The first adapter communication portion 312 responds with an initialization state of "initialization in progress" as information which indicates the state where the initialization is not complete, to the initialization completion confirmation command which is repeatedly transmitted from the first camera communication portion 112 until the initialization is complete.

In addition, in the drawing, the first camera communication portion 112 acquires the response of "initialization completion" on the basis of the result of the response to the initialization completion confirmation command of step S1145n.

Thereby, the first camera communication portion 112 is able to detect whether or not the initialization process of the adapter 300 is complete in a period with the time interval shorter than that of the period of the routine data communication.

When the first adapter communication portion 312 receives the initialization execution command, the adapter control section 310 executes a process of initializing the respective sections provided in the adapter 300 (step S2130). The process includes, for example, a process of resetting a memory in the adapter control section 310 of the adapter 300. Next, the adapter control section 310 controls the diaphragm interlocking lever driving section 330 such that it moves the diaphragm interlocking lever 350 to the retractable position (step S2135).

Subsequently, the adapter control section 310 advances the process to the lens mounting determination process (step S140). In the lens mounting determination process, the adapter control section 310 firstly causes the adapter power supply section 320 to generate the voltage of the lens control system power supply Vc and supply (feed) the voltage to the interchangeable lens 200 (step S2142). Next, in response to the supply (power feeding) of the voltage of the lens control system power supply Vc to the interchangeable lens 200, the first adapter communication portion 312 performs mounting determination by detecting whether or not the interchangeable lens 200 is mounted, on the basis of whether or not there is a response from the first lens communication portion 212 of the interchangeable lens 200 (steps S2144 and S3144).

For example, if there is no response from the first lens communication portion 212, it is determined that the interchangeable lens 200 is not mounted on the adapter 300 (lens unmounted state).

In contrast, if there is a response from the first lens communication portion 212, the first adapter communication portion 312 determines that the interchangeable lens 200 is mounted on the adapter 300, and performs communication for information exchange between the adapter 300 and the interchangeable lens 200 (steps S2146 and S3146).

In the communication for information exchange between the adapter 300 and the interchangeable lens 200, for example, the first adapter communication portion 312 and the first lens communication portion 212 indentify each other by communicating identification commands with each other, and check whether or not it is possible to perform communication normally. Further, the first adapter communication portion 312 acquires lens information which is for identifying the type of the interchangeable lens 200, information which indicates a state of the lens switch (for example, a switch for switching between AF and MF (Manual Focus)) provided in the interchangeable lens 200, and the like.

Further, the first lens communication portion 212 transmits the lens driving system power supply Vp request signal to the first adapter communication portion 312. Then, the adapter control section 310 advances the process to the lens initialization process (step S150).

In the lens initialization process (step S150), first, when the first adapter communication portion 312 receives the lens driving system power supply Vp request signal, the adapter control section 310 causes the adapter power supply section 320 to generate the voltage of the lens driving system power supply Vp and supply (feed) the voltage to the interchangeable lens 200 (step S2152). Next, the first adapter communication portion 312 transmits the lens initialization execution command, which is to request execution of the lens initialization process, to the first lens communication portion 212 (step S2154). When the first lens communication portion 212 receives the lens initialization execution command, the lens control section 210 executes the lens initialization process in response to the lens initialization execution command from the first adapter communication portion 312 (step S3154).

The lens initialization process includes processes of initializing the lens control section 210, the AF control (control of the focus lens 222), the vibration-proof control (control of the VR lens 223), and the like. In addition, in the case of the electromagnetic-diaphragm-type CPU lens, in the lens initialization process, the process of initialization of the electromagnetic diaphragm control is also executed.

In addition, after the lens initialization process is complete, the first adapter communication portion 312 starts the lens routine communication with the first lens communication portion 212 (step S2156).

Next, the adapter control section 310 performs initialization driving of the diaphragm interlocking lever 350 (step S2158). For example, the adapter control section 310 controls the diaphragm interlocking lever driving section 330, thereby executing the process of moving the position of the diaphragm interlocking lever 350 to the prescribed position which is determined in advance. In addition, the adapter control section 310 moves, in accordance with the control condition, the position of the diaphragm interlocking lever 350 to, for example, a retractable position, an open position, or a position stored in a storage portion.

Subsequently, in response to completion of execution of the initialization driving of the diaphragm interlocking lever 350 in step S2158, the first adapter communication portion 312 responds with "initialization completion" as the initialization state to the initialization completion confirmation command (step S1145n) issued from the first camera communication portion 112 (step S2159). The first camera communication portion 112 acquires the response to "initialization completion" on the basis of the result of the response to the initialization completion confirmation command of step S1145n (step S1150), and ends the initialization.

As described above, in response to the initialization execution command from the first camera communication portion 112, the adapter control section 310 is able to initialize the respective sections provided in the adapter 300, determine whether the lens is mounted on the adapter 300, and initialize the state of the interchangeable lens 200 mounted on the adapter 300. Further, the first camera communication portion 112 is able to detect whether or not the initialization process of the adapter 300 is complete in the period (for example 10 msec) with the time interval shorter than that of the period (the period Tm; for example, 16 msec) of the routine data communication. Accordingly, the camera control section 110 is able to appropriately and promptly detect whether or not the initialization process is complete.

Example of Initialization Completion Response Data

In addition, as described with reference to FIG. 13, the adapter control section 310 requests the interchangeable lens 200 to execute the process of initializing the status of the interchangeable lens 200, and thereafter performs the initialization driving (initialization process) of the diaphragm interlocking lever 350. Further, after the lens initialization process of initializing the status of the interchangeable lens 200 is complete, the adapter control section 310 completes the process of initialization which is performed in response to the initialization execution command transmitted by the first camera communication portion 112. That is, before the adapter control section 310 completes the process of initialization (the process including shift of the diaphragm interlocking lever 350 to the retractable position), the lens initialization process is complete.

Thereby, after the lens initialization process is complete, the adapter control section 310 is able to respond with the initialization completion to the first camera communication portion 112.

Figure 14A:
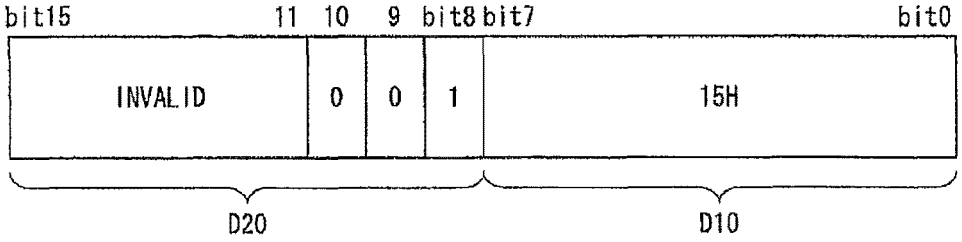
FIG. 14A is a diagram illustrating an example of a data structure of initialization information obtained through the command data communication.
Figure 14B:
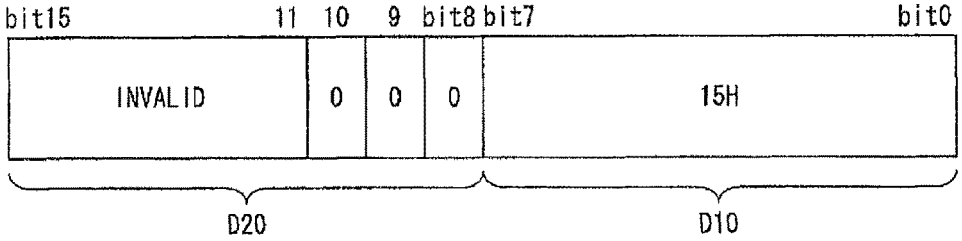
FIG. 14B is a diagram illustrating an example of a data structure of initialization information obtained through the command data communication.

FIGS. 14A and 14B are a diagram illustrating an example of a data structure of the initialization state as a response to the initialization completion confirmation command in the command data communication.

For example, in the command data communication, the initialization state data as a response to the initialization completion confirmation command is two-byte data. In addition, among the two-byte data, the lower one byte D10 (bits 0 to 7) is command data which indicates the data as a response to the initialization completion confirmation command. For example, as shown in the drawing, there is provided an example in which the data of "15H" (15H in hexadecimal) as the command data for identifying the data as a response to the initialization completion confirmation command is set as the lower one byte D10. Further, the upper one byte D20 (bits 8 to 15) is initialization state data as a response. In bit 8 of the upper one byte D20, a flag (diaphragm interlocking lever initialization completion information), which indicates whether or not the initialization process of the diaphragm interlocking lever 350 in the adapter 300 is complete, is set. Further, in bit 9, a flag (lens initialization completion information), which indicates whether or not the initialization process of the focus lens 222 in the interchangeable lens 200 is complete, is set. Furthermore, in bit 10, a flag (lens initialization completion information), which indicates whether or not the initialization process of the VR lens 223 in the interchangeable lens 200 is complete, is set. In addition, bits 11 to 15 are undefined, and correspond to an invalid data area.

FIG. 14A shows initialization state data as a response to the initialization completion confirmation command which is set in the first adapter communication portion 312, as the first camera communication portion 112 transmits the initialization execution command as the initialization request to the first adapter communication portion 312 (data set in step S2130 of FIG. 13). That is, the first adapter communication portion 312 responds with data, which is shown in FIG. 14A, as data, which indicates the initialization state where "the initialization is in progress", to the initialization completion confirmation command.

In addition, with the timing (step S2130 of FIG. 13), all initialization processes of the initialization process of the focus lens 222, the initialization process of the VR lens 223, and the initialization process of the diaphragm interlocking lever 350 are not complete (the process of initializing the status of the interchangeable lens 200 is not complete). However, the first adapter communication portion 312 sets the flag "0", which indicates that the initialization process is complete, in bits 9 and 10 which indicates the initialization state of the interchangeable lens 200 side. On the other hand, in bit 8 which indicates data of the initialization state of the diaphragm interlocking lever 350, the flag "1", which indicates that the initialization process is not complete, is set. That is, regardless of the initialization process state (the progress state of the initialization process) of the interchangeable lens 200 side, the adapter 300 invariably sets the completion flag "0", which indicates the state where the initialization ends, in bits 9 and 10. As described above, by setting the initialization flags within the adapter 300, even when an interchangeable lens which is a type incapable of outputting the flag indicating the initialization completion to the adapter 300 is mounted on the camera body 100 with the adapter 300 interposed therebetween, there is an advantage in that it is possible to extending the types of compatible interchangeable lenses without stopping an operation (camera system) at the stage of the initialization process sequence mentioned above.

At the time point the lens initialization process (step S150 of FIG. 13) is complete, the initialization process of the diaphragm interlocking lever 350 on the adapter 300 side is not yet complete.

FIG. 14B shows initialization state data as a response to the initialization completion confirmation command which is set when the initialization process of the initialization driving (step S2158 of FIG. 13) of the diaphragm interlocking lever 350 is complete. At this time point (step S2158 of FIG. 13), normally, the lens-side initialization process (step S150 of FIG. 13) is complete.

When the initialization process of the diaphragm interlocking lever 350 is complete, the first adapter communication portion 312 sets the flag "0", which indicates that the initialization process is complete, in bit 8 of the initialization state data. Thereby, the flag "0", which indicates that the initialization process is complete, is set in each of all the bits 8 to 10 of the initialization state data. That is, the first adapter communication portion 312 responds with data shown in FIG. 14B as the initialization state data, which indicates "initialization completion", to the initialization completion confirmation command.

That is, the initialization completion information which indicates whether or not the initialization process is complete, includes: the lens initialization completion information (bits 9 and 10 in FIGS. 14A and 14B) which invariably indicates whether or not the lens initialization process (the process of initializing the status of the interchangeable lens 200) is complete; and the information (diaphragm interlocking lever initialization completion information) (bit 8 of FIGS. 14A and 14B) which indicates whether or not the initialization process (diaphragm interlocking lever initialization process) of the diaphragm interlocking lever 350 is complete.

Then, the first adapter communication portion 312 instructs the interchangeable lens 200 to perform initialization, and sets the value of the lens initialization completion information to a value indicating that initialization is complete, and in response to completion of the diaphragm interlocking lever initialization process, the values of the diaphragm interlocking lever initialization completion information is set to a value indicating that initialization is complete.

That is, the adapter control section 310 sets the value of the lens initialization completion information to the value indicating that initialization is complete, regardless of the progress state of the process of initializing the status of the interchangeable lens 200. Further, in response to completion of the diaphragm interlocking lever initialization process, the adapter control section 310 sets the value of the diaphragm interlocking lever initialization completion information to the value indicating that initialization is complete, and transmits the initialization completion information to the camera control section 110.

In addition, in accordance with the timing (detection timing of the initialization process) of the initialization completion confirmation command of the camera control section 110, the adapter control section 310 responds with (transmits) the initialization completion information to the camera control section 110.

As described above, the adapter control section 310 updates the information (flag), which indicates whether or not the initialization is complete, at the completion timing of the initialization process of the diaphragm interlocking lever 350, and responds with the information to the camera control section 110.

Accordingly, at the timing at which the initialization process of the diaphragm interlocking lever 350 is complete, the adapter control section 310 responds with the initialization completion state, which indicates that entire initialization including the initialization of the interchangeable lens 200 side is complete, to the camera control section 110.

Initialization Performed When Standard Compatible Lens Is Mounted

In addition, the embodiment described the initialization process in the case where the adapter 300 is connected to the camera body 100, but the present invention is not limited to this. For example, in the initialization process in a case where an accessory other than the adapter 300 is connected to the camera body 100, the camera body 100 may detect whether or not the initialization process of the accessory is complete, in the same manner as described above. For example, in the accessory detachably attached to the camera body 100, an accessory control section provided in the accessory may be controlled by periodic communication (routine periodic communication) with the camera control section 110 provided in the camera body 100. In this case, in the initialization process, by executing the initialization process in response to the control instruction from the camera control section 110, the accessory control section may execute a process in which whether or not the initialization process is complete is detected by the camera control section 110 with a time interval shorter than the period of the periodic communication.

As an example, a case where the accessory detachably attached to the camera body 100 is a standard compatible lens will be described below.

The standard compatible lens (for example, the interchangeable lens 200A) may be directly connected to the camera body 100 without the adapter 300. In this case, in the lens routine process, for example, the first lens communication portion 212A (the first lens communication portion 212A is provided in the lens control section 210A corresponding to the above-mentioned accessory control section) performs the routine data communication with the first camera communication portion 112 in the period Tm (performs the routine data communication in the period Tm which is the same as that of the routine data communication between the first adapter communication portion 312 and the first camera communication portion 112 shown in FIG. 9).

Further, in the lens activation process, the first camera communication portion 112 transmits the initialization execution command to the first lens communication portion 212A similarly to the initialization request process of step S1140 shown in FIG. 13. That is, the first camera communication portion 112 transmits the initialization execution command to the first lens communication portion 212A instead of the first adapter communication portion 312. Thereafter, similarly to the initialization completion confirmation process of step S1145, the first camera communication portion 112 repeatedly transmits the initialization completion confirmation command to the first lens communication portion 212A in the period Ts, and waits for the response of "initialization completion" from the first lens communication portion 212A.

Further, when the first lens communication portion 212A receives the initialization execution command, the lens control section 210A executes the lens initialization process of the interchangeable lens 200A. Then, as the lens initialization process is complete by the lens control section 210A, the first lens communication portion 212A responds with "initialization completion".

As described above, the process from the initialization request to the initialization completion confirmation in the camera control section 110 is performed in the same manner in both cases where the interchangeable lens 200 is connected to the camera body 100 through the adapter 300 and the interchangeable lens 200A is directly connected thereto.

That is, the first lens communication portion 212A executes a process of transmitting information (a process of responding to the initialization completion confirmation command), which indicates whether or not the initialization process is complete, on the camera control section 110 with a time interval shorter than that of the period Tm of the routine data communication. That is, even when the interchangeable lens 200A is directly connected to the camera body 100, the detection as to whether or not the initialization process is complete is performed with the time interval, which is shorter than that of the period Tm of the routine data communication, by the camera control section 110.

Thereby, the first camera communication portion 112 is able to detect whether or not the initialization process of the interchangeable lens 200A is complete in the period with the time interval shorter than that of the period of the routine data communication. Thereby, the camera control section 110 is able to appropriately and promptly detect whether or not the initialization process is complete.

Power Cut-off Process And Low Power Consumption Process

Next, a power cut-off process and a low power consumption process will be described.

Here, the low power consumption process is a process of shifting an operation state (operation mode) of the camera body 100 to an operation mode (second operation mode/low power consumption mode/sleep mode) for reducing power consumption and incapable of performing the photography process, as compared with an operation mode (first operation mode) capable of performing the photography process.

Here, in the following technique, the low power consumption process is referred to as a sleep process, and the operation state (operation mode), which is switched by the sleep process, is referred to as a sleep mode.

For example, in response to the interrupt request issued by power off of the camera body 100, a power cut-off process is executed. Further, for example in a case where no operation continues during a predetermined time or more, the sleep process is executed.

Further, the power cut-off process and the sleep process include a lens shutdown process of stopping (shutting down) functions of the adapter 300 and the interchangeable lens 200 and stopping (cutting off) the supply of the voltage of the power-system power supply PWR from the camera body 100. That is, the power cut-off process and the sleep process are processes of stopping supplying a voltage to the interchangeable lens 200 and stopping (cutting off) the supply of the voltage of the power-system power supply PWR.

Further, in the case where the operation mode of the camera body 100 is shifted to the sleep mode, the supply of the voltage of the power-system power supply PWR from the camera body 100 is stopped, and the supply of the voltage of the control system power supply Vcc1 is continued. For example, when the operation mode of the camera body 100 is shifted to the sleep mode, the camera body 100 continues the supply of the voltage of the control system power supply Vcc1 during a predetermined time period. Here, the predetermined time period is, for example, a time period which depends on the time to return to the operation mode capable of performing the photography process by detecting the operation of the camera body 100, a time period which depends on the time to advance to the power cut-off process of the camera body 100 when the non-operation state is further continued, or the like.

Further, the operation mode of the camera body 100 may be shifted to the sleep mode. In this case, the instruction signal (shutdown execution command), which indicates the instruction to shift to the power cut-off state or the sleep mode, is transmitted from the camera control section 110 to the adapter control section 310. Then, in response to receiving the corresponding signal, the adapter control section 310 executes the lens shutdown process of stopping the power feeding to the interchangeable lens 200.

Next, when the lens shutdown process ends, the adapter control section 310 transmits a permission signal (a response of shutdown readiness), which indicates a permission to shift to the power cut-off state or the sleep mode, to the camera body 100. Subsequently, in response to the permission signal transmitted from the adapter control section 310, the supply of the voltage of the power-system power supply PWR from the camera body 100 is stopped.

Figure 15:
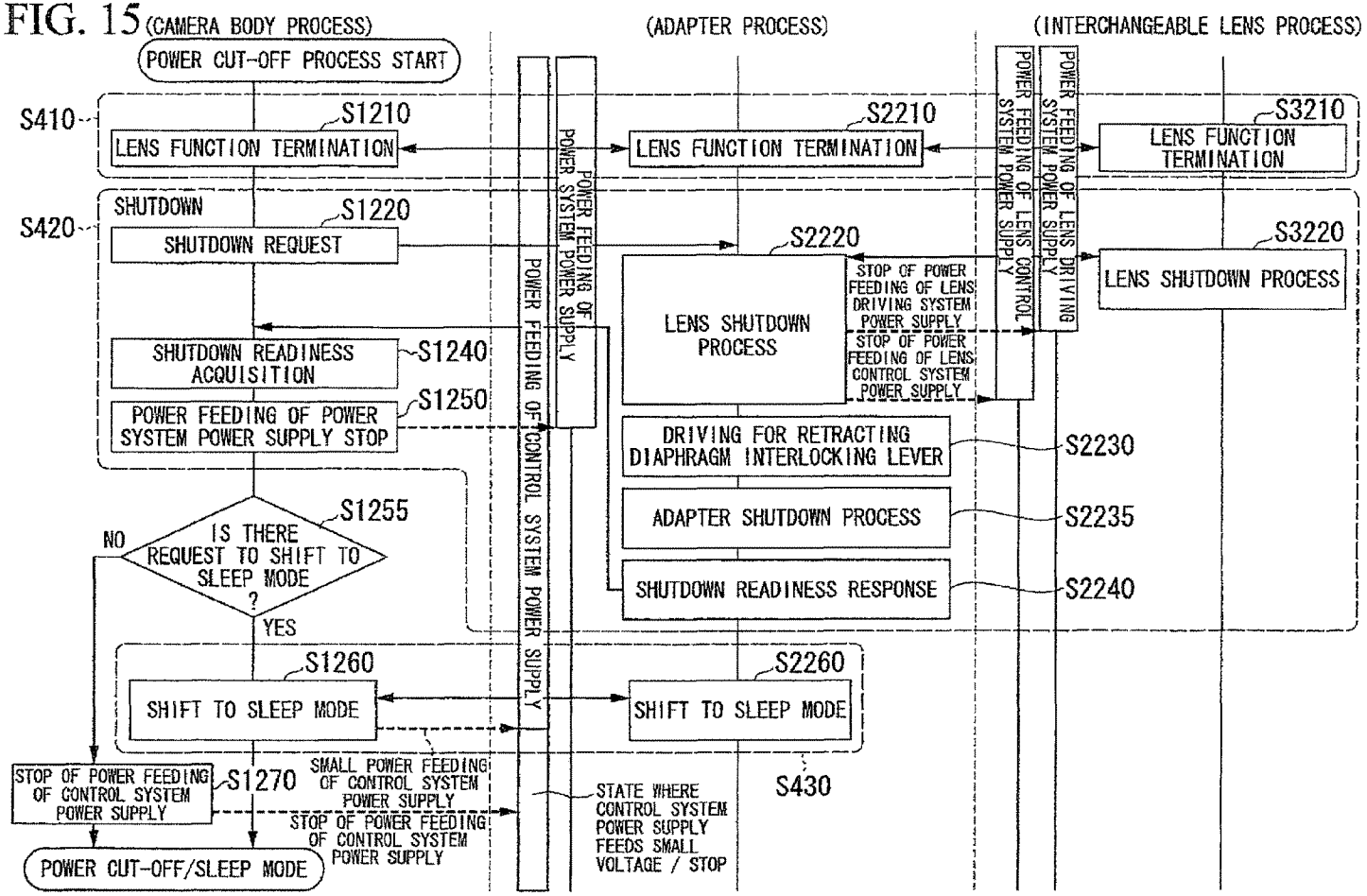
FIG. 15 is a diagram illustrating an example of a process sequence of a power cut-off process and a sleep process.

FIG. 15 is a diagram illustrating an example of a process sequence of the power cut-off process and the sleep process.

Referring to the drawing, the power cut-off process and the sleep process of the camera system 1 will be described.

The power cut-off process and the sleep process are performed in the order of lens function termination (step S410), shutdown (step S420), and shift to the sleep mode (step S430). In addition, in the power cut-off process and the sleep process, the communication, which is performed between the camera body 100 and the interchangeable lens 200 through the adapter 300, is the command data communication.

When the power cut-off process or the sleep process is started, first, the process of the lens function termination (step S410) is performed.

The first camera communication portion 112 communicates with the first lens communication portion 212 through the first adapter communication portion 312, thereby stopping the function operation of the interchangeable lens 200 (steps S1210, S2210, and S3210). Thereby, the lens control section 210 stops the function operation of the interchangeable lens 200. For example, through the process of the lens function termination, the process of termination of the vibration-proof control of the interchangeable lens 200, inhibition of the hotline communication, or the like.

Next, the process of shutdown (step S420) is performed.

The first camera communication portion 112 transmits the shutdown execution command as a shutdown request to the first adapter communication portion 312 (step S1220). Thereafter, the first camera communication portion 112 repeatedly transmits the shutdown completion confirmation command, and waits for the response of the shutdown readiness from the first adapter communication portion 312.

When the first adapter communication portion 312 receives the shutdown execution command, the adapter control section 310 starts the lens shutdown process. First, the first adapter communication portion 312 transmits a command, which is to give an instruction not to permit feeing the voltage of the lens driving system power supply Vp, to the first lens communication portion 212. As the first lens communication portion 212 receives the command, the lens control section 210 stops supplying (feeding) the voltage of the lens driving system power supply Vp in the interchangeable lens 200 (step S3220). Next, the first adapter communication portion 312 stops the lens routine communication with the first lens communication portion 212. Then, the adapter control section 310 stops the simply of the voltage of the lens driving system power supply Vp from the adapter power supply section 320, and subsequently stops the supply of the lens control system power supply Vc (step S2220).

Next, the adapter control section 310 moves the diaphragm interlocking lever 350 to the retractable position (step S2230), and executes the process of shutting down the respective sections provided in the adapter 300 (step S2235). Subsequently, when the shutdown process is complete, in response to the shutdown completion confirmation command received from the first camera communication portion 112, the first adapter communication portion 312 responds with "shutdown readiness" as information which indicates that the shutdown process of the adapter 300 (the adapter 300 and the interchangeable lens 200) is complete, to the first camera communication portion 112. Further, the first adapter communication portion 312 responds with presence or absence of the sleep process request to the first camera communication portion 112 (step S2240).

As a result of the response to the shutdown completion confirmation command, the first camera communication portion 112 acquires the response of "shutdown readiness" from the first adapter communication portion 312 (step S1240).

When the first adapter communication portion 312 acquires the response of shutdown readiness, the camera control section 110 controls the switch 125 such that it attains the cut-off state, thereby stopping the supply of the voltage of the power-system power supply PWR (step S1250).

Next, the camera control section 110 determines whether or not the request to shift to the sleep mode is present on the basis of the result of the response to the shutdown completion confirmation command (step S1255). In step S1255, if it is determined that the request to shift to the sleep mode is absent, the camera control section 110 controls the camera power supply section 120 such that it stops the supply of the voltage of the control system power supply Vcc1 (step S1270).

In contrast, in step S1255, if it is determined that the request to shift to the sleep mode is present, the process of shifting to the sleep mode (step S430) is performed. First, the first camera communication portion 112 transmits an instruction to shift to the sleep mode to the first adapter communication portion 312. Thereby, the adapter control section 310 shifts to the sleep mode. For example, the first adapter communication portion 312 controls the signal RDY such that it is set to the H (high) level before the start of the process of shifting to the sleep mode, and controls the signal RDY such that it is set to the L (low) level after the process of shifting to the sleep mode is complete. The first camera communication portion 112 detects that the process of shifting to the sleep mode of the adapter 300 is complete by detecting the falling edge of the signal level of the signal RDY, and changes the state of the supply of the voltage of the control system power supply Vcc1 to a state for feeding a small voltage (steps S1260 and S2260).

Thereby, the shift to the power cut-off state or the sleep mode is performed.

As described above, when the camera body 100 is shifted to the sleep mode, the camera control section 110 stops supplying the voltage of the power-system power supply PWR to the adapter 300, and continues supplying the voltage of the control system power supply Vcc1. That is, when the adapter 300 is shifted to the sleep mode, the supply of the voltage of the power-system power supply PWR from the camera body 100 is stopped, and the supply of the voltage of the control system power supply Vcc1 is continued.

Thereby, in the sleep mode, it is possible to reduce power consumption. Further, the supply of the voltage of the control system power supply Vcc1 is continued, and thus the process of the adapter control section 310 is not completely stopped (the adapter control section 310 is operated with the minimum electric power necessary for the return process). Hence, when returning (performing activation) from the sleep mode to a stationary state, the adapter control section 310 is able to promptly performs the return (activation) as compared with the case where the process is completely stopped.

Process at Temporary Blackout of Power Supply

For the power-system power supply PWR, the lens driving system power supply Vp, and the lens control system power supply Vc, predetermined voltage ranges are prescribed respectively.

The Vc-voltage detection portion 325, Vp-voltage detection portion 326, and PWR voltage detection portion 327 detect the voltages of the power-system power supply PWR, the lens driving system power supply Vp, and the lens control system power supply Vc, and supply the detection results to the adapter control section 310. When any of the detected voltages of the power-system power supply PWR, the lens driving system power supply Vp, and the lens control system power supply Vc are lower than the predetermined voltage ranges respectively determined for them, the adapter control section 310 supplies (notifies) the detection result to the camera body 100.

For example, the adapter control section 310 executes the lens initialization process in order to initialize the interchangeable lens 200 (state) when any voltage (voltage value) of the voltage (voltage value) of the power-system power supply PWR fed from the camera body 100, the voltage (voltage value) of the lens driving system power supply Vp fed from the adapter power supply section 320 to the interchangeable lens 200, and the voltage (voltage value) of the lens control system power supply Vc fed from the adapter power supply section 320 to the interchangeable lens 200 are lower than the predetermined voltage ranges which are respectively determined for them.

Specifically, the initialization request signal, which instructs the camera control section 110 provided in the camera body 100 of the adapter control section 310 to execute the initialization process including the lens initialization process, is transmitted from the first adapter communication portion 312 to the first camera communication portion 112, and is supplied (notified) to the camera body 100. Further, when any of the detected voltages of the power-system power supply PWR, the lens driving system power supply Vp, and the lens control system power supply Vc are lower than the predetermined voltage ranges respectively determined for them, the adapter control section 310 stops supplying the voltages of the lens driving system power supply Vp and the lens control system power supply Vc, and transmits the initialization request signal to the camera body 100.

The initialization process is a process of stopping the supply of the voltage of the power-system power supply PWR once in response to the initialization request signal and then restarting the supply thereof. Further, the initialization process is a process of stopping the supply of the voltage of the control system power supply Vcc1 once in response to the initialization request signal and then restarting the supply thereof.

In addition, the adapter control section 310 starts supplying the voltages of the lens driving system power supply Vp and the lens control system power supply Vc in response to the initialization process performed by the camera body 100. That is, the adapter control section 310 initializes the lens control section 210 in response to the initialization process performed by the camera body 100.

That is, when detecting a decrease in the power supply voltage, first, the adapter control section 310 stops supplying a voltage to the interchangeable lens 200. Next, the adapter control section 310 transmits the initialization request signal to the camera control section 110, and executes the process of stopping the supply of the voltage of the power supply from the camera body 100 once and thereafter restarting the supply thereof. Thereby, by executing the lens activation process again, the process of initialization is performed, and thus the adapter control section 310 supplies a voltage to the interchangeable lens 200.

Accordingly, when any of the detected voltages of the power-system power supply PWR, the lens driving system power supply Vp, and the lens control system power supply Vc are lower than the predetermined voltage ranges respectively determined for them, the adapter control section 310 is able to initialize the adapter 300 and the interchangeable lens 200. Hence, it is possible to prevent a problem that the operation of the interchangeable lens 200 side is continued with a voltage fed unstably.

In the determination, relative merits (degrees of importance, priorities) may be given to the voltage values of the power-system power supply PWR, the lens driving system power supply Vp, and the lens control system power supply Vc. From the viewpoint of maintenance of stable power feeding, first it is highly necessary for a value of the voltage, which is fed (fed to the adapter power supply section 320) in order to generate a supply voltage, to be within a predetermined range. Otherwise, there is a concern about fluctuation even in the voltage values subsequently generated. Accordingly, first it is determined whether or not there is an abnormality in the voltage value of the power-system power supply PWR is correct. The second important thing is that, in order for the interchangeable lens 200 side to perform correct control, it is necessary for the lens control section 210 to perform stable driving. Hence, it is determined whether or not there is an abnormality in the lens control system power supply Vc which feeds a voltage to the lens control section 210. That is, in priority order of the power-system power supply PWR, the lens control system power supply Vc, and the lens driving system power supply Vp, determination as to whether or not there is an abnormality in each voltage value thereof may be performed. As described above, by using relative merits in the determination, for example, even when there is an abnormality in the voltage value of the lens driving system power supply Vp, if the voltage value of the lens control system power supply Vc is normal and the lens control section 210 is normally operated (may normally communicate with the adapter control section 310), without performing the reset process (initialization process) on the interchangeable lens 200 side, it may be possible to recover the voltage value through another error processing (re-driving/retry operation of the lens-side driving element). Thereby, it is possible to prevent the hasty (unnecessary) initialization process from being performed.

Next, referring to FIG. 16, as an example of a process which is performed when there is a decrease in the power supply voltage, the process at the time of temporary blackout of power supply will be described.

Figure 16:
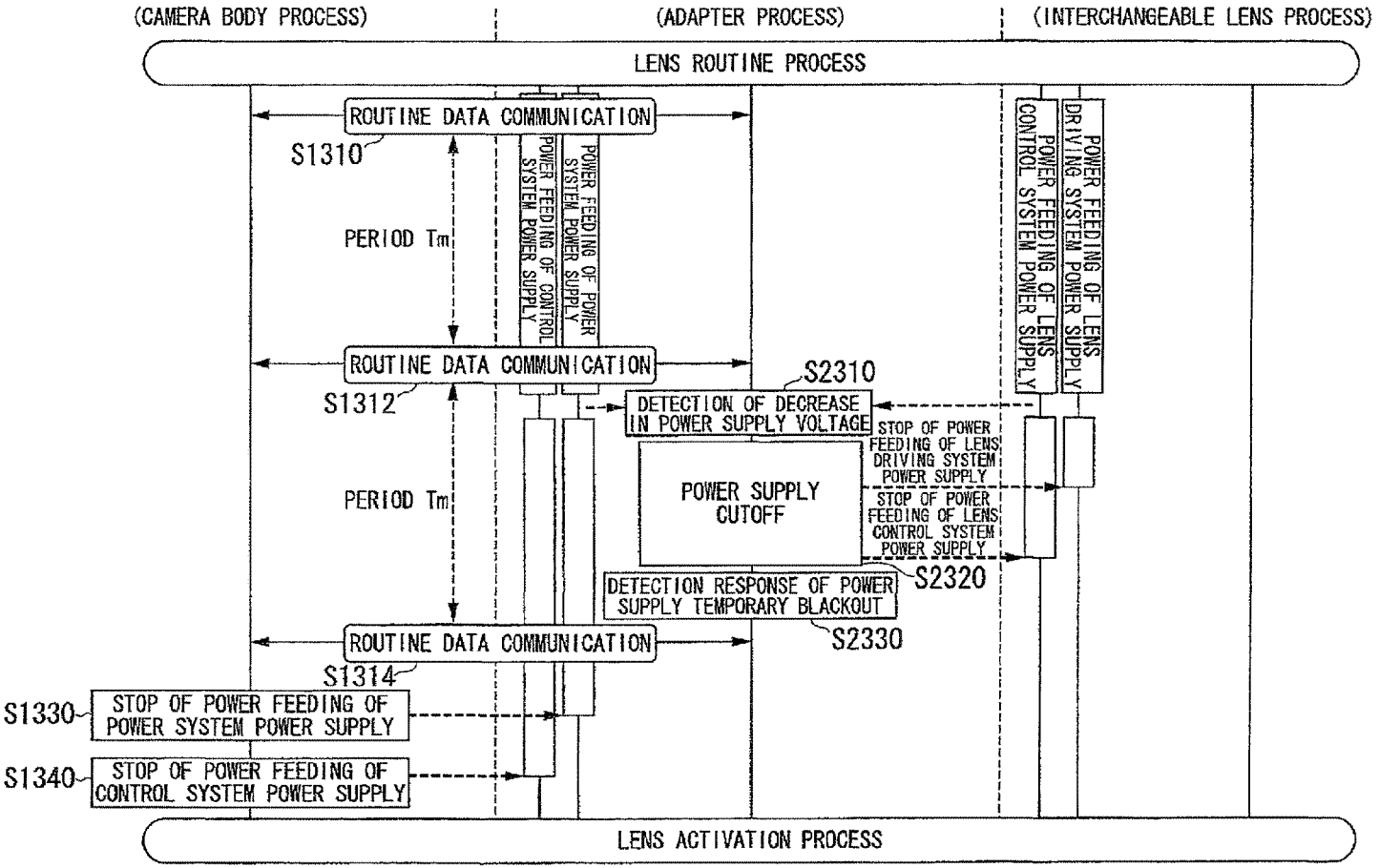
FIG. 16 is a diagram illustrating an example of a process sequence at the time of temporary blackout of power supply.

FIG. 16 is a diagram illustrating an example of a process sequence at the time of temporary blackout of power supply.

In the lens suspension state, the first camera communication portion 112 and the first adapter communication portion 312 perform the routine data communication in the period Tm (step S1310, S1312, S1314). The adapter power control portion 311 of the adapter control section 310 detects a state where there are temporary decreases in the voltages of the lens control system power supply Vc, the lens driving system power supply Vp, and the power-system power supply PWR, on the basis of the detection results of the Vc-voltage detection portion 325, the Vp-voltage detection portion 326, and the PWR voltage detection portion 327 (step S2310). FIG. 16 shows an exemplary case where the voltages of the lens control system power supply Vc, the lens driving system power supply Vp, and the power-system power supply PWR are temporarily decreased and then recovered (a case where there is a temporary blackout of the power supply). The adapter power control portion 311 executes a process of cutting off the power supply which supplies a voltage to the interchangeable lens 200, in response to detecting the state where the voltage is temporarily decreased (the state where there is a temporary blackout of the power supply). For example, the adapter power control portion 311 causes the adapter power supply section 320 to perform control, which is to stop supplying voltages in order of the lens driving system power supply Vp and the lens control system power supply Vc, as the power cut-off process (step S2320).

Next, after the adapter power supply section 320 stops the supply of the voltages of the lens driving system power supply Vp and the lens control system power supply Vc, the first adapter communication portion 312 responds with information which indicates that the temporary blackout of the power supply is detected, through the routine data communication (step S1314) to the first camera communication portion 112 (step S2330). For example, the first adapter communication portion 312 transmits "an initialization request signal in detection of the temporary blackout of the power supply" (initialization request signal) as a signal, which indicates that the temporary blackout of the power supply is detected, to the first camera communication portion 112.

Subsequently, as the first camera communication portion 112 receives "the initialization request signal in the detection of the temporary blackout of the power supply", the camera control section 110 controls the switch 125 such that it is set in the cut-off state, thereby stopping the supply of the voltage of the power-system power supply PWR (step S1330). Further, after stopping the supply of the voltage of the power-system power supply PWR, the camera control section 110 controls the camera power supply section 120 such that it stops the supply of the voltage of the control system power supply Vcc1 (step S1340).

Subsequently, the camera control section 110 executes the lens activation process (step S100 of FIG. 8) so as to thereby feed a voltage and execute the process of initialization.

As described above, when there is a temporary blackout in the power supply supplied to the interchangeable lens 200, the adapter control section 310 detects that the temporary blackout occurs, stops the voltage supplied to the interchangeable lens and the voltage supplied from the camera body 100 once so as to thereby attain the power cut-off state, and thereafter performs activation again so as to thereby execute the initialization process. Thereby, even when the temporary blackout of the power supply occurs, the adapter control section 310 initializes the adapter 300 and the interchangeable lens 200, whereby it is possible to shift them to the normal operation state.

In the embodiment, the adapter power control portion 311 detects the state where there is a temporary decrease in the voltages of the lens control system power supply Vc, the lens driving system power supply Vp, and the power-system power supply PWR, on the basis of the detection results of the Vc-voltage detection portion 325, the Vp-voltage detection portion 326, and the PWR voltage detection portion 327. In this case, the control portion cuts off the power supply which supplies a voltage to the interchangeable lens 200, and thereby executes the initialization process. However, if it is determined that the voltage is decreased only in the detection result of the Vp-voltage detection portion 326 (if it is not determined that the voltage is decreased in the detection results of the Vc-voltage detection portion 325 and the PWR voltage detection portion 327), it can be inferred that the communication itself between the adapter control section 310 and the lens control section 210 is normally performed. Therefore, the initialization process may not be executed in the interchangeable lens 200.

The embodiment described in the example in which, as the detection result of the temporary blackout of the power supply is transmitted from the adapter control section 310 to the camera control section 110, the camera control section 110 initializes the interchangeable lens 200 (the example in which the initialization is executed in a way that the adapter control section 310 receives an instruction from the camera control section 110), but the present invention is not limited to this. For example, the adapter control section 310 may determine the necessity of the initialization execution by itself without receiving the instruction from the camera control section 110, and then initialize the interchangeable lens 200.

In addition, the present embodiment described the configuration in which all the above-mentioned three voltage detection portions 325 to 327 are provided. However, even with a configuration in which only one or two of the three voltage detection portions are provided, it is possible to obtain the same advantage as the present embodiment. In this case, the PWR voltage detection portion 327 is advantageous (prior) particularly as a portion which performs the voltage detection, and in order of priority in terms of the advantage, there are the Vc-voltage detection portion 325 and the Vp-voltage detection portion 326.

The advantages according to the configurations are as described above.

As described above, according to the present embodiment, in the interchangeable-lens camera system, it is possible to cause various kinds of optical systems to appropriately function.

The present invention is not limited to the configuration shown in FIGS. 3, 5, and 6 in which the interchangeable lens 200 and the camera body 100 are connected to each other only through the adapter 300.

For example, it may be possible to adopt a configuration in which the interchangeable lens 200 and the camera body 100 is connected to the interchangeable lens 200 through a conversion adapter (such as teleconverter) other than the adapter 300.

Further, the adapter 300 of the embodiment is configured to not include an optical system, but may be configured to include an optical system.

The camera control section 110, the lens control section 210, or the adapter control section 310 in FIG. 1 may be implemented by hardware dedicated to each. Further, with a configuration using a memory and a CPU (Central Processing Unit), the respective functions of the above-mentioned camera control section 110, lens control section 210, and adapter control section 310 may be implemented by loading and executing programs for implementing the functions in the memory.

Further, programs for implementing the respective functions of the camera control section 110, the lens control section 210, and the adapter control section 310 mentioned above are recorded in a computer-readable recording medium, and the programs recorded in the recording medium are read out and executed by a computer system, whereby the above-mentioned processes of the respective section may be performed. In addition, the "computer system" described herein is defined to include OS and hardware such as peripherals.

Further, in a case of using the WWW system, the "computer system" is also defined to include the homepage provision environment (or display environment).

Further, the "computer-readable recording medium" means a portable medium such as a flexible disk, a magnetooptical disc, a ROM, or a CD-ROM or a storage device such as a hard disk built into the computer system. Furthermore, the "computer-readable recording medium" is defined to include: dynamically retaining a program during a short period of time like the communication line in the case of transmitting the program through the network such as the Internet and the communication line such as the telephone line; and retaining a program during a predetermined time like a volatile memory inside the computer system serving as a server or client in that case. Further, the program may be to implement some of the functions mentioned above, and may be implemented in combination with the program in which the above-mentioned functions are recorded in advance in the computer system.

Although the embodiments of the present invention have been described hitherto in detail with reference to the drawings, the detailed configuration is not limited to the embodiments, and may include changes in design and the like made without departing from the technical scope of the present invention.

What is claimed is:

1. An adapter comprising:

a first mount section that is *configured to be* detachably attached to a camera body *to receive a first volume from a first power supply system of the camera body mounted on the first mount section and to receive a second voltage from a second power supply system of the camera body mounted on the first mount section*;

a second mount section that is provided separately from the first mount section and is *configured to be* detachably attached to an interchangeable lens; and a power supply section that generates supply voltages of a third power supply system and a fourth power supply system, which are to be fed to the interchangeable lens mounted on the second mount section, from [a] *the second voltage of the* second power supply system [between a first power supply system of the camera body, which is mounted on the first mount section, and the second power supply system which is different from the first power supply system].

2. The adapter according to claim 1, wherein power consumed in a load, to which the voltage is fed from the third power supply system, is larger compared with power consumed in a load to which the voltage is fed from the fourth power supply system.

3. The adapter according to claim 1, wherein [the power supply section feeds] an electric power [through] *generated by the power supply section for* the third power supply system [to] *is for powering* an optical system driving section in the interchangeable lens which drives an optical system provided in the interchangeable lens, and wherein [the power supply section feeds] an electric power [through] *generated by the power supply section for* the fourth power supply system [to] *is for powering* a lens control section in the interchangeable lens which controls the optical system driving section.

4. The adapter according to claim 1, further comprising an adapter control section that controls processes executed in the adapter, wherein [the voltage is fed from the first power supply system to] the adapter control section *receives the first voltage from the first power supply system*.

5. The adapter according to claim 1, wherein the power supply section has a voltage conversion portion that generates a voltage, which is obtained by converting the *second* voltage of the second power supply system into a predetermined voltage, as a voltage supplied from a fifth power supply system.

6. The adapter according to claim 5, wherein the voltage conversion portion converts the *second* voltage of the second power supply system into a voltage which is stepped up and down to a predetermined voltage therefrom.

7. The adapter according to claim 5, wherein the voltage conversion portion has a DC-DC converter portion.

8. The adapter according to claim 5, further comprising:

a diaphragm interlocking mechanism section that moves to a position corresponding to an aperture value of a diaphragm provided in the interchangeable lens; and a diaphragm interlocking mechanism driving section that moves a position of the diaphragm interlocking mechanism section, wherein the power supply section supplies the voltage of the fifth power supply system to the diaphragm interlocking mechanism driving section.

9. The adapter according to claim 5, wherein the power supply section has a first regulator portion that generates the voltage of the fourth power supply system on the basis of the voltage of the fifth power supply system.

10. The adapter according to claim 9, wherein the first regulator portion converts the voltage of the fifth power supply system into a voltage which is stepped down to a predetermined voltage therefrom.

11. The adapter according to claim 9, wherein the first regulator portion has a first linear regulator.

12. The adapter according to claim 9, wherein the power supply section has a second regulator portion which is capable of supplying a larger amount of the feeding voltage compared with the first regulator portion, and wherein the second regulator portion generates the voltage of the third power supply system based on the *second* voltage of the second power supply system.

13. The adapter according to claim 12, wherein the second regulator portion converts the *second* voltage of the second power supply system into a voltage which is stepped down to a predetermined voltage.

14. The adapter according to claim 12, wherein the second regulator portion has a second linear regulator.

15. The adapter according to claim 3, further comprising an adapter communication section that is able to communicate with a camera control section provided in the camera body, and communicates with the lens control section so as to thereby acquire information of the optical system provided in the interchangeable lens, wherein [a] *the adapter communication section receives the first* voltage [is fed] from the first power supply system [to the adapter communication section].

16. The adapter according to claim 15, wherein the adapter communication section communicates with the camera control section so as to transmit the information of the optical system, which is acquired from the lens control section, to the camera control section in response to a request from the camera control section.

17. The adapter according to claim 16, wherein the information of the optical system is at least one of information, which indicates the type of the optical system, and information which indicates a driving state of the optical system.

18. The adapter according to claim 4, wherein the adapter control section is supplied with the *first* voltage from the first power supply system, and then transmits a second power supply system request signal, which is for requesting start of the power feeding from the second power supply system, to the camera body.

19. The adapter according to claim 18, wherein the adapter control section causes the power supply section to generate the voltage of at least one of the third power supply system and the fourth power supply system from the *second* voltage of the second power supply system which is supplied from the camera body in response to the second power supply system request signal.

20. The adapter according to claim 18, wherein after the power feeding from the second power supply system is started, the adapter control section causes the power supply section to generate the voltage of at least one of the third power supply system and the fourth power supply system, and supplies the voltage to the interchangeable lens.

21. The adapter according to claim 18, wherein after the start of the power feeding from the second power supply system, the adapter control section starts feeding a voltage from the fourth power supply system to the interchangeable lens.

22. The adapter according to claim 18, wherein after the supply of the voltage from the fourth power supply system to the interchangeable lens, the adapter control section supplies the voltage from the third power supply system to the interchangeable lens.

23. The adapter according to claim 18, wherein in response to the supply of the voltage of the fourth power supply system to the interchangeable lens, when receiving a third power supply system request signal which indicates the request to start the supply of the voltage of the third power supply system from the interchangeable lens, the adapter control section supplies the voltage of the third power supply system from the power supply section to the interchangeable lens.

24. The adapter according to claim 18, wherein after the supply of the *first* voltage of the first power supply system from the camera body is started, the adapter control section executes an initialization process in response to a control instruction from a camera control section provided in the camera body.

25. The adapter according to claim 24, wherein the adapter control section requests the interchangeable lens to execute a process of initializing a status of the interchangeable lens as the initialization process.

26. The adapter according to claim 25, wherein after the voltage of at least one of the third power supply system and the fourth power supply system is supplied to the interchangeable lens, the adapter control section requests the interchangeable lens to execute the process of initializing the status of the interchangeable lens.

27. The adapter according to claim 25, further comprising:

a diaphragm interlocking mechanism section that moves to a position corresponding to an aperture value of a diaphragm provided in the interchangeable lens; and a diaphragm interlocking mechanism driving section that moves a position of the diaphragm interlocking mechanism section, wherein the adapter control section controls the diaphragm interlocking mechanism driving section through the initialization process, thereby executing a diaphragm interlocking mechanism initialization process of moving a position of the diaphragm interlocking mechanism section to a prescribed position which is determined in advance.

28. The adapter according to claim 27, wherein after requesting the interchangeable lens to execute the process of initializing the status of the interchangeable lens, the adapter control section executes the diaphragm interlocking mechanism initialization process.

29. The adapter according to claim 27, wherein initialization completion information, which indicates whether or not the initialization process is complete, includes lens initialization completion information, which indicates whether or not the process of initializing the status of the interchangeable lens is complete, and diaphragm interlocking mechanism initialization completion information which indicates whether or not the diaphragm interlocking mechanism initialization process is complete, and wherein the adapter control section sets a value of the lens initialization completion information to a value that indicates that initialization is complete, regardless of a progress state of the process of initializing the status of the interchangeable lens.

30. The adapter according to claim 29, wherein as the diaphragm interlocking mechanism initialization process is complete, the adapter control section sets a value of the diaphragm interlocking mechanism initialization completion information to a value that indicates that initialization is complete, and transmits the initialization completion information to the camera control section.

31. The adapter according to claim 18, wherein the adapter control section can receive an instruction signal, which indicates that an operation mode of the camera body is shifted from a first operation mode to a second operation mode in which power consumption is smaller compared with the first operation mode, from the camera body, and wherein in response to receiving the corresponding instruction signal, the adapter control section executes a lens shutdown process of stopping the power feeding to the interchangeable lens.

32. The adapter according to claim 31, wherein when the lens shutdown process is complete, the adapter control section transmits a permission signal, which indicates a permission to shill the operation mode from the first operation mode to the second operation mode, to the camera body.

33. A camera system comprising:

the adapter according to claim 1;

the camera body mounted on the first mount section; and the interchangeable lens mounted on the second mount section.

34. A non-transitory computer-readable storage medium storing an adapter control program for controlling operations of an adapter control section in an adapter including a first mount section on which a camera body can be mounted and a second mount section which is provided separately from the first mount section and on which an interchangeable lens can be mounted, *the adapter receiving a first voltage from a first power supply system of the camera body mounted on the first mount section and receiving a second voltage from a second power supply system of the camera body mounted on the first mount section,* the adapter control program comprising instructions to perform the steps of:

generating a voltage of a lens system power supply system, which is to be fed to the interchangeable lens *mounted to the second mount section*, from [a] *the second voltage of the* second power supply system [between a first power supply system of the camera body and the second power supply system which is different from the first power supply system];

operating by receiving a power [feeding] from *the first voltage of* the first power supply system; and transmitting [the] *a* second power supply system request signal, which is for requesting start of the power feeding from the second power supply system, to the camera body after the power [feeding] from *the first voltage of* the first power supply system is received.

35. A camera system comprising:

the [adaptor] *adapter* according to claim 1; and a camera body mounted to the first mount section of the [adaptor] *adapter*, the camera body comprising:

the first power supply system;

the second power supply system; and a power supply control section, wherein when an operation mode of the camera body is shifted from a first operation mode to a second operation mode in which power consumption is smaller compared with the first operation mode, the power supply control section stops a power feeding from the second power supply system to the adapter and continues a power feeding from the first power supply system to the adapter during a predetermined time period.

36. The camera system according to claim 35, wherein in response to a permission signal transmitted from an adapter control section of the [adaptor] *adapter*, the power feeding from the second power supply system is stopped.

37. The camera system according to claim 35, wherein the first operation mode is an operation mode which is capable of executing a photography process, and the second operation mode is an operation mode in which power consumption is reduced compared with the first operation mode and which is incapable of executing the photography process.

*38. An adapter comprising:*

*a first mount that is attachable to a camera body;*

*a second mount that is attachable to an accessory; and*

*a circuit that divides a first voltage supplied from the camera body attached to the first mount into third and fourth voltages supplied to the accessory attached to the second mount.*

*39. A system comprising:*

*the adapter according to claim 38; and*

*the accessory, which is an interchangeable lens having an actuator and a controller, wherein*

*the third voltage is supplied to the actuator to move a position of an optical system of the interchangeable lens; and*

*the fourth voltage is supplied to the controller to control the position of the optical system of the interchangeable lens.*

*40. The adapter according to claim 38, wherein*

*the second mount has a first terminal via which the third voltage is supplied to the accessory, and a second terminal via which the fourth voltage is supplied to the accessory.*

*41. The adapter according to claim 38, wherein*

*the second mount has a ground terminal for the third voltage, and a terminal as a ground for the fourth voltage.*

*42. The adapter according to claim 38, wherein*

*a ground for the circuit is electrically connected with a ground for the third voltage.*

*43. The adapter according to claim 38, wherein*

*the first mount has a terminal via which the first voltage from the camera body is supplied.*

*44. The adapter according to claim 38, wherein*

*the first mount has a ground terminal for the first voltage.*

*45. The adapter according to claim 38, further comprising:*

*a controller to which a second voltage is supplied from the camera body when the first mount is attached to the camera body.*

*46. The adapter according to claim 45, wherein*

*a ground for the second voltage is electrically connected with a ground for the fourth voltage.*

*47. The adapter according to claim 45, wherein*

*the first mount has a terminal via which the second voltage from the camera body is supplied.*

*48. The adapter according to claim 45, wherein*

*the first mount has a ground terminal for the second voltage.*

*49. The adapter according to claim 38, further comprising:*

*a diaphragm controller that controls a diaphragm of the accessory, wherein*

*the circuit generates a fifth voltage supplied to the diaphragm controller.*

*50. The adapter according to claim 49, wherein*

*a ground for the circuit is electrically connected with a ground for the third voltage.*

*51. The adapter according to claim 38,*

*wherein a ground for the circuit, a ground for the first voltage, and a ground for the third voltage are electrically connected to each other.*

*52. An adapter that is attachable to a camera body, the adapter comprising:*

*a mount that is attachable to an accessory; and*

*a circuit that divides a first voltage supplied from the camera body into third and fourth voltages supplied to the accessory attached to the mount.*

* * * * *